US012725450B2

(12) United States Patent
Morita et al.

(10) Patent No.: US 12,725,450 B2
(45) Date of Patent: Sep. 1, 2026

(54) INFORMATION PROCESSING METHOD, INFORMATION PROCESSING SYSTEM, AND RECORDING MEDIUM

(71) Applicant: Panasonic Intellectual Property Management Co., Ltd., Osaka (JP)

(72) Inventors: Yukihiro Morita, Osaka (JP); Shinnosuke Hirokawa, Osaka (JP); Yuichi Kobayakawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 228 days.

(21) Appl. No.: 18/770,081

(22) Filed: Jul. 11, 2024

(65) Prior Publication Data

US 2024/0362950 A1 Oct. 31, 2024

Related U.S. Application Data

(63) Continuation of application No. PCT/JP2022/047742, filed on Dec. 23, 2022.

(30) Foreign Application Priority Data

Jan. 25, 2022 (JP) ................................ 2022-009505

(51) Int. Cl.
*G06V 10/00* (2022.01)
*G06T 11/00* (2006.01)
(Continued)

(52) U.S. Cl.
CPC ............ *G06V 40/174* (2022.01); *G06T 11/00* (2013.01); *G06V 10/141* (2022.01);
(Continued)

(58) Field of Classification Search
CPC .... G06V 10/82; G06V 10/141; G06V 10/761; G06V 10/762; G06V 10/764;
(Continued)

(56) References Cited

U.S. PATENT DOCUMENTS 9,530,078 B2 * 12/2016 Saito .................... G06V 40/172
10,799,122 B2 * 10/2020 Tzvieli ................ A61B 5/6803
(Continued)

FOREIGN PATENT DOCUMENTS

JP 2015-075908 4/2015
JP 2019-028732 2/2019
(Continued)

OTHER PUBLICATIONS

Kim (KR 20230001926 A, Method for Controlling Sleep Temperature and Apparatus Therefor, ). Date published Jan. 5, 2023.*
(Continued)

*Primary Examiner* — Amir Alavi
(74) *Attorney, Agent, or Firm* — Greenblum & Bernstein, P.L.C.

(57) ABSTRACT

The present disclosure features an information processing method that is executed by one or more computers, the information processing method including: acquiring biological information of each of a plurality of persons; on the basis of the acquired biological information and for each of at least one target person of the plurality of persons, deriving a degree of empathy between a reference person of the plurality of persons and that target person; generating empathy presentation information that indicates the degree of empathy of each of the at least one derived target person according to a mode of presentation of the degree of empathy; and outputting the generated empathy presentation information.

13 Claims, 27 Drawing Sheets

(51) Int. Cl.
*G06V 10/141* (2022.01)
*G06V 10/74* (2022.01)
*G06V 40/10* (2022.01)
*G06V 40/16* (2022.01)

(52) U.S. Cl.
CPC ............ *G06V 10/761* (2022.01); *G06V 40/15* (2022.01); *G06V 40/172* (2022.01)

(58) Field of Classification Search
CPC ............. G06V 10/765; G06V 10/7715; G06V 40/174; G06V 40/172; G06V 40/15; G06F 18/00; A61B 5/16; G06T 11/00
See application file for complete search history.

(56) References Cited

U.S. PATENT DOCUMENTS

| | | | | |
|---|---|---|---|---|
| 11,103,139 | B2 * | 8/2021 | Frank | A61B 5/165 |
| 11,647,964 | B2 * | 5/2023 | Taketomi | A61B 5/742<br>340/573.1 |
| 11,744,496 | B2 * | 9/2023 | Kim | A61B 5/7267<br>600/300 |
| 11,862,341 | B2 * | 1/2024 | Kim | G16H 50/20 |
| 12,232,850 | B2 * | 2/2025 | Frank | A61B 5/7282 |
| 12,530,923 | B2 * | 1/2026 | Chun | G06V 40/171 |
| 2014/0317647 | A1 | 10/2014 | Itakura | |
| 2019/0114934 | A1 | 4/2019 | Asa et al. | |
| 2022/0091809 | A1 | 3/2022 | Nagano et al. | |
| 2024/0362950 | A1 * | 10/2024 | Morita | A61B 5/16 |

FOREIGN PATENT DOCUMENTS

| | | |
|---|---|---|
| JP | 2019-072371 | 5/2019 |
| JP | 2019-101929 | 6/2019 |
| JP | 2020-120908 | 8/2020 |
| JP | 2021-194476 | 12/2021 |
| WO | 2013/061497 | 5/2013 |
| WO | 2020/162154 | 8/2020 |

OTHER PUBLICATIONS

International Search Report of PCT application No. PCT/JP2022/047742 dated Feb. 28, 2023.

* cited by examiner

Figure 2:
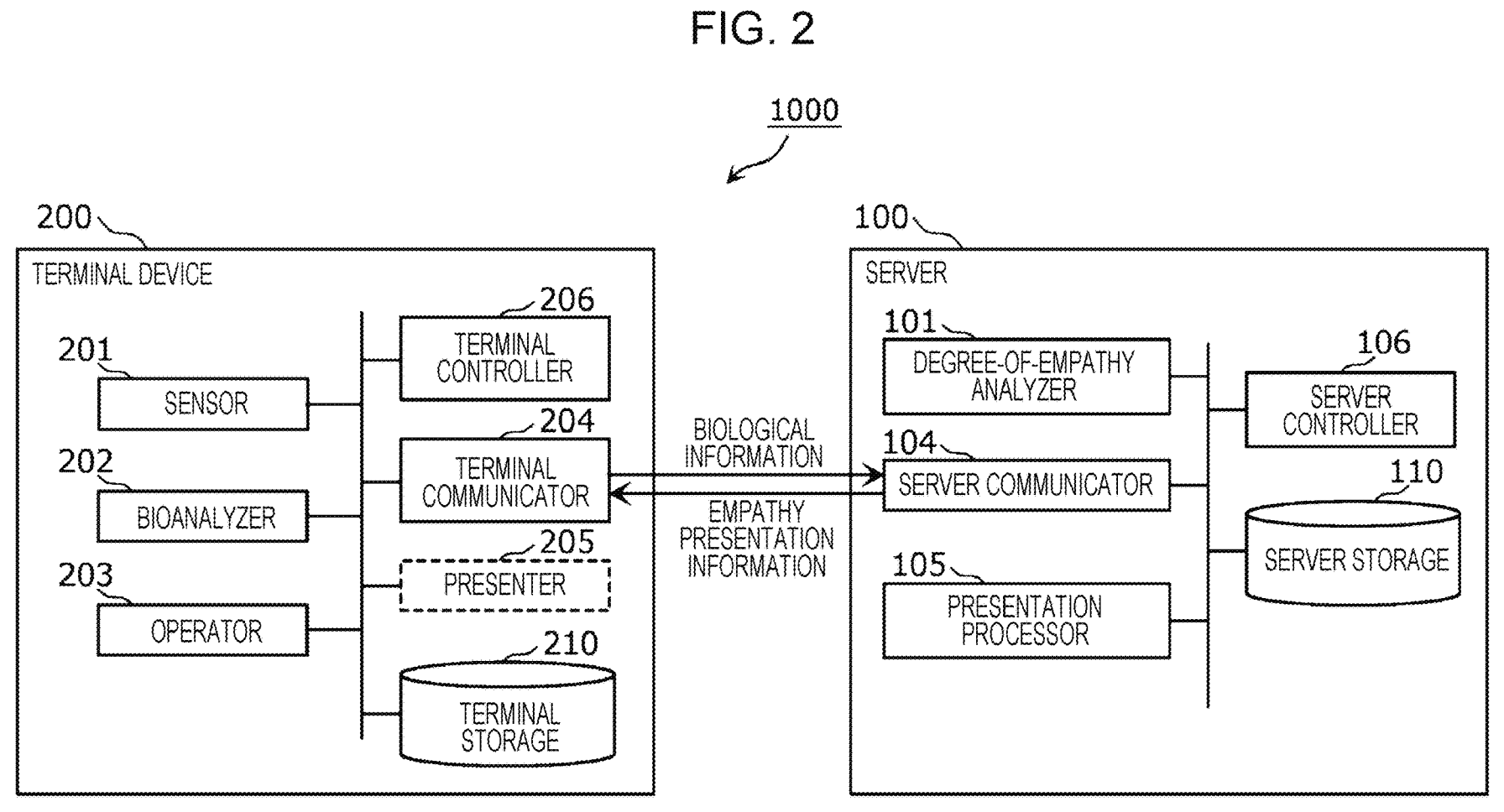

100 SERVER

101 DEGREE-OF-EMPATHY ANALYZER

104 SERVER COMMUNICATOR

105 PRESENTATION PROCESSOR

106 SERVER CONTROLLER

110 SERVER STORAGE

BIOLOGICAL INFORMATION

EMPATHY PRESENTATION INFORMATION

200 TERMINAL DEVICE

201 SENSOR

202 BIOANALYZER

203 OPERATOR

204 TERMINAL COMMUNICATOR

205 PRESENTER

206 TERMINAL CONTROLLER

210 TERMINAL STORAGE

FIG. 3

200
205
P
Ia
M
REFERENCE PERSON
TARGET PERSON
DISPLAY MODE
LIST
SIZE
REALITY
ACTION
W1
W2
B1

FIG. 4

200
205
P
Ib
LIST
54
73
80
89
REFERENCE PERSON
TARGET PERSON
W1
P
W2
P

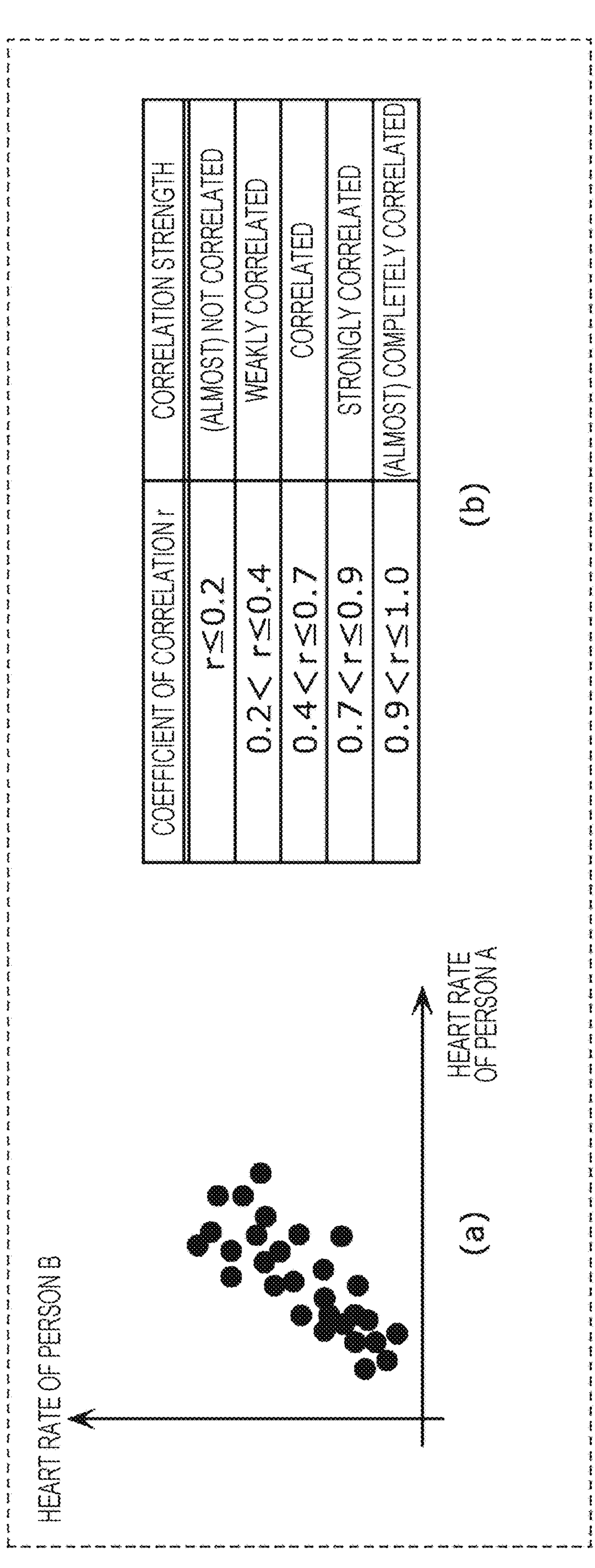
| COEFFICIENT OF CORRELATION r | CORRELATION STRENGTH |
| --- | --- |
| r≤0.2 | (ALMOST) NOT CORRELATED |
| 0.2< r≤0.4 | WEAKLY CORRELATED |
| 0.4<r≤0.7 | CORRELATED |
| 0.7<r≤0.9 | STRONGLY CORRELATED |
| 0.9<r≤1.0 | (ALMOST) COMPLETELY CORRELATED |

HEART RATE
PARTICIPANT X SPEAKS
PARTICIPANT Y SPEAKS
(a) PARTICIPANT X
TIME
(b) PARTICIPANT Y
TIME
(c) PARTICIPANT Z
TIME
t0
t1
t3
t5
t7
EMPATHY
(d) X-Y COEFFICIENT OF CORRELATION
TIME
t0
t6
t8
EMPATHY
(e) X-Z COEFFICIENT OF CORRELATION
TIME
t0
t2
t4

Figure 14B:
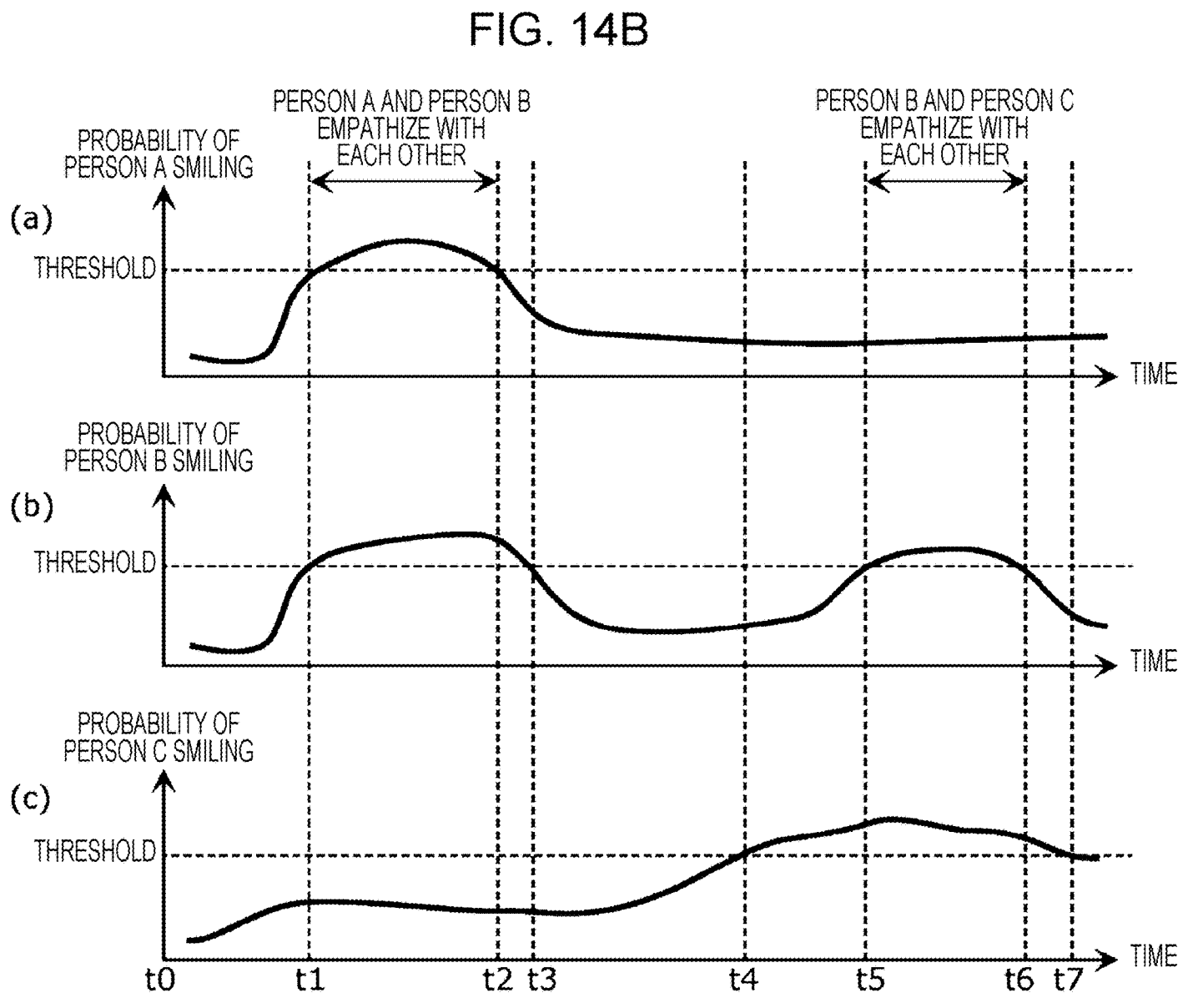

FIG. 14B (a) PROBABILITY OF PERSON A SMILING
THRESHOLD
TIME
PERSON A AND PERSON B EMPATHIZE WITH EACH OTHER
PERSON B AND PERSON C EMPATHIZE WITH EACH OTHER (b) PROBABILITY OF PERSON B SMILING
THRESHOLD
TIME (c) PROBABILITY OF PERSON C SMILING
THRESHOLD
TIME t0 t1 t2 t3 t4 t5 t6 t7

| AMOUNT OF CHANGE IN RRI | ↓ ↓ | ↑ | → |
|---|---|---|---|
| AMOUNT OF CHANGE IN CvRR | ↑ ↑ | → | ↓ ↓ |
| FACTOR OF STRESS | INTERPERSONAL FACTOR | PAIN | COGNITIVE FATIGUE |

| AMOUNT OF CHANGE IN RRI | ↓ | ↑ | → |
|---|---|---|---|
| AMOUNT OF CHANGE IN CvRR | ↑ | → | ↓ |
| AMOUNT OF CHANGE IN SC | ↑ | ↑ | → |
| FACTOR OF STRESS | INTERPERSONAL FACTOR | PAIN | COGNITIVE FATIGUE |

FIG. 23

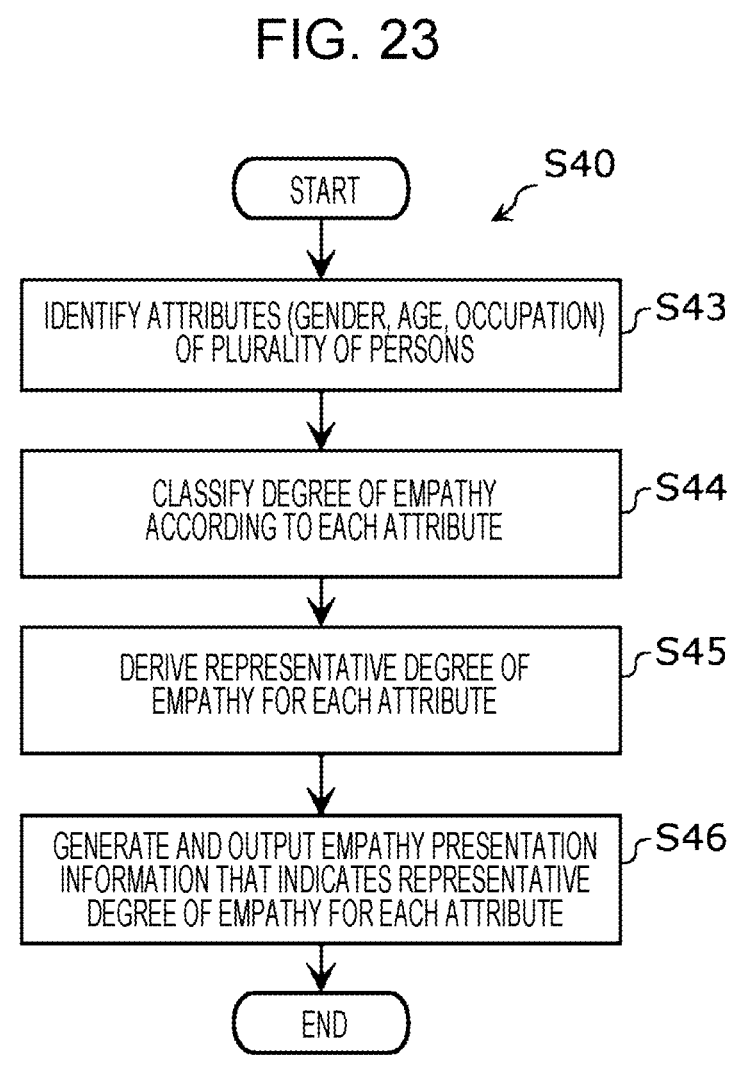

START

S40

IDENTIFY ATTRIBUTES (GENDER, AGE, OCCUPATION) OF PLURALITY OF PERSONS — S43

CLASSIFY DEGREE OF EMPATHY ACCORDING TO EACH ATTRIBUTE — S44

DERIVE REPRESENTATIVE DEGREE OF EMPATHY FOR EACH ATTRIBUTE — S45

GENERATE AND OUTPUT EMPATHY PRESENTATION INFORMATION THAT INDICATES REPRESENTATIVE DEGREE OF EMPATHY FOR EACH ATTRIBUTE — S46

END

| | PERSON A | PERSON B | PERSON C | PERSON D |
|---|---|---|---|---|
| PERSON A | | | | |
| PERSON B | HIGH | | | |
| PERSON C | HIGH | MEDIUM | | |
| PERSON D | MEDIUM | LOW | LOW | |

INFORMATION PROCESSING METHOD, INFORMATION PROCESSING SYSTEM, AND RECORDING MEDIUM

BACKGROUND

1. Technical Field

The present disclosure relates, for example, to an information processing method involving the use of biological information.

2. Description of the Related Art

Conventionally, as an information processing method for communication, there has been proposed a method for, on the basis of a result of sensing of users, presenting the content of a presentation to one of, for example, two users and presenting a variant of the content of the presentation to the other user (see, for example, International Publication No. 2020/162154). According to this information processing method, in a case where a pointing gesture made by one of two users who perform online communication with each other is recognized, an image representing a place indicated by the pointing gesture is displayed on the side of the other user.

SUMMARY

However, the information processing method of International Publication No. 2020/162154 has room for improvement in terms of communication.

One non-limiting and exemplary embodiment provides an information processing method that makes it possible to more smoothly perform communication.

In one general aspect, the techniques disclosed here feature an information processing method that is executed by one or more computers, the information processing method including: acquiring biological information of each of a plurality of persons; on the basis of the acquired biological information and for each of at least one target person of the plurality of persons, deriving a degree of empathy between a reference person of the plurality of persons and that target person; generating empathy presentation information that indicates the degree of empathy of each of the at least one derived target person according to a mode of presentation of the degree of empathy; and outputting the generated empathy presentation information.

The information processing method of the present disclosure makes it possible to more smoothly perform communication.

It should be noted that general or specific embodiments may be implemented as a system, a method, an integrated circuit, a computer program, a storage medium, or any selective combination thereof. Further, the storage medium may be a non-transitory storage medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 is a block diagram showing examples of configurations of a server and each terminal device according to the embodiment;

FIG. 3 is a diagram showing an example of an image that is displayed on a presenter of a terminal device according to the embodiment;

FIG. 4 is a diagram showing an example of a display mode of displaying a degree of empathy according to the embodiment;

FIG. 5 is a diagram showing another example of a display mode of displaying a degree of empathy according to the embodiment;

FIG. 13 illustrates diagrams for explaining examples of pieces of heartbeat information of two persons that are acquired by a bioanalyzer according to Aspect 1 of the embodiment and a correlation between those pieces of heartbeat information;

FIG. 14B is a diagram for explaining an example of derivation of a degree of empathy based on a facial expression according to Aspect 1 of the embodiment;

FIG. 23 is a flow chart showing an example of part of a processing operation of a server according to Modification 1 of the embodiment;

FIG. 25 is a diagram showing another example of a method for presenting a degree of empathy according to Modification 2 of the embodiment;

DETAILED DESCRIPTIONS

Figure 1:
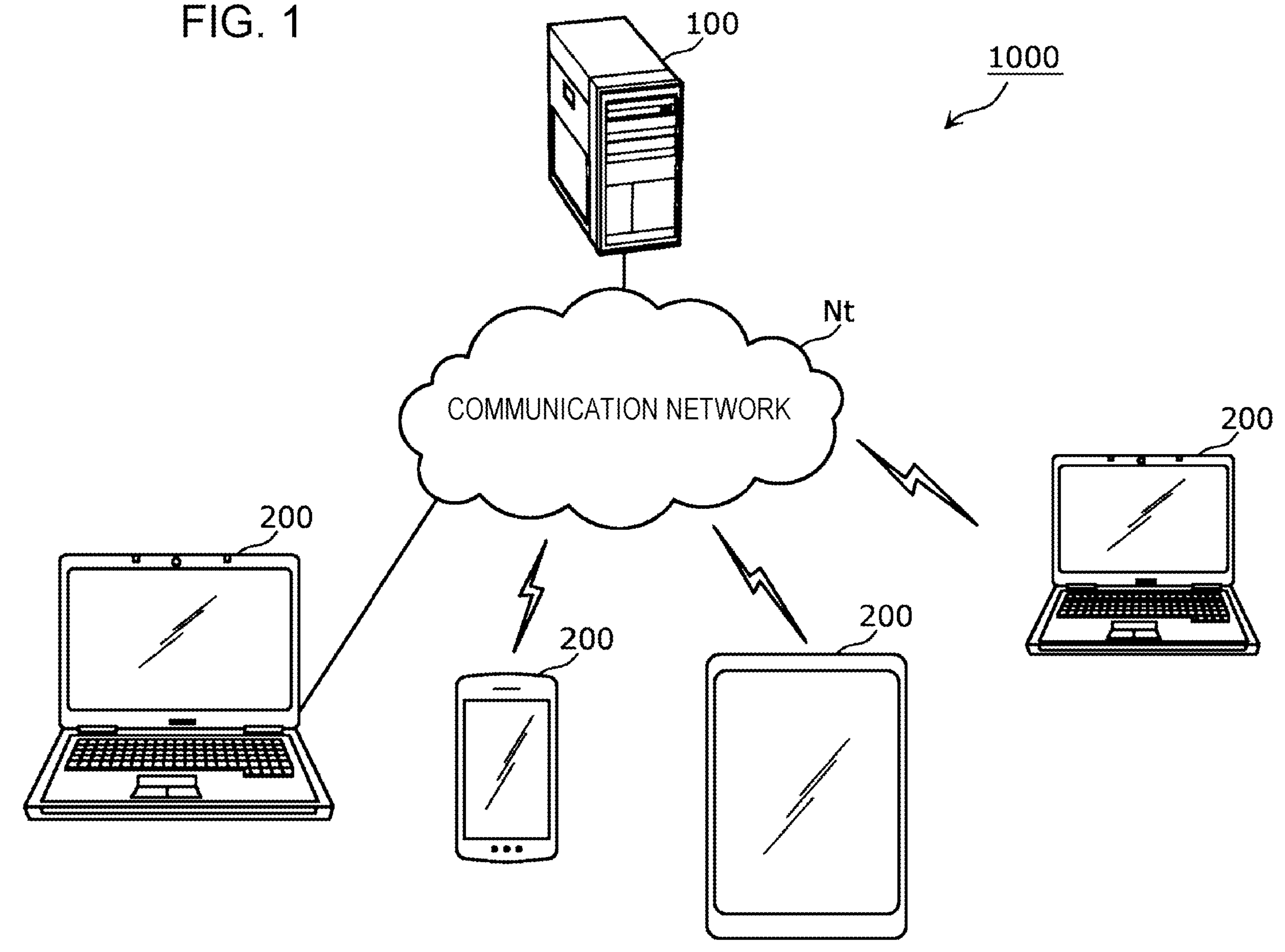
FIG. 1 is a diagram showing a configuration of an information processing system according to an embodiment.

Underlying Knowledge Forming Basis of the Present Disclosure

For reduction of risk of viruses or infectious diseases such as novel coronaviruses, online communication is rapidly expanding worldwide. With the spread of telecommuting, face-to-face conferences have been replaced by online conferences, and it has been become difficult to perform face-to-face communication performed to date. Moreover, there have been an increasing number of opportunities to perform online communication involving the utilization of Zoom (registered trademark), Teams (registered trademark), or other web conferencing tools.

When a plurality of persons perform face-to-face communication, each person performs communication by obtaining various pieces of information on that occasion with his/her fives senses and grasping the states of the other persons including subtle nuances. Meanwhile, when a plurality of persons perform online communication, each person can only obtain a considerably smaller amount of information on the states of the other persons than he/she would when performing face-to-face communication. This results in making it difficult to properly perform communication and causes various communication problems such as each person missing an opportunity to speak and being unable to understand the real intension of remarks made by the other persons. Further, since each person cannot properly grasp the states of the other persons while he/she is speaking, he/she has no way of knowing whether the other persons empathize with his/her remarks. This results in such a big communication problem that each person cannot have exhaustive discussions with the other persons. Further, for example, in a case where a speaker delivers a message to a large number of listeners, there can be a problem such as the speaker being unable to grasp whether the listeners understand the content of his/her message.

In one general aspect, the techniques disclosed here feature an information processing method that is executed by one or more computers, the information processing method including: acquiring biological information of each of a plurality of persons; on the basis of the acquired biological information and for each of at least one target person of the plurality of persons, deriving a degree of empathy between a reference person of the plurality of persons and that target person; generating empathy presentation information that indicates the degree of empathy of each of the at least one derived target person according to a mode of presentation of the degree of empathy; and outputting the generated empathy presentation information.

According to this, for example, when online communication involving the use of one or more computers is being performed, a degree of empathy between a reference person of a plurality of participants in the online communication and each of at least one target person of the plurality of participants is derived. Then, empathy presentation information that indicates those degrees of empathy, for example, according to a mode of presentation set by a participant or according to a predetermined mode of presentation is generated and outputted. As a result of that, the degrees of empathy indicated by the empathy presentation information can be presented to the participant or others according to the mode of presentation. Accordingly, the participant can easily grasp the degrees of empathy and can perform communication with reference to the degrees of empathy. That is, the participant can grasp, for example, how much another participant empathizes with still another participant or how much another participant empathizes with him/her. As a result of that, the participant can more smoothly perform communication. Further, even in a case where a speaker delivers a message to a large number of listeners, a degree of empathy between the speaker and each listener can be presented. As a result of that, the speaker can easily grasp whether the listeners understand the content of the speaker's message, can adjust the content of the message on the basis of the outcome, and can more smoothly perform communication.

Further, the information processing method may further include, by accepting an input operation from a user who uses the one or more computers, executing a person selecting process of selecting the reference person and the at least one target person from among a plurality of candidate persons. The plurality of candidate persons are, for example, all participant participating in online communication. Further, the aforementioned plurality of persons are selected by selecting the reference person and the at least one target person.

This allows the user to arbitrarily select the reference person and the at least one target person. That is, the user can arbitrarily select, depending on the user's situation, a person whom the user would like to present a degree of empathy. This makes it possible to facilitate the user's convenience.

Further, in the person selecting process, a first reference person and a second reference persons who are different from each other may be each selected as the reference person from among the plurality of candidate persons, and deriving the degree of empathy may include, for each of the at least one target person, deriving a degree of empathy between the first reference person and the target person and deriving a degree of empathy between the second reference person and the target person.

This causes two reference persons to be selected, thus making it possible to widen a range of targets whose degrees of empathy are to be derived. As a result of that, various degrees of empathy among the plurality of persons can be presented.

Further, in the person selecting process, an image for accepting an input operation performed by the user may be displayed, and by accepting the input operation that corresponds to the image, the reference person and the at least one target person may be selected.

This can bring about improvement in visual operability for selection of the reference person and the target person.

Further, in the person selecting process, voice data that represents an utterance produced by the user may be acquired, and by accepting the voice data as the input operation, the reference person and the at least one target person may be selected.

This allows the user to easily select the reference person and the target person without using his/her hands.

Further, generating the empathy presentation information may include: acquiring attribute information that indicates an attribute of each of the at least one target person; on the basis of the attribute information and for each attribute, deriving, with use of a degree of empathy of each of the at least one person who belongs to that attribute, a representative degree of empathy serving as a degree of empathy that represents the attribute; and generating the empathy presentation information that indicates the representative degree of empathy for each attribute.

This makes it possible to present a representative degree of empathy of males and a representative degree of empathy of females, for example, in the case of attributes "males" and "females". This makes it possible to present degrees of empathy by attribute and a difference between those degrees of empathy in an easy-to-understand manner.

Further, the information processing method may further include, for each of the at least one target person, causing a display to display a person identifying image for identifying that target person.

This can make it easy to visually understand who the target person is.

Further, displaying the person identifying image may include displaying an arrangement of the respective person identifying images of the at least one target person, and in the arrangement, the respective person identifying images of the at least one target person may be listed in order of degree of empathy of the at least one target person according to the mode of presentation. For example, in the arrangement, the person identifying image of the target person with a higher degree of empathy may be placed further forward in the arrangement.

This makes it possible to display a degree of empathy between the reference person and each of the at least one target person as a degree of empathy of that target person in an easy-to-understand manner. That is, the user can easily grasp, from a list of one or more person identifying images being displayed, degrees of empathy of those target persons.

Further, displaying the person identifying image may include causing the person identifying image of each of the at least one target person to be displayed according to the mode of presentation in a size that corresponds to a degree of empathy of that target person. For example, the person identifying image may be displayed in a larger size when the target person identified by the person identifying image has a higher degree of empathy.

This makes it possible to display a degree of empathy between the reference person and each of the at least one target person as a degree of empathy of that target person in an easy-to-understand manner. That is, the user can easily grasp, from the respective sizes of one or more person identifying images being displayed, degrees of empathy of those target persons.

Further, displaying the person identifying image may include causing the person identifying image of each of the at least one target person to be displayed according to the mode of presentation with a degree of representational accuracy that corresponds to a degree of empathy of that target person, and the degree of representational accuracy of the person identifying image may be an extent to which the person identifying image is similar to a photographic image of the target person identified by the person identifying image.

For example, the person identifying image may be displayed with a higher degree of representational accuracy when the target person identified by the person identifying image has a higher degree of empathy.

This makes it possible to display a degree of empathy between the reference person and each of the at least one target person as a degree of empathy of that target person in an easy-to-understand manner. That is, the user can easily grasp, from the respective degrees of representational accuracy of one or more person identifying images being displayed, degrees of empathy of those target persons.

Further, displaying the person identifying image may include causing the person identifying image of each of the at least one target person to be displayed according to the mode of presentation in such a manner as to express an action that corresponds to a degree of empathy of that target person.

This makes it possible to display a degree of empathy between the reference person and each of the at least one target person as a degree of empathy of that target person in an easy-to-understand manner. That is, the user can easily grasp, from actions expressed by one or more person identifying images being displayed, degrees of empathy of those target persons.

Further, deriving the degree of empathy may include deriving, for each pair of two persons included in the plurality of persons, a degree of empathy between the two persons included in that pair, one of the two persons may be the reference person, the other may be the target person, and displaying the person identifying image may include displaying, according to the mode of presentation, only the person identifying image of one of a plurality of pairs whose degrees of empathy have been derived that corresponds to a degree of empathy higher than a threshold.

This allows the user to easily grasp a pair having a high degree of empathy.

Further, the information processing method may further include causing a device situated in an area around a user who uses the one or more computers to adjust an environment of the user according to the mode of presentation to an environment that corresponds to a degree of empathy of each of the at least one target person.

This makes it possible to adjust the user's real environment according to the degree of empathy and present the degree of empathy to the user in a more easy-to-understand manner.

Further, the information processing method may further include determining, as a direction of empathy, whether the derived degree of empathy indicates an extent to which the reference person empathizes with the target person or whether the target person empathizes with the reference person; and causing a display to display the determined direction of empathy.

This causes the direction of empathy to be displayed, thus allowing the user to grasp who empathizes with whom and to further smoothly perform communication.

The following describes embodiments in concrete terms with reference to the drawings.

It should be noted that the embodiments to be described below each illustrate a comprehensive and specific example. The numerical values, shapes, materials, constituent elements, placement and topology of constituent elements, steps, orders of steps, or other features that are shown in the following embodiments are just a few examples and are not intended to limit the present disclosure. Further, those of the constituent elements in the following embodiments which are not recited in an independent claim reciting the most superordinate concept are described as optional constituent elements.

Further, the drawings are schematic views and are not necessarily strict illustrations. Further, in the drawings, the same constituent elements are given the same reference signs.

Embodiment

FIG. 1 is a diagram showing a configuration of an information processing system according to the present embodiment.

An information processing system 1000 according to the present embodiment is, for example, a system for performing online communication and includes a server 100 and a plurality of terminal devices 200.

Each of the plurality of terminal devices 200 is a computer that is used by a user in performing online communication. Such a terminal device 200 is configured as a personal computer, a smartphone, a tablet terminal, or other devices. That is, the user uses the terminal device 200 to participate in online communication. The user is also called a "participant in online communication".

The server 100 is a computer that is connected to the plurality of terminal devices 200 via a communication network Nt such as the Internet.

In such an information processing system 1000, each terminal device 200 sends the user's voice data to the server 100 via the communication network Nt in performing online communication. Upon receiving the voice data from the terminal device 200, the server 100 sends the received voice data to another user's terminal device 200 via the communication network Nt.

Although, in the information processing system 1000, voice data is sent and received as mentioned above, the user's video data (also called a "moving image") may be sent and received together with voice data. Further, either wired communication or wireless communication may be used as communication between the server 100 and the terminal devices 200.

FIG. 2 is a block diagram showing examples of configurations of the server 100 and each of the terminal devices 200 according to the present embodiment.

Each of the terminal devices 200 includes a sensor 201, a bioanalyzer 202, an operator 203, a terminal communicator 204, a presenter 205, a terminal controller 206, and a terminal storage 210.

The sensor 201 includes a camera that photographs the face of the user of the terminal device 200 and outputs, as sensing information, a captured image obtained by photographing. The captured image is a moving image. Furthermore, the sensor 201 includes, for example, a microphone that acquires the user's voice, converts the voice into voice data as an electrical signal, and outputs the voice data. The sensing information may contain the captured image and the voice data.

The bioanalyzer 202 acquires the sensing information from the sensor 201 and, by analyzing the sensing information, generates biological information serving as information on the user's living body. Moreover, the bioanalyzer 202 outputs the biological information. The biological information may, for example, be information (i.e. heartbeat information) on the user's heartbeat that is obtained from the captured image. Specifically, the biological information may be information that indicates a parameter such as a heart rate or a heartbeat fluctuation in chronological order. Further, the biological information may be information that indicates the user's facial expression in chronological order. For example, the facial expression is labeled or expressed by delight, anger, sorrow, pleasure, or other emotions.

Although, in the present embodiment, the bioanalyzer 202 is provided in the terminal device 200, the bioanalyzer 202 may be provided in the server 100. In this case, the sensing information that is outputted from the sensor 201 is sent from the terminal device 200 to the server 100.

The presenter 205 includes, for example, a display that displays an image and a loudspeaker that outputs a voice. Examples of the display include, but are not limited to, a liquid crystal display, a plasma display, and an organic EL (electroluminescence) display. Further, although, in the present embodiment, the presenter 205 is provided in the terminal device 200, the presenter 205 may be a device that is connected to the terminal device 200.

The operator 203 accepts an input operation carried out by the user and outputs, to the terminal controller 206, a signal that corresponds to the input operation. Such an operator 203 is configured, for example, as a keyboard, a touch sensor, a touchpad, a mouse, a microphone, or other devices. Further, the operator 203 may be combined with the presenter 205 into a touch panel. That is, the operator 203 is disposed in the display and, when the user touches an image, such as an icon, that is displayed on the display, accepts an input operation that corresponds to the image.

The terminal communicator 204 communicates with the server 100 via the communication network Nt. This communication may be wired communication or wireless communication.

The terminal storage 210 is a storage medium and, for example, has stored therein a user ID serving as the user's identification information, the after-mentioned person identifying image, or other information. Such a storage medium may be a hard disk drive, a random-access memory (RAM), a read-only memory (ROM), or a semiconductor memory. Further, the storage medium may be volatile or nonvolatile.

The terminal controller 206 controls the sensor 201, the bioanalyzer 202, the terminal communicator 204, the presenter 205, and the terminal storage 210.

For example, the terminal controller 206 causes voice data that is outputted from the sensor 201 to be sent from the terminal communicator 204 to the server 100. Further, every time biological information is outputted from the bioanalyzer 202, the terminal controller 206 causes the biological information to be sent from the terminal communicator 204 to the server 100 via the communication network Nt. In a case where the user of the terminal device 200 including the terminal controller 206 has been selected as the after-mentioned reference person or target person, the terminal controller 206 may cause the biological information to be sent from the terminal communicator 204 to the server 100. In sending such voice data and biological information, the terminal controller 206 associates the user ID stored in the terminal storage 210 with the voice data and the biological information and causes the voice data and the biological information associated with the user ID to be sent from the terminal communicator 204.

Further, every time the terminal communicator 204 receives empathy presentation information sent from the server 100 via the communication network Nt, the terminal controller 206 causes a degree of empathy indicated by the empathy presentation information to be presented by the presenter 205 according to a mode of presentation of the degree of empathy. That is, under control of the terminal controller 206, the presenter 205 causes the degree of empathy indicated by the empathy presentation information to be presented to the user according to the mode of presentation of the degree of empathy.

The server 100 includes a degree-of-empathy analyzer 101, a server communicator 104, a presentation processor 105, a server controller 106, and a server storage 110.

The server communicator 104 communicates with the terminal device 200 via the communication network Nt. This communication may be wired communication or wireless communication. The server communicator 104 is an example of an acquirer that acquires biological information of each of a plurality of persons. That is, the server communicator 104 receives biological information that is sent from each of the plurality of terminal devices 200 via the communication network Nt. A user ID is associated with this biological information. Accordingly, the server 100 can identify which participant the biological information belongs to. Further, the server communicator 104 sends empathy presentation information generated by the presentation processor 105 to the terminal device 200 via the communication network Nt.

The server storage 110 is a storage medium and, for example, has stored therein a user ID of the user of each of the plurality of terminal devices 200 and a person identifying image associated with the user ID. As noted above, such a storage medium is a hard disk drive, a RAM, a ROM, or a semiconductor memory. Further, the storage medium may be volatile or nonvolatile.

The degree-of-empathy analyzer 101 derives a degree of empathy between a reference person and a target person on the basis of biological information of the user of each of the plurality of terminal devices 200. Moreover, the degree-of-empathy analyzer 101 generates and outputs degree-of-empathy information that indicates the degree of empathy. There may be two or more target persons. A reference person is one of all participants in online communication, and a target person is one of all the participants but the reference person. That is, on the basis of those pieces of biological information acquired by the server communicator 104 and for each of at least one target person of the plurality of persons, the degree-of-empathy analyzer 101 derives a degree of empathy between a reference person of the plurality of persons and that target person. The plurality of persons are some or all of all the participants and include the reference person and the at least one target person. A degree of empathy is an extent of empathy between a person and a person. The larger the extent of empathy is, the larger numerical value the degree of empathy assumes, and the smaller the extent of empathy is, the smaller numerical value the degree of empathy assumes. Further, empathy may, for example, be a state where a person and a person share their emotional states, mental states, psychosomatic states, or other states with each other. Alternatively, empathy may be a state where a person and a person approve of another person's remarks, action, or other behavior.

Specifically, for example, in a case where biological information of two participants indicates the same facial expression (e.g. delight) at the same timing, the degree-of-empathy analyzer 101 derives a high degree of empathy as a degree of empathy between the two participants. Information on heartbeat such as a heart rate and a heartbeat fluctuation reflects the inner state of a person and is suitable to deriving the degree of empathy. While the facial expression may reflect the inner state of a person, it also contains outward information such as a fake smile. Therefore, the degree-of-empathy analyzer 101 may derive the degree of empathy with the use of both the information on heartbeat and the facial expression. In this case, the biological information indicates, for example, the heart rate or the heart fluctuation and the facial expression in chronological order. For example, the degree-of-empathy analyzer 101 may derive a final degree of empathy by performing a linear combination of a first degree of empathy that is derived on the basis of the information on heartbeat and a second degree of empathy that is derived on the basis of the facial expression. At this point in time, the first degree of empathy and the second degree of empathy are subjected to weighted addition. Moreover, in a case where the information on heartbeat is acquired with a high degree of accuracy, the degree-of-empathy analyzer 101 assigns a greater weight to the first degree of empathy, and in a case where the information on heartbeat is not acquired with a high degree of accuracy, the degree-of-empathy analyzer 101 assigns a greater weight to the second degree of empathy.

With biological information that is sent from a terminal device 200, a user ID is associated. Accordingly, by using a user ID of a reference person and a user ID of a target person, the degree-of-empathy analyzer 101 can identify biological information of the reference person and biological information of the target person. Further, a degree of empathy between the reference person and the target person can also be said to be a degree of empathy of the target person. Processing details of the degree-of-empathy analyzer 101 according to the present embodiment will be described in the end of the present embodiment.

The presentation processor 105 acquires degree-of-empathy information that is outputted from the degree-of-empathy analyzer 101, and generates empathy presentation information on the basis of the degree-of-empathy information. That is, the presentation processor 105 generates empathy presentation information that indicates the degree of empathy of each of the at least one derived target person according to a mode of presentation of those degrees of empathy. Then, the presentation processor 105 outputs the generated empathy presentation information. Although, in the present embodiment, the presentation processor 105 is provided in the server 100, the presentation processor 105 may be provided in the terminal device 200. In this case, degree-of-empathy information generated by the degree-of-empathy analyzer 101 is sent from the server 100 to the terminal device 200.

The server controller 106 controls the degree-of-empathy analyzer 101, the server communicator 104, the presentation processor 105, and the server storage 110. For example, every time biological information is received by the server communicator 104, the server controller 106 causes the degree-of-empathy analyzer 101 to execute a process based on the biological information. Further, every time empathy presentation information is generated and outputted by the presentation processor 105, the server controller 106 causes the server communicator 104 to send the empathy presentation information to the terminal device 200. Furthermore, when the server communicator 104 receives voice data from the terminal device 200, the server controller 106 causes the voice data to be sent from the server communicator 104 to another terminal device 200. The loudspeaker of the presenter 205 of the terminal device 200 outputs a voice represented by the voice data. Sending and receiving such voice data causes communication to be performed between participants.

Figure 3:
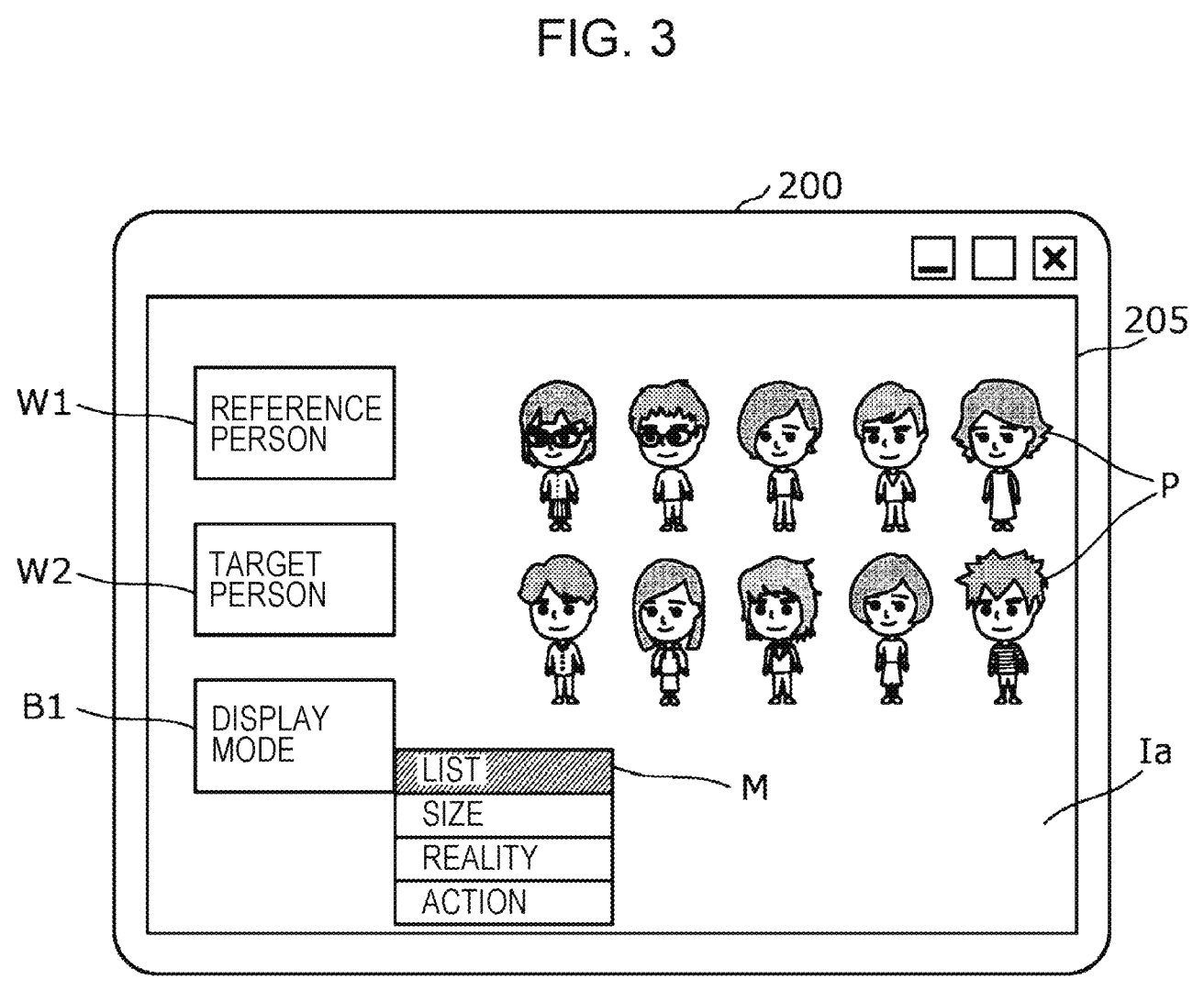

FIG. 3 is a diagram showing an example of an image that is displayed on the presenter 205 of a terminal device 200.

When online communication is performed, the server controller 106 of the server 100 requests each terminal device 200 for a user ID and a person identifying image P via the server communicator 104 first and then stores the user ID and the person identifying image P in association with each other in the server storage 110. Then, the server controller 106 generate a setting screen image Ia containing those person identifying images P and causes the setting screen image Ia to be sent from the server communicator 104 to the terminal device 200.

When the terminal communicator 204 receives the setting screen image Ia, the terminal controller 206 of the terminal device 200 causes the presenter 205 to display the setting screen image Ia, an example of which is shown in FIG. 3. The setting screen image Ia contains, for example, a plurality of the person identifying images P, a reference person frame W1, a target person frame W2, and a display mode select button B1.

Each of the plurality of person identifying images P is an image for identifying the user (i.e. participant) of a terminal device 200 who is participating in online communication. This person identifying image P is specifically an avatar that represents the participating user. The avatar is a character that is displayed as a manifestation of the user and may, for example, be a graphical or pictorial person image that looks alike the user. Alternatively, the avatar may be an image that represents an animal or may be an image of an object, a scenery, or other things set by the user. Further, the person identifying image P needs only be an image for identifying the user and may be an image that denotes the name, nickname, user ID, or other identification information of the user or may be a still image (e.g. a photographic image), a moving image, or other images of the user.

The reference person frame W1, the target person frame W2, and the display mode select button B1 are graphic images that are used in a graphical user interface (GUI) for displaying a degree of empathy between participants in online communication.

The reference person frame W1 is an area where the user selects a reference person from among a plurality of participants. For example, by operating the operator 203, the user selects, from among the plurality of person identifying images P contained in the setting screen image Ia, a person identifying image P that corresponds to a reference person the user would like and places the person identifying image P in the reference person frame W1. Such selection and placement of a person identifying image P is done, for example, by drag and drop. Further, such selection and placement of a person identifying image P allows a reference person to be selected at the terminal device 200. Upon selection and placement of the person identifying image P, the terminal controller 206 causes reference person information to be sent from the terminal communicator 204 to the server 100. The reference person information indicates that a participant who corresponds to the selected person identifying image P is the reference person. The reference person information may be a user ID of the reference person. When the server communicator 104 receives the reference person information, the server controller 106 of the server 100 selects, as the reference person, the participant indicated by the reference person information.

The target person frame W2 is an area where the user selects a target person from among the plurality of participants. For example, by operating the operator 203, the user selects, from among the plurality of person identifying images P contained in the setting screen image Ia, a person identifying image P that corresponds to a target person the user would like and places the person identifying image P in the target person frame W2. Such selection and placement of a person identifying image P is done, for example, by drag and drop. Further, such selection and placement of a person identifying image P allows a target person to be selected at the terminal device 200. Further, in a case where the user would like to select a plurality of target persons, the user repeatedly execute the aforementioned drag and drop. This allows a plurality of target persons to be selected at the terminal device 200. Upon selection and placement of the person identifying image P, the terminal controller 206 causes target person information to be sent from the terminal communicator 204 to the server 100. The target person information indicates that a participant who corresponds to the selected person identifying image P is the target person. The target person information may be a user ID of the target person. When the server communicator 104 receives the target person information, the server controller 106 of the server 100 selects, as the target person, the participant indicated by the target person information. Although, in the present embodiment, a plurality of target persons are selected, the number of target persons that are selected may be 1.

Thus, in the present embodiment, by accepting an input operation from a user who uses the terminal device 200, the terminal device 200 executes a person selecting process of selecting the reference person and the at least one target person from among a plurality of candidate persons, i.e. all participants. The same can be said about the server 100 as well as the terminal device 200. That is, by receiving the aforementioned reference person information and target person information, the server 100 accepts an input operation from the user who uses the server 100 via the terminal device 200. By accepting the input operation, the server 100 executes the person selecting process of selecting the reference person and the at least one target person from among the plurality of candidate persons. This allows the user to arbitrarily select the reference person and the at least one target person. That is, the user can arbitrarily select, depending on the user's situation, a person whom the user would like to present a degree of empathy. This makes it possible to facilitate the user's convenience.

Further, in the person selecting process, by displaying the setting screen image Ia sent from the server 100, the terminal device 200 displays graphic images, such as the reference person frame W1 and the target person frame W2, for accepting input operations carried out by the user and, by accepting input operations that correspond to those graphic images, selects the reference person and the at least one target person. This can bring about improvement in visual operability for selection of the reference person and the target person.

Although, in the present embodiment, a person selecting process involving the use of a GUI is executed, a person selecting process involving the use of a voice may be executed. For example, the microphone of the sensor 201 of the terminal device 200 acquires the user's voice, converts the voice into voice data as an electrical signal, and outputs the voice data as a signal representing the user's input operation. Specifically, for each person identifying image P being displayed, the name, nickname, number, user ID, or other identification information of the person identified by the person identifying image P are additionally displayed. In this case, the user produces a voice to read out the name or other identification information. This reading out causes the aforementioned voice data to be outputted from the microphone. The terminal controller 206 of the terminal device 200 acquires the voice data generated and outputted by the user reading out and, by accepting the voice data as the input operation, selects the reference person and the at leas one target person.

Then, the terminal controller 206 causes reference person information that indicates the selected reference person and target person information that indicates the at least one selected target person to be sent from the terminal communicator 204 to the server 100. Alternatively, the terminal controller 206 causes voice data that represents the input operation to be sent from the terminal communicator 204 to the server 100. In this case, as with the aforementioned terminal device 200, the server controller 106 of the server 100 acquires voice data that is generated by utterance (i.e. the aforementioned reading out) given by the user who uses the server 100 via the terminal device 200 and, by accepting the voice data as the input operation, selects the reference person and the at leas one target person. This allows the user to easily select the reference person and the target person without using his/her hands.

The display mode select button B1 is a button for selecting a display mode of displaying a degree of empathy between the reference person and each of the plurality of target persons. For example, when the user selects the display mode select button B1 by operating the operator 203, the terminal controller 206 causes the presenter 205 to display a pull-down menu M. The pull-down menu M includes the names of display modes such as "LIST", "SIZE", "REALITY", and "ACTION". "LIST" is a display mode of displaying a list of the person identifying images P of the plurality of target persons in order of degree of empathy of those target persons. "SIZE" is a display mode of displaying the person identifying image P of each of the plurality of target persons with the person identifying image P adjusted to a size that corresponds to a degree of empathy of that target person. "REALITY" is a display mode of displaying the person identifying image P of each of the plurality of target persons with the person identifying image P processed into a degree of representational accuracy that corresponds to a degree of empathy of that target person. The degree of representational accuracy indicates the extent to which the person identifying image P is similar to a photographic image of the target person. That is, in this display mode, when the degree of empathy of the target person is higher, a person identifying image P of the target person that is more quire similar to a photographic image of the target person is displayed. "ACTION" is a display mode of displaying the person identifying image P of each of the plurality of target persons with the person identifying image P processed into, modified into, or replaced with an image representing an action that corresponds to a degree of empathy of that target person.

When the user selects one display mode from the pull-down menu M by operating the operator 203, the terminal controller 206 causes display mode information that indicates the selected display mode to be sent from the terminal communicator 204 to the server 100.

The server communicator 104 of the server 100 receives reference person information, target person information, and display mode information from the terminal devices 200. Further, when the server communicator 104 receives those pieces of information, the server controller 106 requests, for biological information, the terminal device 200 of a reference person indicated by the reference person information and the terminal device 200 of a reference person indicated by the target person information. This request for biological information is made via the server communicator 104. Then, the server communicator 104 starts to periodically receive biological information from those terminal devices 200. Next, the degree-of-empathy analyzer 101 derives a degree of empathy between the reference person indicated by the reference person information and the target person indicated by the target person information with the use of biological information sent from the terminal devices 200 of those persons and most recently received by the server communicator 104. If the target person information indicates a plurality of target persons, the degree-of-empathy analyzer 101 derives a degree of empathy between each of the plurality of target persons and the reference person. Then, the presentation processor 105 generates empathy presentation information that indicates the degrees of empathy of those target persons according to a mode of presentation of those degrees of empathy. In the present embodiment, the mode of presentation is a display mode indicated by the display mode information.

Figure 4:
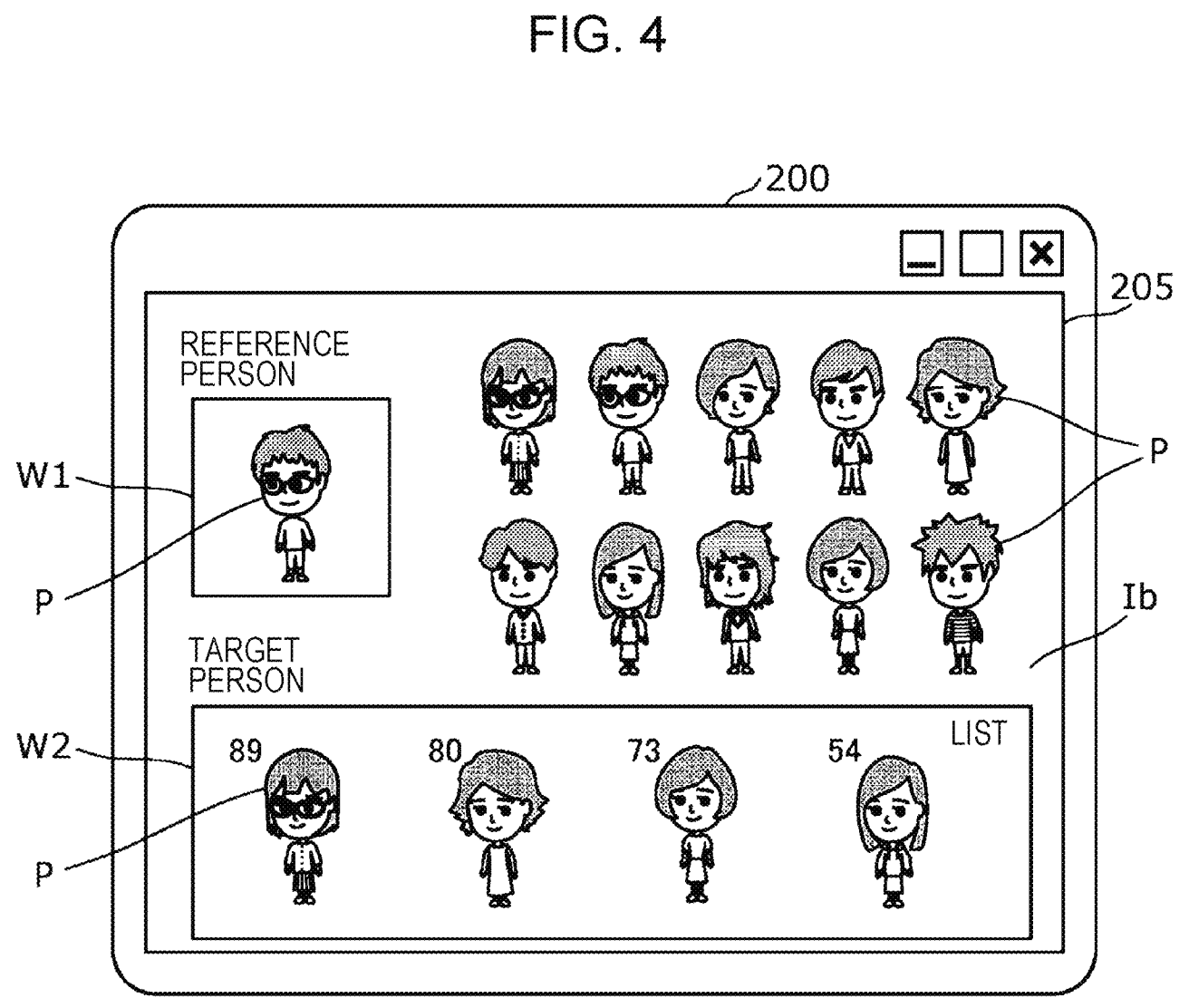

FIG. 4 is a diagram showing an example of a display mode of displaying a degree of empathy.

When the terminal communicator 204 receives empathy presentation information from the server 100, the terminal controller 206 of the terminal device 200 causes the presenter 205 to display, for example, a display screen image Tb shown in FIG. 4 on the basis of the empathy presentation information. In the example shown in FIG. 4, the empathy presentation information is generated according to the display mode "LIST" selected in the setting screen image Ia.

In this case, in the reference person frame W1 of the display screen image Tb, the person identifying image P of a reference person selected in the setting screen image Ia is displayed. Further, in the target person frame W2, the person identifying images P of a plurality of target persons selected in the setting screen image Ia are displayed in a state of being arranged in order of degree of empathy of those target persons. Further, in an area around a person identifying image P placed in the target person frame W2, a degree of empathy of a target person who corresponds to the person identifying image P may be displayed as a numerical value. For example, the degree of empathy may be displayed as a numerical value at the upper left of the person identifying image P. In one specific example, the degree of empathy is displayed as a numerical value of 0 to 100.

Since biological information is periodically sent from the terminal device 200, the server 100 repeatedly executes a process of generating empathy presentation information on the basis of the most recent biological information and sending the empathy presentation information to the terminal device 200. As a result of that, every time the most recent empathy presentation information is received by the terminal communicator 204, the terminal controller 206 may update an arrangement of the plurality of person identifying images P that are displayed in the target person frame W2. That is, the arrangement is updated in real time. This allows the user to grasp at first sight a degree of empathy of a target person who empathizes with the reference person at any timing.

In recent years, there has been an increase in the number of opportunities for people to perform online communication using their terminal devices under various situations. Under such circumstances, a user of a terminal device who is a participant in online communication wishes to know a degree of empathy between one and another of those people. Further, one and another of the people whose degree of empathy the user would like to know can vary depending on the user's situation. For example, there is a case where the user would like to know a degree of empathy between him/herself and another person. Alternatively, there is also a case where the user would like to know a degree of empathy between another person and still another person. Therefore, the inventors reached the idea that as shown in FIGS. 3 and 4, the user can configure the settings for a reference person and a target person whose degree of empathy is to be displayed. Such settings can be smoothly configured by using the GUI shown in FIG. 3.

Further, in the present embodiment, a plurality of target persons can be selected. This allows a user to select, depending on his/her situation, a reference person and a plurality of target persons whose degree of empathy he/she would like to know, and allows the user to recognize the degree of empathy. For example, the user can select a person A as a reference person and select a person B and a person C as target persons. In this case, a degree of empathy between the persons A and the person B and a degree of empathy between the person A and the person C are displayed on the presenter 205 of the user's terminal device 200. The degree of empathy between the persons A and the person B can be said to be a degree of empathy of the person B with reference to the person A. Similarly, the degree of empathy between the persons A and the person C can be said to be a degree of empathy of the person C with reference to the person A. That is, the degrees of empathy of the persons B and C, who are target persons, are displayed on the presenter 205. In the example shown in FIG. 4, degrees of empathy of a plurality of target persons are displayed as a list of the person identifying images P of those target persons.

By performing an operation such as the aforementioned drag and drop, the user may select the person identifying images P of all persons participating in online communication and place the person identifying images P in the target person frame W2. Further, a button for selecting the person identifying images P of all the persons en bloc and placing the person identifying images P in the target person frame W2, for example, may be displayed in the setting screen image Ia as a graphic image for use in the GUI.

Thus, in the server 100 according to the present embodiment, the server communicator 104 acquires biological information of each of a plurality of persons. Then, on the basis of the acquired biological information and for each of at least one target person of the plurality of persons, the degree-of-empathy analyzer 101 derives a degree of empathy between a reference person of the plurality of persons and that target person. Then, the presentation processor 105 generates and outputs empathy presentation information that indicates the degree of empathy of each of the at least one derived target person according to a mode of presentation of the degree of empathy. The outputted empathy presentation information is sent by the server communicator 104 to the terminal device 200.

As a result of this, in online communication, a degree of empathy of at least one participant each selected as a target person can be displayed according to a display mode (i.e. a mode of presentation) selected, for example, by the user. Accordingly, the user can easily grasp the degree of empathy and can perform communication as a participant with reference to the degree of empathy. That is, the participant can grasp, for example, how much another participant empathizes with still another participant or how much another participant empathizes with him/her. As a result of that, the participant can more smoothly perform communication. Further, even in a case where a speaker delivers a message to a large number of listeners, a degree of empathy between the speaker and each listener can be presented. As a result of that, the speaker can easily grasp whether the listeners understand the content of the speaker's message, can adjust the content of the message on the basis of the outcome, and can more smoothly perform communication.

In a case where the presentation processor 105, which is provided in the server 100 in the present embodiment, is provided in the terminal device 200, it can be said that the terminal device 200 performs the aforementioned process. That is, in the terminal device 200 according to the present embodiment, the bioanalyzer 202 acquires biological information of each of a plurality of persons. Then, the terminal communicator 204 sends the biological information to the server 100, causes the degree-of-empathy analyzer 101 of the server 100 to derive a degree of empathy, and causes the derived degree of empathy to be sent from the server 100. Thus, the terminal device 200 uses the server 100 to execute a process of, on the basis of the acquired biological information and for each of at least one target person of the plurality of persons, deriving a degree of empathy between a reference person of the plurality of persons and that target person. Then, the presentation processor 105 generates empathy presentation information that indicates the degree of empathy of each of the at least one derived target person according to a mode of presentation of the degree of empathy, and outputs the generated empathy presentation information.

Further, in the present embodiment, for each of the at least one target person, the server 100 causes the display of the presenter 205 to display a person identifying image P for identifying that target person. This can make it easy to visually understand who the target person is.

Further, displaying the person identifying image P includes displaying an arrangement of the respective person identifying images P of the at least one target person. Moreover, in the arrangement, the respective person identifying images P of the at least one target person are listed in order of degree of empathy of the at least one target person according to the mode of presentation such as the display mode "LIST". Specifically, in the arrangement, the person identifying image P of the target person with a higher degree of empathy is placed further forward in the arrangement. This makes it possible to display a degree of empathy between the reference person and each of the at least one target person as a degree of empathy of that target person in an easy-to-understand manner. That is, the user can easily grasp, from a list of one or more person identifying images P being displayed, degrees of empathy of those target persons.

Figure 5:
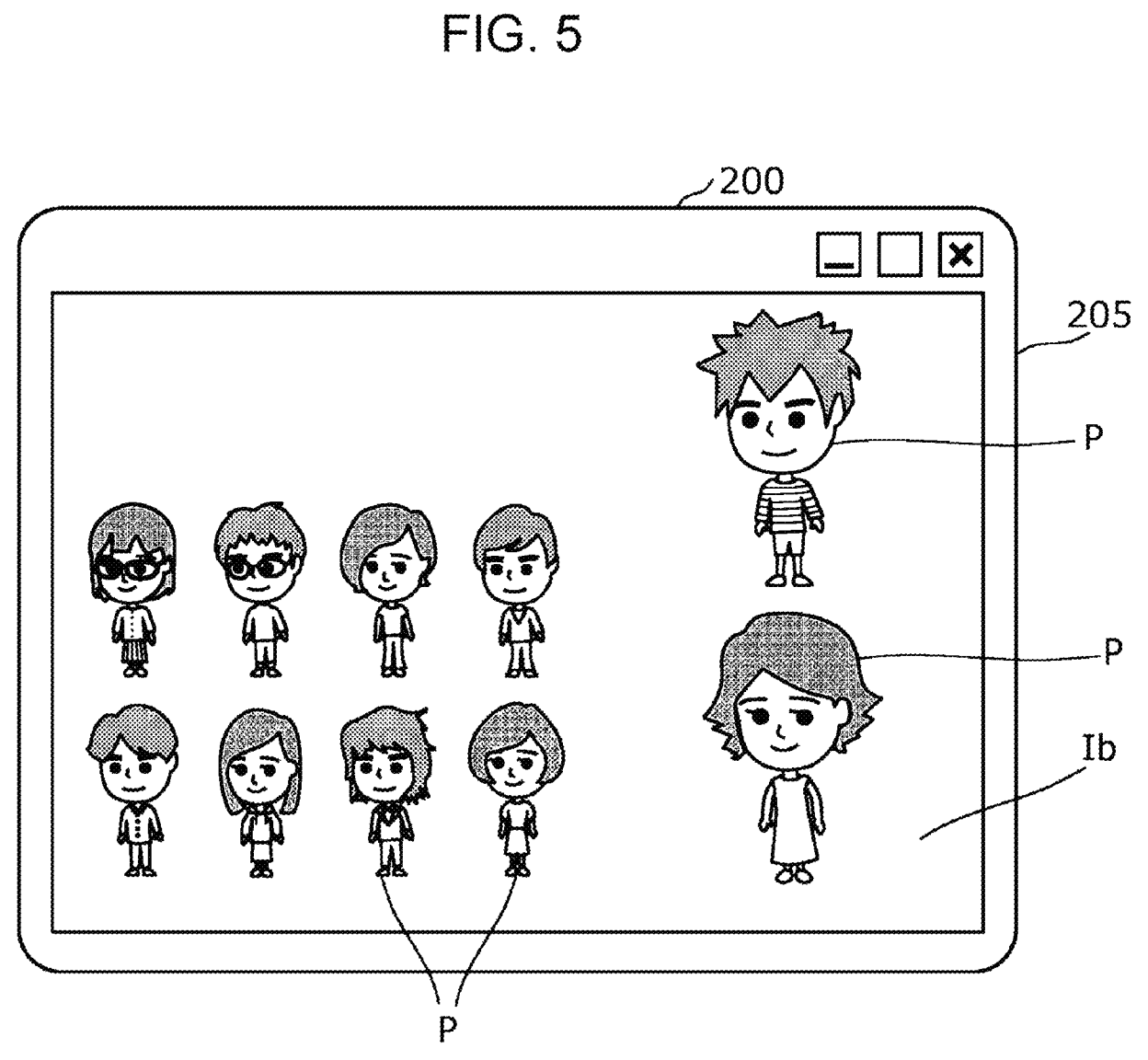

FIG. 5 is a diagram showing another example of a display mode of displaying a degree of empathy.

In the example shown in FIG. 5, the empathy presentation information is generated according to the display mode "SIZE" selected in the setting screen image Ia. When the terminal communicator 204 receives the empathy presentation information from the server 100, the terminal controller 206 of the terminal device 200 causes the presenter 205 to display, for example, a display screen image Ib shown in FIG. 5 on the basis of the empathy presentation information.

In the display screen image Ib shown in FIG. 5, the person identifying image P of each of the plurality of target persons selected in the setting screen image Ia is displayed. Further, the person identifying image P is displayed in a size that corresponds to a degree of empathy of a target person who corresponds to the person identifying image P.

Thus, in displaying a person identifying image P according to the present embodiment, the server 100 causes the presenter 205 of the terminal device 200 to display the person identifying image P of each of the at least one target person according to a mode of presentation such as the display mode "SIZE" in a size that corresponds to a degree of empathy of that target person. Specifically, the person identifying image P is displayed in a larger size when the target person identified by the person identifying image P has a higher degree of empathy. Even this case makes it possible to display a degree of empathy between the reference person and each of the at least one target person as a degree of empathy of that target person in an easy-to-understand manner. That is, the user can easily grasp, from the respective sizes of one or more person identifying images P being displayed, degrees of empathy of those target persons.

In a case where the display mode selected in the setting screen image Ia is "REALITY", the presentation processor 105 of the server 100 converts a degree of representational accuracy of the person identifying image P of each of the plurality of target persons into a degree of representational accuracy that corresponds to a degree of empathy of that target person. Specifically, the presentation processor 105 converts a degree of representational accuracy of the person identifying image P of a target person with a higher degree of empathy into a higher degree of representational accuracy. That is, the presentation processor 105 acquires a photographic image of a target person from the server storage 110 and performs a process of making the person identifying image P of the target person more similar to or less similar to the photographic image so that a degree of representational accuracy of the person identifying image P matches a degree of representational accuracy that corresponds to a degree of empathy.

The process of making a person identifying image P more similar to a photographic image is also called a "process of making a person identifying image P closer to a photographic image". Further, the aforementioned degree of representational accuracy is also called an "extent of reality". When the person identifying image P of a target person has a higher degree of representational accuracy, i.e. a larger extent of reality, the person identifying image P is more quite similar to a photographic image of the target person. Further, a photographic image of each of the plurality of target persons is stored in the server storage 110 in association with a user ID of that target person.

Moreover, the server controller 106 causes empathy presentation information that indicates the person identifying images P of the plurality of target persons with converted degrees of representational accuracy to be sent from the server communicator 104 to the terminal device 200. When the terminal communicator 204 receives the empathy presentation information, the terminal controller 206 of the terminal device 200 causes the presenter 205 to display, according to the empathy presentation information, a display screen image Ib containing the person identifying images P of the plurality of target persons.

The user can easily grasp, from a degree of representational accuracy (i.e. an extent of reality) of a person identifying image P that is displayed on the presenter 205, a degree of empathy of the target person of the person identifying image P. That is, the user can easily grasp that the degree of empathy of the target person is high if the person identifying image P is similar to a photographic image of the target person, i.e. if the person identifying image P is close to the photographic image of the target person.

In a case where the person identifying image P is generated by processing the photographic image of the target person, the aforementioned degree of representational accuracy is higher when an extent of processing of the photographic image is smaller, and is lower when the extent of processing is larger. In such a case, when the degree of representation accuracy of the person identifying image P of the target person is higher, i.e. when the extent of processing is smaller, the person identifying image P is more quite similar to the photographic image of the target person. For example, the presentation processor 105 generates a person identifying image P of a target person by processing, with an application program, a photographic image of the face of the target person as stored in the server storage 110. Moreover, every time a degree of empathy of the target person is derived by the degree-of-empathy analyzer 101, the presentation processor 105 reprocesses the photographic image to an extent of processing that corresponds to the degree of empathy. For example, when the degree of empathy is higher, the presentation processor 105 processes the photographic image to a smaller extent of processing. This causes the degree of representation accuracy of the person identifying image P to be converted. Further, in the server storage 110, for each of the plurality of target persons, a plurality of person identifying images P that are different in degree of representational accuracy from each other may be stored in association with a user ID of that target person. In this case, the presentation processor 105 converts a degree of representational accuracy of a person identifying image P of a target person by replacing the person identifying image P with a person identifying image P whose degree of representational accuracy corresponds to a degree of empathy.

Thus, in displaying a person identifying image P according to the present embodiment, the server 100 causes the presenter 205 of the terminal device 200 to display the person identifying image P of each of the at least one target person according to a mode of presentation such as the display mode "REALITY" with a degree of representational accuracy that corresponds to a degree of empathy of that target person. The degree of representational accuracy of the person identifying image P is the extent to which the person identifying image P is similar to a photographic image of the target person identified by the person identifying image P. Specifically, the person identifying image P is displayed with a higher degree of representational accuracy when the target person identified by the person identifying image P has a higher degree of empathy. This makes it possible to display a degree of empathy between the reference person and each of the at least one target person as a degree of empathy of that target person in an easy-to-understand manner. That is, the user can easily grasp, from the respective degrees of representational accuracy of one or more person identifying images P being displayed, degrees of empathy of those target persons.

Figure 6:
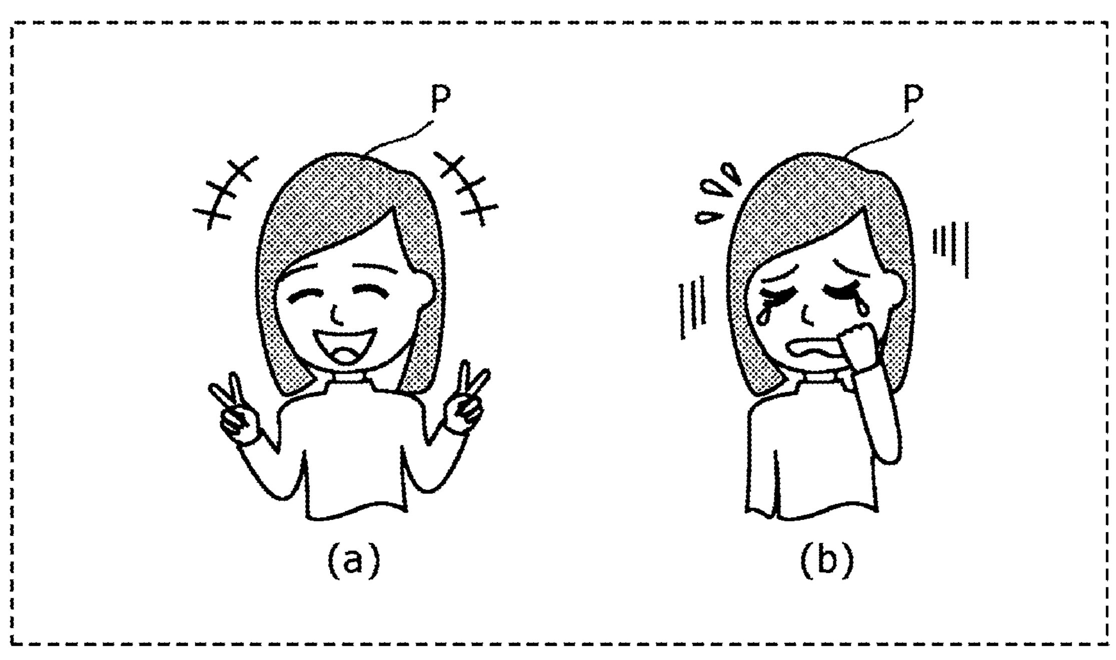
FIG. 6 illustrates diagrams showing another example of a display mode of displaying a degree of empathy according to the embodiment.

FIG. 6 illustrates diagrams showing another example of a display mode of displaying a degree of empathy.

In the example shown in FIG. 6, the empathy presentation information is generated according to the display mode "ACTION" selected in the setting screen image Ia. When the terminal communicator 204 receives the empathy presentation information from the server 100, the terminal controller 206 of the terminal device 200 causes the presenter 205 to display, for example, a person identifying image P shown in FIG. 6 on the basis of the empathy presentation information. Specifically, as shown in (a) of FIG. 6, when a degree of empathy of a target person is higher, a person identifying image P expressing an action of having a bigger laugh is displayed. Alternatively, when the degree of empathy of the target person is higher, a person identifying image P expressing an action of giving a bigger nod may be displayed. On the other hand, as shown in (b) of FIG. 6, when the degree of empathy of the target person is lower, a person identifying image P expressing an action of weeping bitterly is displayed. Alternatively, a person identifying image P expressing a type of action that correspond to the degree of empathy of the target person may be displayed.

A person identifying image P expressing an action is generated by the presentation processor 105 of the server 100. For example, in the server storage 110 of the server 100, for each of the plurality of target persons, a plurality of person identifying images P that are different in action from each other may be stored in association with a user ID of that target person. In this case, the presentation processor 105 replaces a person identifying image P of the target person with a person identifying image P expressing an action that corresponds to a degree of empathy. Further, a person identifying image P expressing an action may be a still image or an animated image.

Thus, in displaying a person identifying image P according to the present embodiment, the server 100 causes the presenter 205 of the terminal device 200 to display the person identifying image P of each of the at least one target person according to a mode of presentation such as the display mode "ACTION" so that the person identifying image P expresses an action that corresponds to a degree of empathy of that target person.

Although, in the aforementioned example, the presenter 205 is composed of the display and the loudspeaker of the terminal device 200, the presenter 205 may include a device communicably connected to the terminal device 200.

Figure 7:
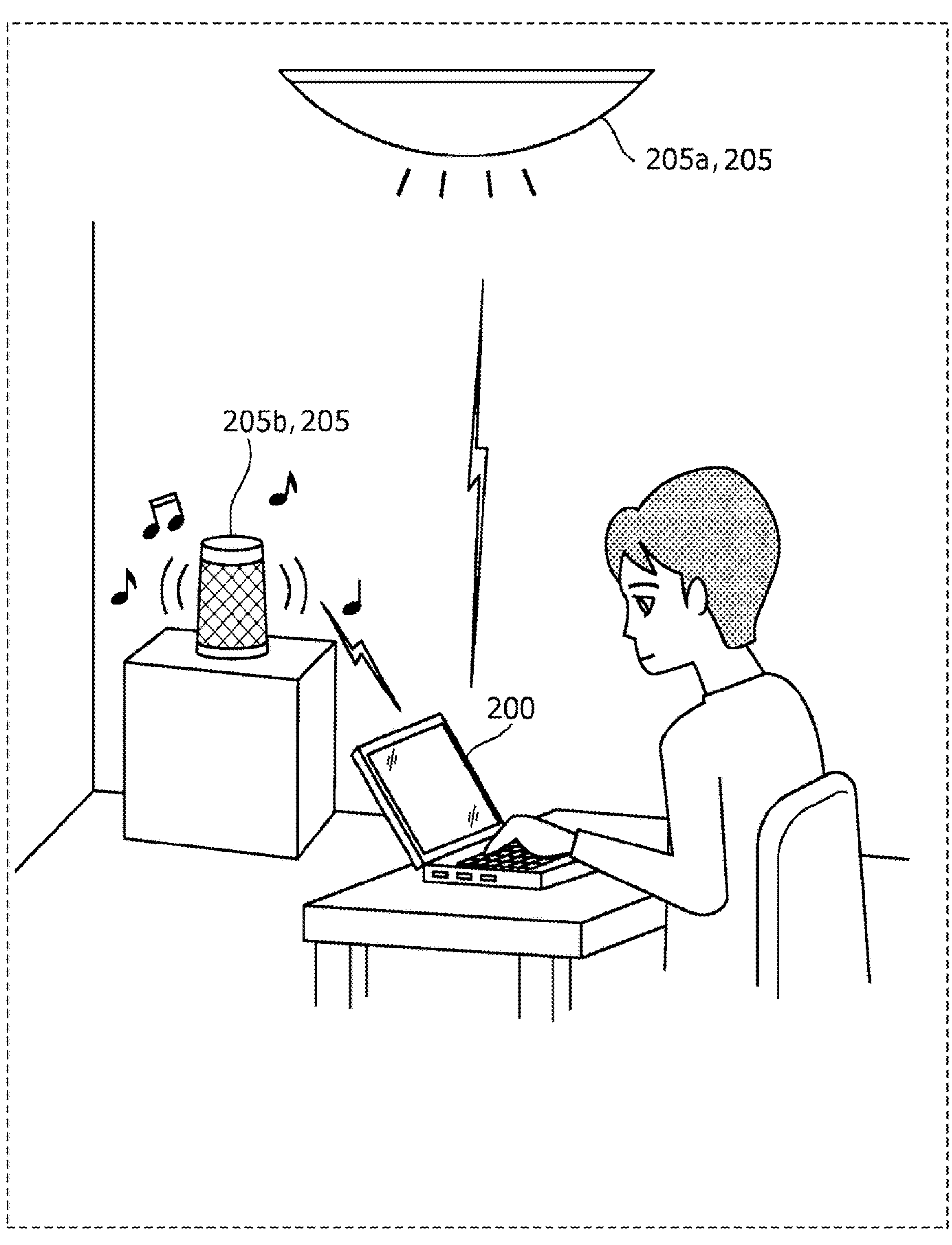
FIG. 7 is a diagram for explaining an example of a method for presentation other than a displaying of a degree of empathy according to the embodiment.

FIG. 7 is a diagram for explaining an example of a method for presentation other than a displaying of a degree of empathy.

The presenter 205 may include, for example, at least either a lighting device 205*a* or a smart speaker 205*b*. The lighting device 205*a* is attached to the ceiling of a room in which the terminal device 200 is installed for operation by the user, and illuminates the room. The smart speaker 205*b* is disposed in the room. The terminal communicator 204 of the terminal device 200 performs wireless communication with the lighting device 205*a* and the smart speaker 205*b*. This wireless communication may be performed by Wi-Fig (registered trademark), Bluetooth (registered trademark), ZigBee (registered trademark), or specified low power radio, or may be another mode of communication. Further, instead of the wireless communication, wired communication may be performed.

When the terminal communicator 204 receives empathy presentation information from the server 100, the terminal controller 206 of the terminal device 200 causes a light control signal representing a brightness level that corresponds to a degree of empathy indicated by the empathy presentation information to be sent from the terminal communicator 204 to the lighting device 205*a*. In a case where a plurality of target persons are selected, the degree of empathy indicated by the empathy presentation information may be the average of degrees of empathy of the plurality of target persons. Upon receiving the light control signal, the lighting device 205*a* emits light at the brightness level represented by the light control signal. Alternatively, when the terminal communicator 204 receives empathy presentation information from the server 100, the terminal controller 206 of the terminal device 200 causes a sound signal representing a sound that corresponds to a degree of empathy indicated by the empathy presentation information to be sent from the terminal communicator 204 to the smart speaker 205*b*. Upon receiving the sound signal, the smart speaker 205*b* outputs the sound represented by the sound signal. The sound signal may be a signal representing a sound level. In this case, upon receiving the sound signal, the smart speaker 205*b* outputs the sound at the sound level represented by the sound signal.

Accordingly, in the example shown in FIG. 7, the user can be effectively notified of a degree of empathy of a target person for a reference person by letting the degree of empathy intervene in a real environment of the user of the terminal device 200, who is the reference person for example. That is, the real environment is controlled according to the degree of empathy. As a result of that, the degree of empathy can be more easily fed back to the reference person.

Thus, in the present embodiment, according to a mode of presentation such as intervention of a degree of empathy in a real environment, the server 100 causes a device situated in an area around the user, such as the lighting device 205*a* or the smart speaker 205*b*, to adjust the user's environment to an environment that corresponds to the degree of empathy of each of the at least one target person. This makes it possible to adjust the user's real environment according to the degree of empathy and present the degree of empathy to the user in a more easy-to-understand manner.

The device that adjusts an environment is not limited to the lighting device 205*a* or a sound device such as the smart speaker 205*b* but may be a smartphone, a mouse, or other devices. For example, the smartphone or the mouse makes vibrations of magnitudes that correspond to a degree of empathy indicated by empathy presentation information. Further, in a case where the user of the terminal device 200 is selected as a target person, the terminal device 200 may cause a device situated in an area around the user, who is the target person, to execute an adjustment of an environment according to a degree of empathy between the target person and the reference person.

Figure 8:
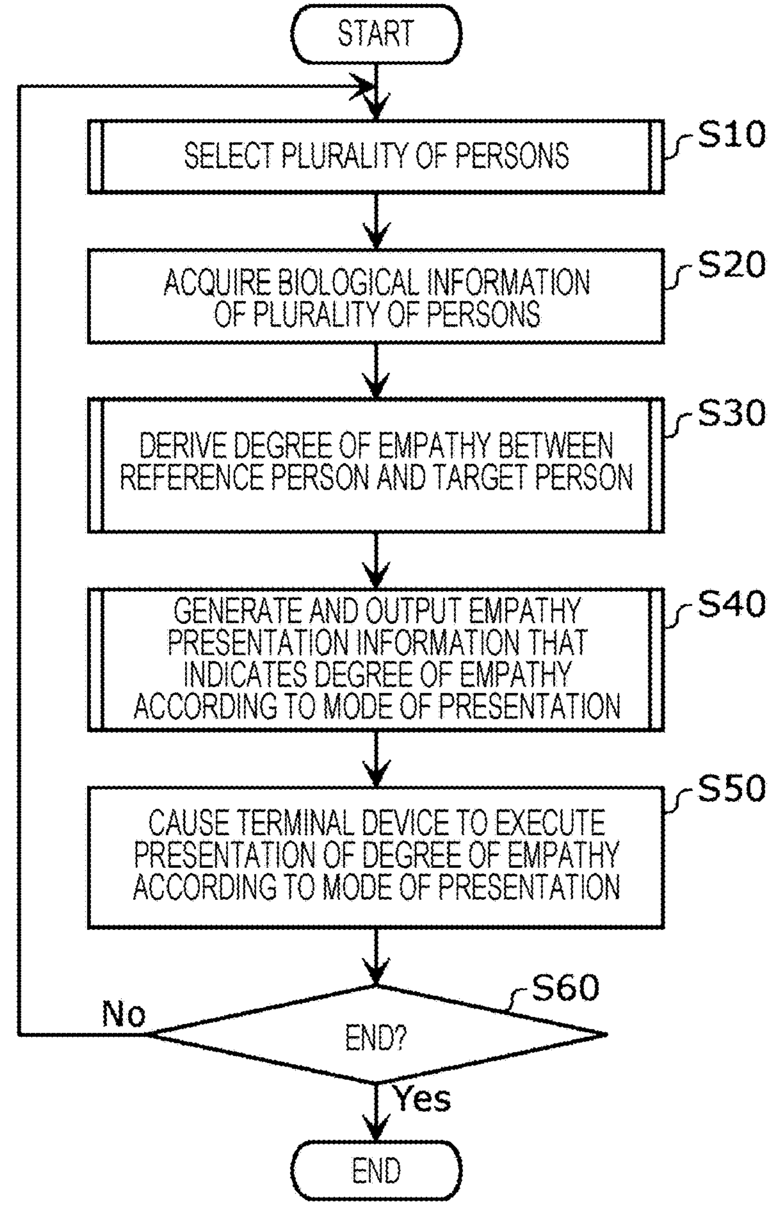
FIG. 8 is a flow chart showing an example of a processing operation of the server according to the embodiment.

FIG. 8 is a flow chart showing an example of a processing operation of the server 100.

First, the server controller 106 of the server 100 executes a person selecting process on the basis of an input operation carried out by a user on a terminal device 200. In this person selecting process, the server controller 106 selects, from all participants in online communication, a plurality of persons including a reference person and at least one target person (step S10). Next, the server communicator 104 acquires biological information of the plurality of persons (step S20).

Next, the degree-of-empathy analyzer 101 derives a degree of empathy between the reference person and each of the at least one target person on the basis of the biological information acquired in step S20 (step S30). Then, the presentation processor 105 generates and outputs empathy presentation information that indicates the derived degree of empathy according to a mode of presentation (step S40).

The server controller 106 causes the outputted empathy presentation information to be sent from the server communicator 104 to the terminal device 200. This terminal device 200 is the terminal device 200 that accepted the input operation carried out by the user in step S10. By sending such empathy presentation information, the server controller 106 causes the presenter 205 of the terminal device 200 to execute a presentation of the degree of empathy according to the mode of presentation (step S50).

After step S50, the server controller 106 determines whether to end the process of online communication (step S60). When the server controller 106 determines that the process of online communication should not end (No in step S60), the server controller 106 causes each constituent element of the server 100 to execute the process from step S10. When the process in step S10 is repeatedly executed, a new person may be selected as a reference person or a target person, or a selected reference person or a selected target person may be deselected. Alternatively, without such a new selection or a deselection being made in step S10, the process from step S20 on may be repeatedly executed on the basis of an already selected reference person or target person. On the other hand, when the server controller 106 determines that the process of online communication should end (Yes in step S60), the server controller 106 ends the process of online communication.

Figure 9:
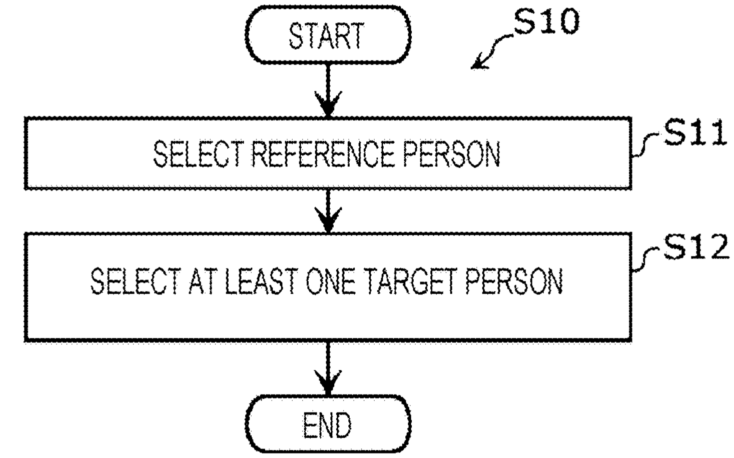
FIG. 9 is a flow chart showing an example of a person selecting process of the server according to the embodiment.

FIG. 9 is a flow chart showing an example of a person selecting process of the server 100. That is, FIG. 9 is a flow chart showing details of the process in step S10 of FIG. 8.

The server controller 106 selects a reference person from all participant in online communication on the basis of reference person information that is sent from the terminal device 200 (step S11). Then, the server controller 106 selects a target person from all the participants on the basis of target person information that is sent from the terminal device 200 (step S12). At this point in time, in a case where plural pieces of target person information are sent from the terminal device 200, the server controller 106 selects a plurality of target persons. Such steps S11 and S12 cause a plurality of persons including a reference person and at least one target person to be selected.

Figure 10:
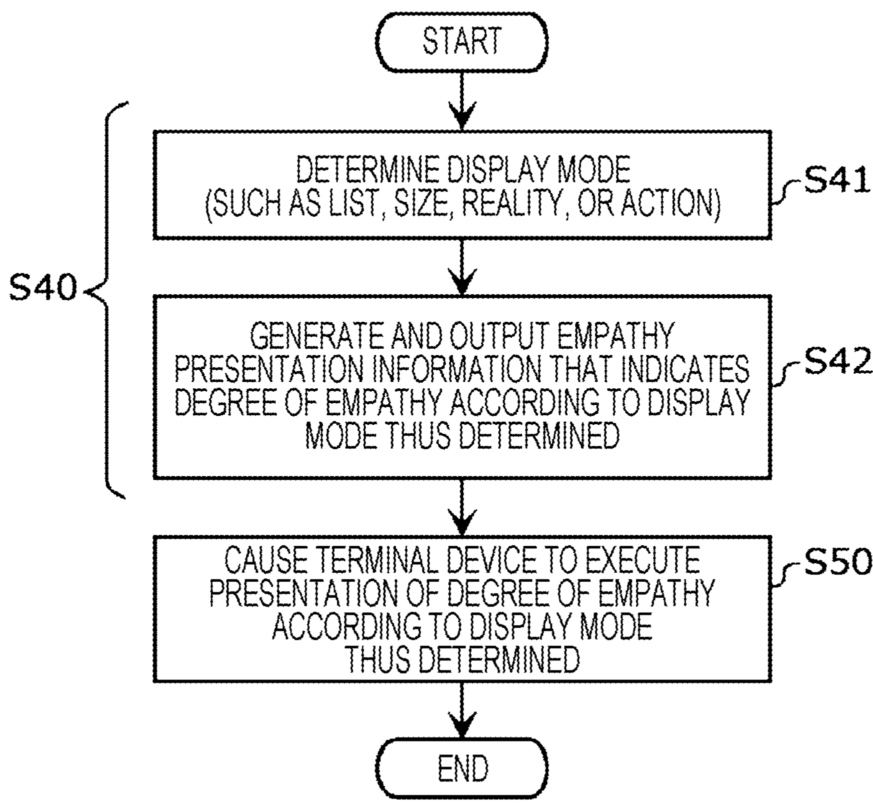
FIG. 10 is a flow chart showing an example of part of the processing operation of the server according to the embodiment.

FIG. 10 is a flow chart showing an example of part of the processing operation of the server 100. Specifically, FIG. 10 is a flow chart showing details of the process in steps S40 and S50 of FIG. 8.

In step S40, first, the presentation processor 105 determines one display mode as a mode of presentation of the degree of empathy from among a plurality of display modes of the degree of empathy on the basis of display mode information sent from the terminal device 200 and received by the server communicator 104 (step S41). In the example shown in FIG. 3, the plurality of display modes are "LIST", "SIZE", "REALITY", and "ACTION".

Next, the presentation processor 105 generates and outputs empathy presentation information that indicates the degree of empathy according to the display mode determined in step S41 (step S42).

The server controller 106 causes the outputted empathy presentation information to be sent from the server communicator 104 to the terminal device 200. By sending such empathy presentation information, the server controller 106 causes the presenter 205 of the terminal device 200 to execute a presentation of the degree of empathy according to the determined display mode (step S50).

Figure 11:
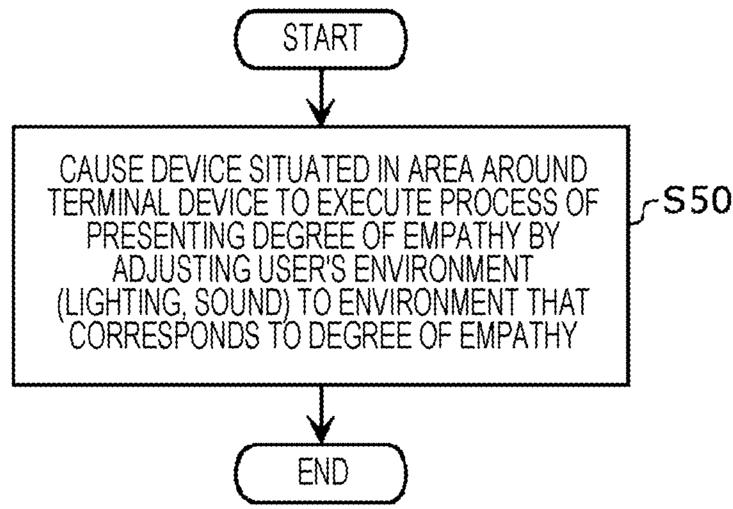
FIG. 11 is a flow chart showing an example of part of the processing operation of the server according to the embodiment.

FIG. 11 is a flow chart showing an example of part of the processing operation of the server 100. Specifically, FIG. 11 is a flow chart showing other details of the process in step S50 of FIG. 8.

By causing the empathy presentation information to be sent from the server communicator 104 to the terminal device 200, the server controller 106 controls, via the terminal device 200, a device situated in an area around the terminal device 200, i.e. a device situated in an area around the user of the terminal device 200. In the example shown in FIG. 7, the device is the lighting device 205*a*, the smart speaker 205*b*, or other devices. That is, the server controller 106 causes the device to execute a process of presenting the degree of empathy to the user by adjusting the user's environment (such as brightness of light or sound) to an environment that corresponds to the degree of empathy.

Degree-of-Empathy Analyzer

In the following, specific aspects of the degree-of-empathy analyzer 101 according to the present embodiment are described in detail with the inclusion of the processing operation of the sensor 201 and the bioanalyzer 202 of each terminal device 200.

Aspect 1 of Degree-of-Empathy Analyzer

Figure 12:
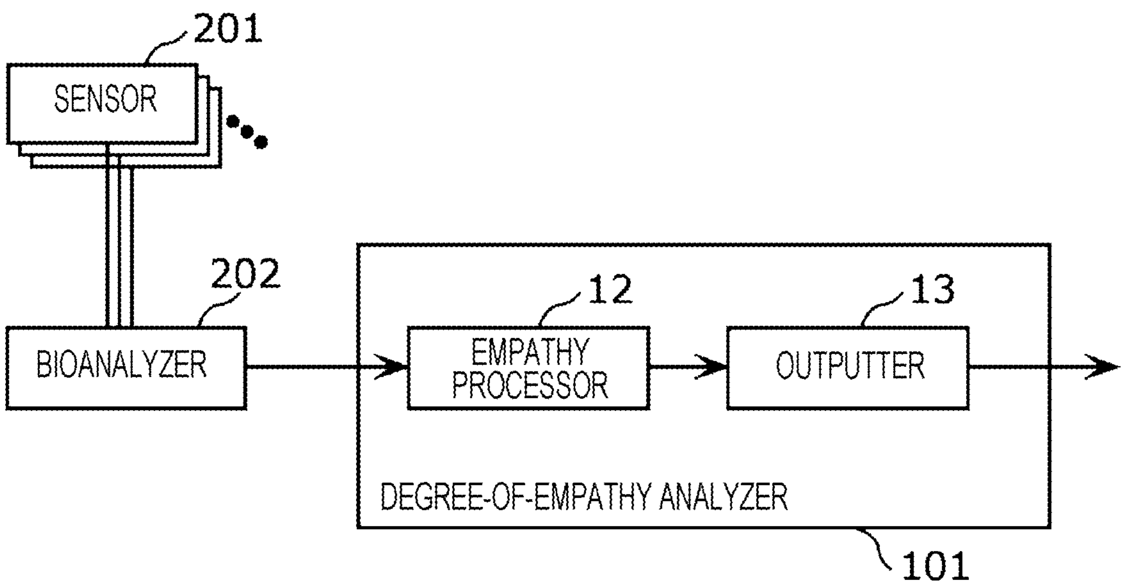
FIG. 12 is a block diagram showing a configuration of a degree-of-empathy analyzer according to Aspect 1 of the embodiment.

FIG. 12 is a block diagram showing a configuration of a degree-of-empathy analyzer 101 according to the present aspect.

The degree-of-empathy analyzer 101 according to the present aspect estimates a degree of empathy between a plurality of persons on the basis of sensing information of the plurality of persons as obtained by a plurality of sensors 201. Such a degree-of-empathy analyzer 101 according to the present aspect includes an empathy processor 12 and an outputter 13.

The bioanalyzer 202 of a terminal device 200 acquires information on the heartbeat of each of the plurality of persons as heartbeat information. This heartbeat information is an example of the aforementioned biological information. Specifically, the bioanalyzer 202 acquires the sensing information of each of the plurality of persons from the plurality of sensors 201 and, by analyzing the sensing information, acquires heartbeat information of that person from the sensing information. Each of the sensors 201 includes, for example, a camera that, by photographing a person, generates a facial image of the person as sensing information. The facial image is, for example, a moving image showing the face of the person. In this case, the bioanalyzer 202 acquires, by video pulse wave extraction from the facial image, heartbeat information that indicates the RRI, heart rate, or heartbeat fluctuation of the person. That is, the bioanalyzer 202 acquires the heartbeat information on the basis of a change in chromaticity of the skin of the face of the person shown in the facial image. The RRI, the heart rate, or the heartbeat fluctuation indicated by the heartbeat information may be an average taken over a period of approximately 1 to 5 minutes.

The RRI is a heartbeat interval (R-R interval) that is an interval between the peaks of two consecutive heartbeat R waves.

The hear rate is, for example, the number of pulsations per minute, and is a number that is calculated by dividing 60 seconds by the number of seconds of RRI.

The heartbeat fluctuation is, for example, a coefficient of variation of R-R intervals (CvRR). The CvRR is a coefficient of variation of heartbeat variation and is calculated, for example, by "CvRR=Standard Deviation SD of RRI over Given Period of Time)/(Average of RRIs over Given Period of Time)". That is, the CvRR is calculated by normalizing the standard deviation SD of RRI over a given period of time by the average of RRIs over the given period of time.

The heartbeat fluctuation may be a high frequency (HF) or a low frequency (LF). The HF and the LF are calculated from power spectra obtained by conducting frequency analyses of equally spaced time-series data of RRI with the use of fast Fourier transform (FFT). The HF is the integral of a power spectrum in a high-frequency domain of 0.14 Hz to 0.4 Hz and is considered to reflect an amount of parasympathetic activity. Further, the LF is the integral of a power spectrum in a low-frequency domain of 0.04 Hz to 0.14 Hz and is considered to reflect amounts of sympathetic and parasympathetic activity. The FFT frequency transform may be performed at intervals of five seconds.

The sensor 201 is not limited to the camera but may include a wearable device that measures an electrocardiogram or a pulse wave. The wearable device includes a phototransistor and a photodiode and may measure a pulse wave by measuring a change in the amount of blood in blood vessels with reflected light or transmitted light. Moreover, the wearable device outputs a result of measurement of the pulse wave as sensing information to the bioanalyzer 202. The bioanalyzer 202 acquires, from such sensing information, heartbeat information that indicates the RRI, heart rate, or CvRR of the person.

The empathy processor 12 derives the degree of empathy between the plurality of persons on the basis of a correlation between changes in heartbeat information of the plurality of persons as acquired by the bioanalyzer 202.

The outputter 13 outputs degree-of-empathy information that indicates the degree of empathy derived by the empathy processor 12.

FIG. 13 illustrates diagrams for explaining examples of pieces of heartbeat information of two persons that are acquired by the bioanalyzer 202 and a correlation between those pieces of heartbeat information. Specifically, (a) of FIG. 13 is a graph showing the heart rates of a person A and a person B in a predetermined period of time, and (b) of FIG. 13 shows a relationship between a coefficient of correlation between the pieces of heartbeat information of the plurality of persons and correlation strength.

As shown in FIG. (a) of 13, the bioanalyzer 202 acquires the heart rate of the person A and the heart rate of the person B as heartbeat information. The graph shown in FIG. (a) of 13 has a horizontal axis representing the heart rate of the person A and a vertical axis representing the heart rate of the person B. Further, the graph shown in (a) of FIG. 13 contains dots each of which indicates the heart rates of the persons A and B at substantially the same timing.

For example, for each period of 30 seconds to 2 minutes, the empathy processor 12 analyzes a correlation of heartbeat information between the person A and the person B in that period. That is, the empathy processor 12 periodically performs a process of calculating a coefficient of correlation from time-series data of the heart rates of the persons A and B. As a result of this, temporal changes in coefficient of correlation are grasped.

The empathy processor 12 derives a degree of empathy between the person A and the person B from the calculated coefficient of correlation. For example, in a case where the sign of the coefficient of correlation between the person A and the person B is positive and the coefficient of correlation is higher than a threshold, the empathy processor 12 derives a degree of empathy that indicates that the person A and the person B empathize with each other.

As shown in (b) of FIG. 13, a relationship between a coefficient of correlation r and correlation strength may be used. For example, in a case where the coefficient of correlation r is lower than or equal to 0.2, the coefficient of correlation indicates that there is almost no correlation. Further, in a case where the coefficient of correlation r is higher than 0.2 and lower than or equal to 0.4, the coefficient of correlation r indicates that there is a weak correlation. Moreover, in a case where the coefficient of correlation r is higher than 0.4 and lower than or equal to 0.7, the coefficient of correlation r indicates that there is a correlation.

Accordingly, in a case where the coefficient of correlation is higher than 0.4, the empathy processor 12 may derive a degree of empathy that indicates that the person A and the person B empathize with each other. In this case, the threshold is 0.4. The empathy processor 12 may use the threshold to derive a degree of empathy that assumes one or the other of two values of 0 and 1. That is, in a case where the coefficient of correlation is higher than the threshold, the empathy processor 12 derives Degree of Empathy=1, which indicates that the person A and the person B empathize with each other, and in a case where the coefficient of correlation is lower than or equal to the threshold, the empathy processor 12 derives Degree of Empathy=0, which indicates that the person A and the person B do not empathize with each other.

Further, as shown in (b) of FIG. 13, the empathy processor 12 may derive, as a degree of empathy, any one of five levels that correspond to values of the coefficient of correlation. For example, the five levels are set for the coefficient of correlation r such that Level 1<Level 2<Level 3<Level 4<Level 5. In such a case, the empathy processor 12 derives Level 3 as a degree of empathy, for example, if the coefficient of correlation r is higher than 0.4 and lower than or equal to 0.7. Alternatively, the empathy processor 12 may derive, as a degree of empathy, a value obtained by multiplying the coefficient of correlation by 100 or any of numerical values 0 to 100 obtained by inputting the coefficient of correlation to a transfer function.

Figure 14A:
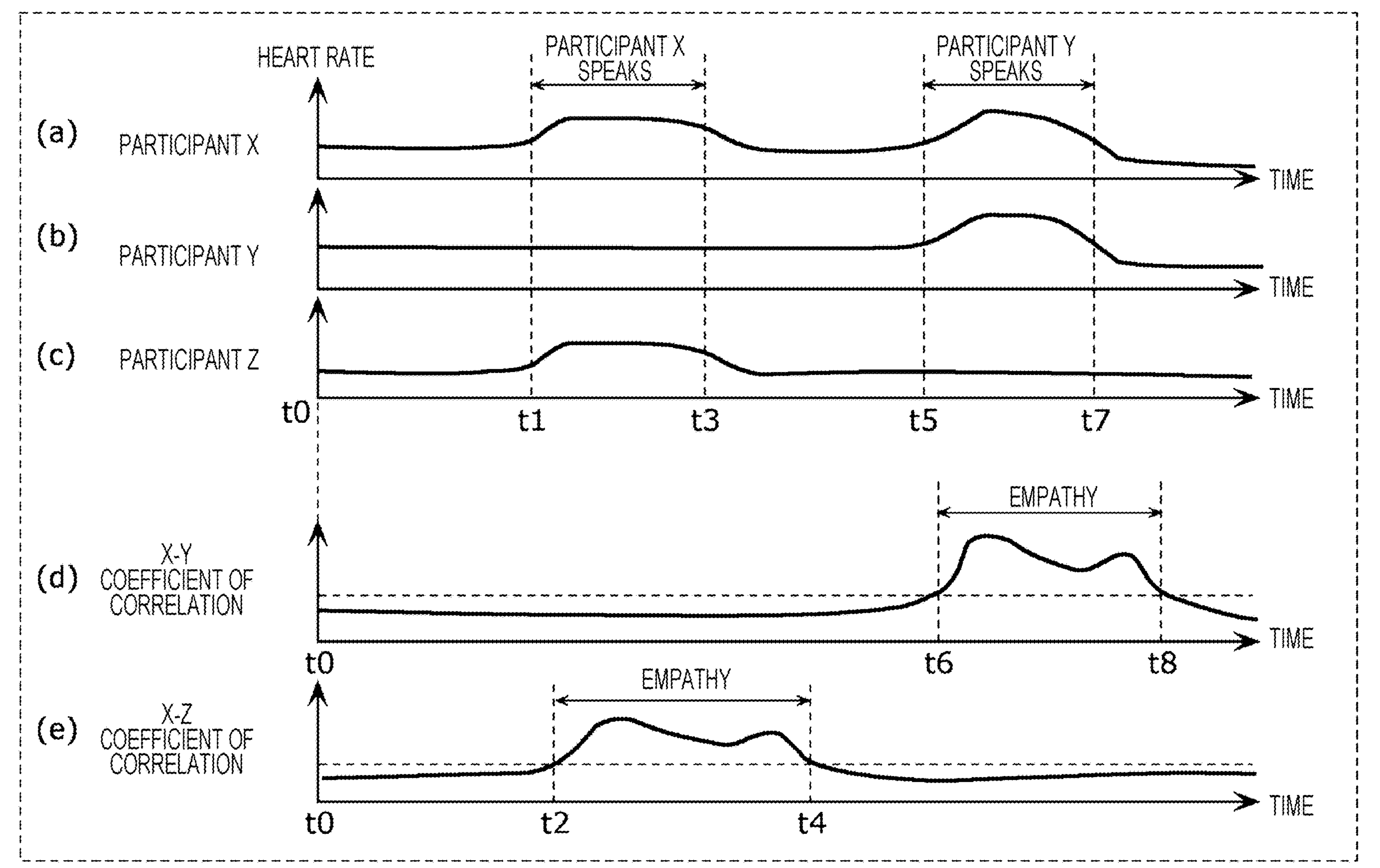
FIG. 14A is a diagram showing temporal changes in heart rate of participants in online communication and temporal changes in coefficient of correlation between two participants according to Aspect 1 of the embodiment.

FIG. 14A is a diagram showing temporal changes in heart rate of participants in online communication and temporal changes in coefficient of correlation between two participants. Specifically, (a) to (c) of FIG. 14A are graphs showing temporal changes in heart rate indicated by heartbeat information of participants X, Y, and Z, respectively. Each of these graphs has a horizontal axis representing time and a vertical axis representing the heart rate. Further, (d) of FIG. 14A is a graph showing temporal changes in coefficient of correlation between the participant X and the participant Y, and (e) of FIG. 14A is a graph showing temporal changes in coefficient of correlation between the participant X and the participant Z. Each of these graphs has a horizontal axis representing time and a vertical axis representing the coefficient of correlation.

When a conference is being held, the bioanalyzer 202 periodically acquires heartbeat information that indicates the hear rates of the participants X, Y, and Z as shown in (a) to (c) of FIG. 14A. On the basis of the heartbeat information of the participants X and Y, the empathy processor 12 periodically calculates the coefficient of correlation between the participant X and the participant Y shown in (d) of FIG. 14A. Similarly, on the basis of the heartbeat information of the participants X and Z, the empathy processor 12 periodically calculates the coefficient of correlation between the participant X and the participant Z shown in (e) of FIG. 14A.

For example, as shown in (a) to (c) of FIG. 14A, when the participant X speaks during times t1 to t3, the heart rates of the participants X and Z rise in the period during which the participant X is speaking, and the heart rate of the participant Y hardly changes in the period. In such a case, as shown in (e) of FIG. 14A, the coefficient of correlation between the participant X and the participant Z becomes higher than the threshold during times t2 to t4 that correspond to the period. Accordingly, the empathy processor 12 derives a degree of empathy that indicates that the participant X and the participant Z empathize with each other during the times t2 to t4. That is, the empathy processor 12 estimates that the participant X and the participant Z empathize with each other during the times t2 to t4. On the other hand, as shown in (d) of FIG. 14A, the coefficient of correlation between the participant X and the participant Y is lower than or equal to the threshold even while the participant X is speaking. Accordingly, the empathy processor 12 derives a degree of empathy that indicates that the participant X and the participant Y do not empathize with each other in the period during which the participant X is speaking. That is, the empathy processor 12 estimates that the participant X and the participant Y do not empathize with each other.

Further, for example, as shown in (a) to (c) of FIG. 14A, when the participant Y speaks during times t5 to t7, the heart rates of the participants X and Y rise in the period during which the participant Y is speaking, and the heart rate of the participant Z hardly changes in the period. In such a case, as shown in (d) of FIG. 14A, the coefficient of correlation between the participant X and the participant Y becomes higher than the threshold during times t6 to t8 that correspond to the period. Accordingly, the empathy processor 12 derives a degree of empathy that indicates that the participant X and the participant Y empathize with each other during the times t6 to t8. That is, the empathy processor 12 estimates that the participant X and the participant Y empathize with each other during the times t6 to t8. On the other hand, as shown in (e) of FIG. 14A, the coefficient of correlation between the participant X and the participant Z is lower than or equal to the threshold even while the participant Y is speaking. Accordingly, the empathy processor 12 derives a degree of empathy that indicates that the participant X and the participant Z do not empathize with each other in the period during which the participant Y is speaking. That is, the empathy processor 12 estimates that the participant X and the participant Z do not empathize with each other.

The empathy processor 12 may identify a speaker by performing speaker recognition, for example, on the basis of an output signal (i.e. voice data) from the microphone of the terminal device 200. Alternatively, in a case where a user ID is associated with voice data that is sent from each terminal device 200, the empathy processor 12 may identify a speaker on the basis of the user ID. Alternatively, the empathy processor 12 may identify a speaker by performing an image recognition process on a facial image serving as sensing information that is obtained from each sensor 201. In this case, the facial image is sent from the terminal device 200 to the server 100. For example, during the times t1 to t3, the participant X is identified as a speaker. Accordingly, when the empathy processor 12 estimates that as shown in (e) of FIG. 14A, the participant X and the participant Z empathize with each other during the times t2 to t4, which partly overlap the period during which the participant X is speaking, the empathy processor 12 determines that the two persons empathize with remarks made by the participant X. In this case, a direction of empathy from the participant Z to the participant X is identified. Similarly, during the times t5 to t7, the participant Y is identified as a speaker. Accordingly, when the empathy processor 12 estimates that as shown in (d) of FIG. 14A, the participant X and the participant Y empathize with each other during the times t6 to t8, which partly overlap the period during which the participant Y is speaking, the empathy processor 12 determines that the two persons empathize with remarks made by the participant Y. In this case, a direction of empathy from the participant X to the participant Y is identified. The outputter 13 may output information (hereinafter also called "direction-of-empathy information") that indicates such a direction of empathy.

Thus, in the present aspect, the bioanalyzer 202 acquires heartbeat information of a plurality of persons during an identical period. For example, as mentioned above, the bioanalyzer 202 acquires heartbeat information of the participants X, Y, and Z during the period from the time t1 to the time t3 and acquires heartbeat information of the participants X, Y, and Z during the period from the time t5 to the time t. This makes it possible to properly estimate a degree of empathy of a plurality of persons during an identical period.

Further, instead of deriving a degree of empathy on the basis of a correlation between changes in heartbeat information, the degree-of-empathy analyzer 101 according to the present aspect may derive a degree of empathy on the basis of facial expressions of a plurality of persons.

FIG. 14B is a diagram for explaining an example of derivation of a degree of empathy based on a facial expression. (a) of FIG. 14B is a graph showing temporal changes in probability of a person A smiling. (b) of FIG. 14B is a graph showing temporal changes in probability of a person B smiling. (c) of FIG. 14B is a graph showing temporal changes in probability of a person C smiling.

For example, for each of the persons A, B, and C, the degree-of-empathy analyzer 101 acquires a facial image serving as sensing information showing the face of that person. By performing image recognition on the facial image, the empathy processor 12 identifies a facial expression of the face of the person shown in the facial image. Alternatively, by inputting the facial image to a learning model subjected to machine learning, the empathy processor 12 identifies a facial expression of the face of the person shown in the facial image. For example, the empathy processor 12 identifies a probability of smiling as the person's facial expression in chronological order.

As a result of that, for example, as shown in (a) of FIG. 14B, the probability of the person A smiling is identified as being higher than or equal to a threshold during the period from time t1 to time t2. Further, for example, as shown in (b) of FIG. 14B, the probability of the person B smiling is identified as being higher than or equal to the threshold during the period from the time t1 to time t3 and the period from time t5 to time t6. Further, for example, as shown in (c) of FIG. 14B, the probability of the person C smiling is identified as being higher than or equal to a threshold during the period from time t4 to time t7. Accordingly, the degree-of-empathy analyzer 101 determines that the person A and the person B empathize with each other during the period from the time t1 to the time t2, during which the probability of the person A smiling and the probability of the person B smiling are both higher than or equal to the threshold. Similarly, the degree-of-empathy analyzer 101 determines that the person B and the person C empathize with each other during the period from the time t5 to the time t6, during which the probability of the person B smiling and the probability of the person C smiling are both higher than or equal to the threshold. As a result of that, the degree-ofempathy analyzer 101 may derive 1 (or 100) as a degree of empathy between the person A and the person B during the period from the time t1 to the time t2 and derive 1 (or 100) as a degree of empathy between the person B and the person C during the period from the time t5 to the time t6.

Alternatively, the degree-of-empathy analyzer 101 according to the present aspect may derive a degree of empathy on the basis of facial expressions of a plurality of persons as well as a correlation between changes in heartbeat information. That is, first, as mentioned above, the empathy processor 12 identifies the facial expressions of the plurality of persons by performing image recognition on facial images. Then, the empathy processor 12 derives a degree of empathy between the plurality of persons on the basis of a correlation between changes in heartbeat information of the plurality of persons and the identified facial expressions of the plurality of persons.

For example, the empathy processor 12 identifies any of a delightful facial expression, an angry facial expression, a sorrowful facial expression, and a joyful facial expression. Alternatively, the empathy processor 12 may identify these four facial expressions as numerical values. In this case, a person's facial expression is expressed as a vector composed of four numerical values. As a result of this, the facial expressions of the plurality of persons are identified. Then, the empathy processor 12 derives a degree of similarly of the facial expressions of the plurality of persons. The degree of similarity may be derived as a numerical value of 0 to 1. The empathy processor 12 may derive a degree of empathy between the plurality of persons, for example, by multiplying the average of the degree of similarity and the coefficient of correlation by 100.

Since a degree of empathy is thus derived on the basis of facial expressions as well as a correlation between changes in heartbeat information, estimate accuracy of the degree of empathy can be improved. Further, the facial expressions of the plurality of persons can be identified from sensing information of the sensors 201 used for acquiring the heartbeat information. That is, those facial expressions are identified from video data (i.e. the aforementioned facial images) of the cameras. This makes it possible to omit a dedicated device for identifying those facial expressions. This makes it possible to simplify the entire system configuration.

Further, although, in the aforementioned example, facial expressions are identified from facial images, facial expressions may be identified from voice data. In this case, the empathy processor 12 acquires voice data that is outputted from the microphone of each terminal device 200 and, by analyzing the voice data, identifies facial expressions of the plurality of persons. The analysis may involve the use of machine learning. The facial expressions may be identified by the empathy processor 12 as mentioned above, or may be identified by the bioanalyzer 202.

Further, from the voice data, mental states such as persons' emotions such as delight, anger, sorrow, and joy, relaxation, or excitement may be estimated. For example, in a case where two participants are estimated to be in the same mental state at the same timing, the empathy processor 12 derives a high degree of empathy as a degree of empathy between the two participants.

Further, a degree of empathy may be derived using, instead of or together with facial expressions, other biological information reflecting mental states. The other biological information may be data that represents, for example, the acceleration of a person's motion, the temperature of the face, or the amount of perspiration of the hand. The temperature of the face may be measured by a thermocouple or may be measured by infrared thermography. Further, the amount of perspiration may be measured by an electrode attached to the hand. This makes it possible to further improve estimate accuracy of the degree of empathy.

Figure 15:
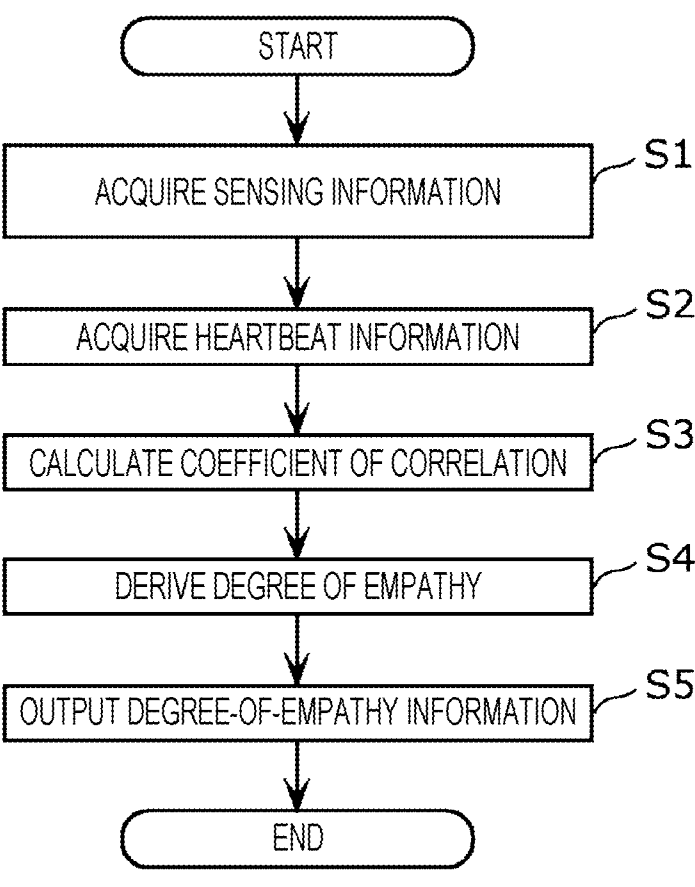
FIG. 15 is a flow chart showing a processing operation of the bioanalyzer and the degree-of-empathy analyzer according to Aspect 1 of the embodiment.

FIG. 15 is a flow chart showing a processing operation of the bioanalyzer 202 and the degree-of-empathy analyzer 101 according to the present aspect.

First, the bioanalyzer 202 acquires sensing information of each of the plurality of persons from the plurality of sensors 201 (step S1). Then, the bioanalyzer 202 acquires, from the sensing information, heartbeat information that indicates a heart rate, an RRI, or a heartbeat fluctuation (step S2). As a result of this, heartbeat information of each of the plurality of persons is acquired.

Next, the empathy processor 12 calculates a coefficient of correlation based on changes in heartbeat information of each of the plurality of persons (step S3) and derives a degree of empathy from the coefficient of correlation (step S4).

Then, the outputter 13 outputs degree-of-empathy information that indicates the derived degree of empathy (step S5).

As noted above, the degree-of-empathy analyzer 101 according to the present aspect derives a degree of empathy between a plurality of persons on the basis of a correlation between changes in heartbeat information on the heartbeat of each of the plurality of persons. Moreover, the degree-of-empathy analyzer 101 outputs degree-of-empathy information that indicates the derived degree of empathy. This makes it possible to properly estimate the degree of empathy, which is an emotional interaction that takes place between the plurality of persons.

Further, the bioanalyzer 202 according to the present aspect acquires heartbeat information that indicates a heart rate, an RRI, or a heartbeat fluctuation. However, the heartbeat information may indicate at least one of the heart rate and the heartbeat fluctuation. Alternatively, the bioanalyzer 202 may acquire heartbeat information that indicates at least two of the heart rate, the RRI, and the heartbeat fluctuation. In this case, the empathy processor 12 may calculate the average of at least two of a coefficient of correlation between heart rates, a coefficient of correlation between RRIs, and a coefficient of correlation between heartbeat fluctuations and derive a degree of empathy from the average. This makes it possible to improve estimate accuracy of the degree of empathy.

Further, although the empathy processor 12 of the degree-of-empathy analyzer 101 according to the present aspect derives a degree of empathy on the basis of a coefficient of correlation between heartbeat information of each of the plurality of persons and heartbeat information of the other, the empathy processor 12 may derive a degree of empathy on the basis of a correlation between changes in heartbeat information without calculating the coefficient of correlation. For example, the empathy processor 12 may derive a degree of empathy of the plurality of persons on the basis of a degree of coincidence of the timings of changes in heartbeat information of the plurality of persons. The timings are, for example, timings at which the heart rates or other parameters rise or fall. Further, the empathy processor 12 may derive a degree of empathy of the plurality of persons on the basis of a degree of coincidence of periods during which the heat rates of the plurality of persons are higher than reference values. The reference values are values of the heart rates set separately for each of the persons and, for example, are each the average heart rate of that person in a period during which the person is in a resting state.

Aspect 2 of Degree-of-Empathy Analyzer

A degree-of-empathy analyzer 101 according to the present aspect determines factors of stress of a plurality of persons and derives a degree of empathy between a plurality of persons on the basis of those factors. For example, heartbeat information according to the present aspect indicates an RRI and a CvRR. Moreover, an amount of change in RRI that indicates a change in RRI and an amount of change in CvRR that indicates a change in CvRR are used. For each of the plurality of persons, the degree-of-empathy analyzer 101 determines a factor of stress of that person on the basis of the amounts of change in RRI and change in CvRR of that person. Moreover, if the plurality of persons have a common factor of stress, the degree-of-empathy analyzer 101 estimates that the plurality of persons empathize with each other, as there is some correlation with the factor of stress. On the other hand, if the plurality of persons have no common factor of stress, the degree-of-empathy analyzer 101 estimates that the plurality of persons do not empathize with each other, as there is no correlation with any factor of stress.

Figure 16:
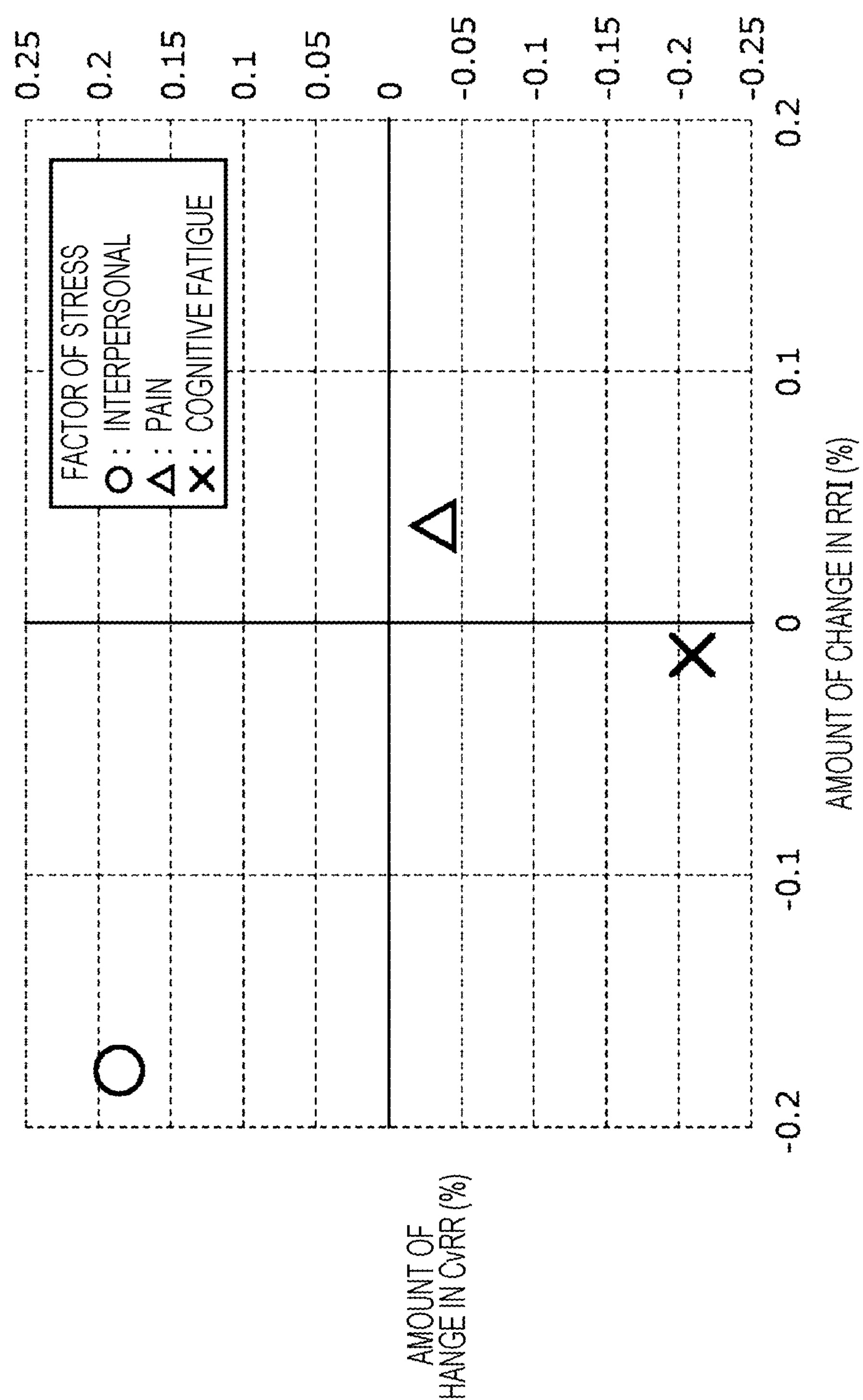
FIG. 16 is a graph obtained by an experiment and a diagram showing a relationship between amounts of change in RRI and change in CvRR and factors of stress according to Aspect 2 of the embodiment.

FIG. 16 is a graph obtained by an experiment and a diagram showing a relationship between amounts of change in RRI and change in CvRR and factors of stress. The graph shown in FIG. 16 has a horizontal axis representing the amount of change in RRI (%) and a vertical axis representing the amount of change in CvRR (%).

It is confirmed by the experiment that the amounts of change in RRI and change in CvRR of a person vary depending on factors of stress of the person. In the experiment, twenty subjects were each assigned three types of task with different factors of stress, and the RRIs and CvRRs of the subjects were measured while the subjects were executing the tasks. The three types of task are a task that causes interpersonal stress, a task that causes stress pertaining to pain, and a task that causes stress pertaining to cognitive fatigue.

The amount of change in RRI (%) was calculated according to "Amount of Change in RRI={(Average of RRIs during Execution of Task)−(Average of RRIs during Rest)}/(Average of RRIs during Rest)×100 (Formula 1)". An RRI during rest is an RRI measured for five minutes prior to execution of a task by a subject with the subject in the same position as he/she was in when executing the task. Moreover, the average of RRIs during rest is the average of RRIs over a period of 60 seconds to 240 seconds after the start of measurement. The average of RRIs during execution of the task is the average of RRIs over a period of 60 seconds to 240 seconds after the start of measurement out of RRIs measured while the subject was executing the task.

The amount of change in CvRR (%) was calculated according to "Amount of Change in CvRR={(Average of CvRRs during Execution of Task)−(Average of CvRRs during Rest)}/(Average of CvRRs during Rest)×100 (Formula 2)". A CvRR during rest is a CvRR measured for five minutes prior to execution of a task by a subject with the subject in the same position as he/she was in when executing the task. Moreover, the average of CvRRs during rest is the average of CvRRs over a period of 60 seconds to 240 seconds after the start of measurement. The average of CvRRs during execution of the task is the average of CvRRs over a period of 60 seconds to 240 seconds after the start of measurement out of CvRRs measured while the subject was executing the task.

The graph shown in FIG. 16 shows the average of the amounts of change in RRI and the average of the amounts of change in CvRR of the twenty subjects for each type of task, i.e. for each factor of stress. The circle in the graph indicates the average of the amounts of change in RRI and the average of the amounts of change in CvRR of the twenty subjects in the case of a factor of stress "INTERPERSONAL". Further, the triangle in the graph indicates the average of the amounts of change in RRI and the average of the amounts of change in CvRR of the twenty subjects in the case of a factor of stress "PAIN". Further, the X in the graph indicates the average of the amounts of change in RRI and the average of the amounts of change in CvRR of the twenty subjects in the case of a factor of stress "COGNITIVE FATIGUE".

Accordingly, the degree-of-empathy analyzer 101 according to the present aspect determines factors of stress of a plurality of persons with the use of the relationship shown in FIG. 16 between the amounts of change in RRI and change in CvRR and the factors of stress. As in the case of Aspect 1, the degree-of-empathy analyzer 101 according to the present aspect is configured as shown in FIG. 12. Further, as in the case of Aspect 1, each of the sensors 201 may include a camera or may include a wearable device. The bioanalyzer 202 according to the present aspect acquires pieces of sensing information from the plurality of sensors 201 and, for each of the plurality of persons, acquires, from those pieces of sensing information, heartbeat information that indicates the RRI and CvRR of that person.

Figures 17, 18:
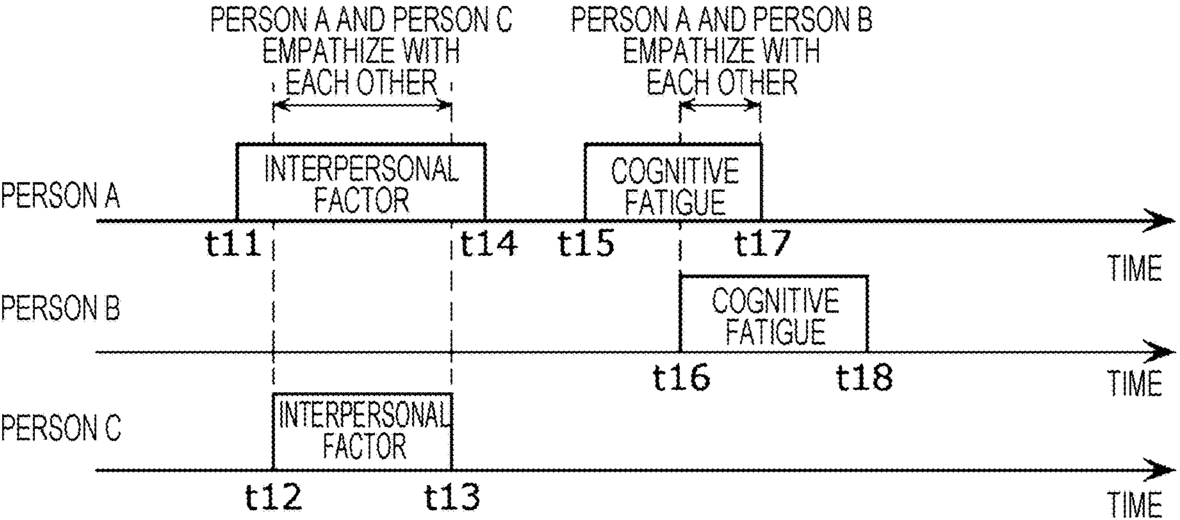
FIG. 17 is a diagram for explaining a method for determination of a factor of stress by an empathy processor according to Aspect 2 of the embodiment.
FIG. 18 is a diagram showing an example in which degrees of empathy are derived from factors of stress of a plurality of persons according to Aspect 2 of the embodiment.

FIG. 17 is a diagram for explaining a method for determination of a factor of stress by an empathy processor 12.

The empathy processor 12 of the degree-of-empathy analyzer 101 calculates the amounts of change in RRI and change in CvRR of each of the plurality of persons according to the aforementioned Formulas 1 and 2. The tasks in Formulas 1 and 2 may be any types of task. Moreover, as shown in FIG. 17, the empathy processor 12 determines a factor of stress on the basis of those amounts of change.

For example, in a case where the RRI of a person is much lower than it was during rest and the CvRR of the person is much higher than it was during rest, the empathy processor 12 determines that the factor of stress of the person is "INTERPERSONAL". Further, in a case where the RRI of a person is a bit higher than it was during rest and the CvRR of the person is almost the same as it was during rest, the empathy processor 12 determines that the factor of stress of the person is "PAIN". Further, in a case where the RRI of a person is almost the same as it was during rest and the CvRR of the person is much lower than it was during rest, the empathy processor 12 determines that the factor of stress of the person is "COGNITIVE FATIGUE".

Specifically, a positive first threshold and a negative second threshold are set for the amount of change in RRI, and a positive third threshold and a negative fourth threshold are set for the amount of change in CvRR. In this case, in a case where the amount of change in RRI of a person is lower than the negative second threshold and the amount of change in CvRR of the person is higher than or equal to the positive third threshold, the empathy processor 12 determines that the factor of stress of the person is "INTERPERSONAL".

Further, in a case where the amount of change in RRI of a person is higher than or equal to the positive first threshold and the amount of change in CvRR of the person is lower than the positive third threshold and is higher than or equal to the negative fourth threshold, the empathy processor 12 determines that the factor of stress of the person is "PAIN".

Further, in a case where the amount of change in RRI of a person is lower than the positive first threshold and is higher than or equal to the negative second threshold and the amount of change in CvRR of the person is lower than the negative fourth threshold, the empathy processor 12 determines that the factor of stress of the person is "COGNITIVE FATIGUE".

FIG. 18 is a diagram showing an example in which degrees of empathy are derived from factors of stress of a plurality of persons.

The degree-of-empathy analyzer 101 determines factors of stress of persons A, B, and C, for example, on the basis of heartbeat information of those persons. Specifically, the degree-of-empathy analyzer 101 determines that the factor of stress of the person A during times t11 to t14 is "INTERPERSONAL" and determines that the factor of stress of the person A during times t15 to t17 is "COGNITIVE FATIGUE". Further, the degree-of-empathy analyzer 101 determines that the factor of stress of the person B during times t16 to t18 is "COGNITIVE FATIGUE". Further, the degree-of-empathy analyzer 101 determines that the factor of stress of the person C during times t12 to t13 is "INTERPERSONAL".

In such a case, since there is a coincidence of factor of stress between the person A and the person C during the period from the time t12 to the time t13, the empathy processor 12 of the degree-of-empathy analyzer 101 estimates that the person A and the person C empathize with each other during the period. That is, the empathy processor 12 derives, for example, "1" as a degree of empathy between the person A and the person C during the times t12 to t13. Similarly, since there is a coincidence of factor of stress between the person A and the person B during the period from the time t16 to the time t17, the empathy processor 12 estimates that the person A and the person B empathize with each other during the period. That is, the empathy processor 12 derives, for example, "1" as a degree of empathy between the person A and the person B during the times t16 to t17. The empathy processor 12 may derive a degree of empathy among the three persons A, B, and C. For example, for each period, the empathy processor 12 derives the average of a degree of empathy between the person A and the person B during that period, a degree of empathy between the person A and the person C during that period, and a degree of empathy between the person B and the person C during that period as the degree of empathy among the three persons.

The outputter 13 outputs degree-of-empathy information that indicates the derived degree of empathy.

As noted above, the degree-of-empathy analyzer 101 according to the present aspect calculates the amounts of change in RRI and change in CvRR of each of the plurality of persons and, on the basis of a correlation between factors of stress determined from those amounts of change, derives a degree of empathy between the plurality of persons. That is, even in the present aspect, the degree of empathy between the plurality of persons is derived on the basis of a correlation between changes in heartbeat information of the plurality of persons. Accordingly, also in the present aspect, the degree of empathy, which is an emotional interaction that takes place between the plurality of persons, can be properly estimated.

Aspect 3 of Degree-of-Empathy Analyzer

In each of Aspects 1 and 2, the degree-of-empathy analyzer 101 derives a degree of empathy with the use of heartbeat information. In the present aspect, a degree of empathy is derived with the use of SC information as well as heartbeat information. The SC information is biological information other than the heartbeat of each of a plurality of persons. The SC information is information that indicates the skin conductance of a fingertip of a person. The skin conductance is hereinafter also called an "SC".

Figures 19, 20:
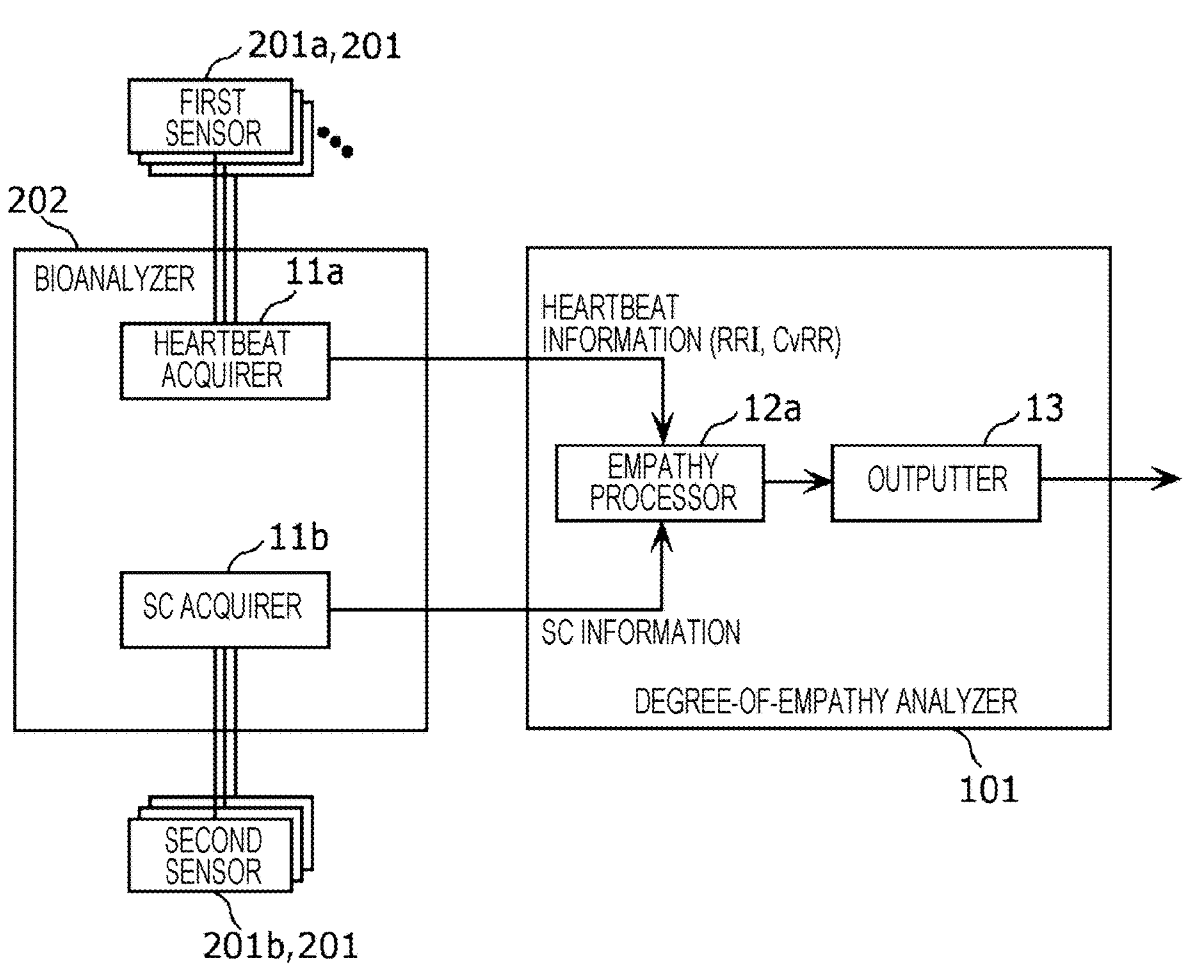
FIG. 19 is a block diagram showing configurations of a bioanalyzer and a degree-of-empathy analyzer according to Aspect 3 of the embodiment.
FIG. 20 is a diagram for explaining a method for determination of a factor of stress by an empathy processor according to Aspect 3 of the embodiment.

FIG. 19 is a block diagram showing configurations of a bioanalyzer 202 and a degree-of-empathy analyzer 101 according to the present aspect.

The degree-of-empathy analyzer 101 according to the present aspect estimates a degree of empathy between a plurality of persons on the basis of heartbeat information and SC information. In the present aspect, the bioanalyzer 202 includes a heartbeat acquirer 11*a* and an SC acquirer 11*b*, and the degree-of-empathy analyzer 101 includes an empathy processor 12*a* and an outputter 13.

As with the bioanalyzers 202 of Aspects 1 and 2, the heartbeat acquirer 11*a* acquires information on the heartbeat of a person as heartbeat information. Specifically, the heartbeat acquirer 11*a* acquires first sensing information of each of the plurality of persons from a plurality of sensors 201*a* and, by analyzing the first sensing information, acquires heartbeat information of that person from the first sensing information. As with the sensors 201 of Aspects 1 and 2, each of the first sensor 201*a* is a camera that, by photographing a person, generates a facial image of the person as first sensing information. The first sensor 201*a* is not limited to the camera but may be a wearable device that measures an electrocardiogram or a pulse wave. The heartbeat acquirer 11*a* according to the present aspect acquires, from the first sensing information of each of the plurality of persons, heartbeat information that indicates the RRI and CvRR of that person.

The SC acquirer 11*b* acquires SC information of a person. Specifically, the SC acquirer 11*b* acquires second sensing information of each of the plurality of persons from a plurality of second sensors 201*b* and, by analyzing the second sensing information, acquires SC information of that person from the second sensing information. Each of the second sensors 201*b* is, for example, a sensor including a pair of sensing electrodes, is wound around a fingertip of a person, and outputs, as second sensing information, information that indicates a potential of the skin of the fingertip. The SC acquirer 11*b* according to the present aspect analyzes the second sensing information of each of the plurality of persons and thereby acquires SC information that indicates the skin conductance of that person. The first sensors 201*a* and the second sensors 201*b* may be included in the sensors 201 of the foregoing embodiment.

As in the case of Aspect 2, the empathy processor 12*a* calculates the amounts of change in RRI and change in CvRR of a person on the basis of heartbeat information acquired by the heartbeat acquirer 11*a*. Furthermore, the empathy processor 12*a* according to the present aspect calculates the amount of change in skin conductance of a person on the basis of SC information acquired by the SC acquirer 11*b*. The amount of change in skin conductance is hereinafter also called an "amount of change in SC".

Specifically, the empathy processor 12*a* calculates the amount of change in SC according to "Amount of Change in SC={(Average of SCs during Execution of Task)−(Average of SCs during Rest)}/(Average of SCs during Rest)×100 (Formula 3)". An SC during rest is an SC measured for five minutes prior to execution of a task by a person with the person in the same position as he/she was in when executing the task. Moreover, the average of SCs during rest is the average of SCs over a period of 60 seconds to 240 seconds after the start of measurement. The average of SCs during execution of the task is the average of SCs over a period of 60 seconds to 240 seconds after the start of measurement out of SCs measured while the person was executing the task. Further, the task in Formula 3 may be any type of task.

Moreover, the empathy processor 12*a* determines a factor of stress on the basis of the amount of change in RRI, the amount of change in CvRR, and the amount of change in SC. Furthermore, the empathy processor 12*a* derives a degree of empathy between the plurality of persons on the basis of a factor of stress of each of the plurality of persons.

As in the case of Aspects 1 and 2, the outputter 13 outputs degree-of-empathy information that indicates the degree of empathy derived by the empathy processor 12*a*.

FIG. 20 is a diagram for explaining a method for determination of a factor of stress by the empathy processor 12*a*.

For example, in a case where the RRI of a person is lower than it was during rest, the CvRR of the person is higher than it was during rest, and the SC of the person is higher than it was during rest, the empathy processor 12*a* determines that the factor of stress of the person is "INTERPERSONAL". Further, in a case where the RRI of a person is higher than it was during rest, the CvRR of the person is almost the same as it was during rest, and the SC of the person is higher than it was during rest, the empathy processor 12*a* determines that the factor of stress of the person is "PAIN". Further, in a case where the RRI of a person is almost the same as it was during rest, the CvRR of the person is lower than it was during rest, and the SC of the person is almost the same as it was during rest, the empathy processor 12*a* determines that the factor of stress of the person is "COGNITIVE FATIGUE".

Specifically, a positive first threshold and a negative second threshold are set for the amount of change in RRI, a positive third threshold and a negative fourth threshold are set for the amount of change in CvRR, and a positive fifth threshold and a negative sixth threshold are set for the amount of change in SC. In this case, in a case where (a) the amount of change in RRI of a person is lower than the negative second threshold, (b) the amount of change in CvRR of the person is higher than or equal to the positive third threshold, and (c) the amount of change in SC of the person is higher than or equal to the positive fifth threshold, the empathy processor 12*a* determines that the factor of stress of the person is "INTERPERSONAL".

Further, in a case where (a) the amount of change in RRI of a person is higher than or equal to the positive first threshold, (b) the amount of change in CvRR of the person is lower than the positive third threshold and is higher than or equal to the negative fourth threshold, and (c) the amount of change in SC of the person is higher than or equal to the positive fifth threshold, the empathy processor 12*a* determines that the factor of stress of the person is "PAIN".

Further, in a case where (a) the amount of change in RRI of a person is lower than the positive first threshold and is higher than or equal to the negative second threshold, (b) the amount of change in CvRR of the person is lower than the negative fourth threshold, and (c) the amount of change in SC of the person is lower than the positive fifth threshold and is higher than or equal to the negative sixth threshold, the empathy processor 12*a* determines that the factor of stress of the person is "COGNITIVE FATIGUE".

Figure 21:
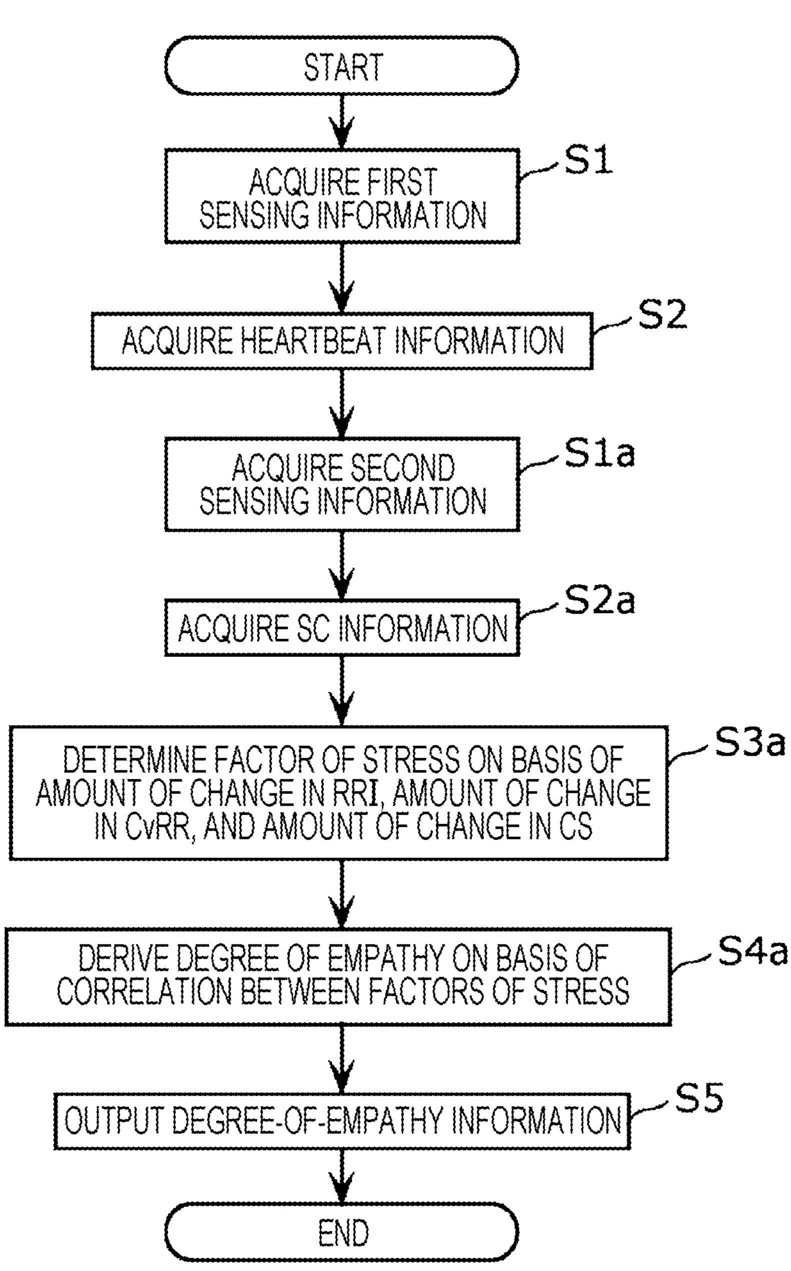
FIG. 21 is a flow chart showing a processing operation of the bioanalyzer and the degree-of-empathy analyzer according to Aspect 3 of the embodiment.

FIG. 21 is a flow chart showing a processing operation of the bioanalyzer 202 and the degree-of-empathy analyzer 101 according to the present aspect.

First, the heartbeat acquirer 11*a* of the bioanalyzer 202 acquires first sensing information of each of the plurality of persons from the plurality of first sensors 201*a* (step S1). Then, the heartbeat acquirer 11*a* acquires, from the first sensing information, heartbeat information that indicates an RRI and a CvRR (step S2). As a result of this, heartbeat information of each of the plurality of persons is acquired.

Next, the SC acquirer 11*b* acquires second sensing information of each of the plurality of persons from the plurality of second sensors 201*b* (step S1*a*). Then, the SC acquirer 11*b* acquires, from the second sensing information, SC information that indicates an SC (step S2*a*). As a result of this, SC information of each of the plurality of persons is acquired.

Next, the empathy processor 12*a* calculates the amounts of change in RRI, change in CvRR, and change in SC of each of the plurality of persons and, on the basis of those amounts of change, determines a factor of stress of each of the plurality of persons (step S3*a*). Furthermore, the empathy processor 12*a* derives a degree of empathy between the plurality of persons on the basis of a correlation between the factors of stress of the plurality of persons, i.e. whether the plurality of persons have an identical factor in common (step S4*a*).

Then, the outputter 13 outputs degree-of-empathy information that indicates the derived degree of empathy (step S5).

As noted above, the degree-of-empathy analyzer 101 according to the present aspect calculates the amounts of change in RRI, change in CvRR, and change in SC of each of the plurality of persons and, on the basis of a correlation between factors of stress determined from those amounts of change, derives a degree of empathy between the plurality of persons. That is, even in the present aspect, the degree of empathy between the plurality of persons is derived on the basis of a correlation between changes in heartbeat information of the plurality of persons. Accordingly, also in the present aspect, the degree of empathy, which is an emotional interaction that takes place between the plurality of persons, can be properly estimated. Further, in the present aspect, as compared with Aspect 2, since the amount of change SC is used for determining a factor of stress, determination accuracy of the factor of stress can be improved. As a result of that, estimate accuracy of the degree of empathy can be improved.

Instead of including the SC acquirer 11*b*, which acquires the skin conductance of a person, the bioanalyzer 202 according to the present aspect may include a constituent element that acquires the skin temperature of a person. In this case, each of the second sensors 201*b* is, for example, a thermocouple. Further, the empathy processor 12*a* calculates the amount of change in skin temperature instead of the amount of change in SC. Specifically, the empathy processor 12*a* calculates the amount of change in skin temperature according to "Amount of Change in Skin Temperature={(Average of Skin Temperatures during Execution of Task)−(Average of Skin Temperatures during Rest)}/(Average of Skin Temperatures during Rest)×100 (Formula 4)". A skin temperature during rest is a skin temperature measured for five minutes prior to execution of a task by a person with the person in the same position as he/she was in when executing the task. Moreover, the average of skin temperatures during rest is the average of skin temperatures over a period of 60 seconds to 240 seconds after the start of measurement. The average of skin temperatures during execution of the task is the average of skin temperatures over a period of 60 seconds to 240 seconds after the start of measurement out of skin temperatures measured while the person was executing the task. Further, the task in Formula 4 may be any type of task. The empathy processor 12*a* determines a factor of stress using such an amount of change in skin temperature instead of the amount of change in SC.

Modification 1

In the foregoing embodiment, a degree of empathy of a target person is presented by using a person identifying image P. In the present modification, degrees of empathy of a plurality of target persons having the same attribute is presented as one representative degree of empathy.

For example, in the server storage 110 of the server 100, for each of all participants in online communication, attribute information that indicates an attribute of that participant in association with a user ID is stored. The presentation processor 105 identifies an attribute of each target person by reading out attribute information from the server storage 110. Types of attribute include, for example, gender, occupation, and age. The age is a number obtained by rounding down to the nearest ten the number of years a target person has lived. Specifically, gender attributes include males and females. Occupational attributes include, for example, managers, engineers, and staff members. Age attributes include, for example, 20 s, 30 s, 40 s, and 50 s. Moreover, when a degree of empathy of each target person is derived by the degree-of-empathy analyzer 101, the presentation processor 105 identifies, for each attribute, degrees of empathy of a plurality of persons belonging to that attribute and derives, as a representative degree of empathy, a degree of empathy that represents those degrees of empathy. The presentation processor 105 generates and outputs empathy presentation information that indicates the representative derived degree of empathy for each attribute.

Figure 22:
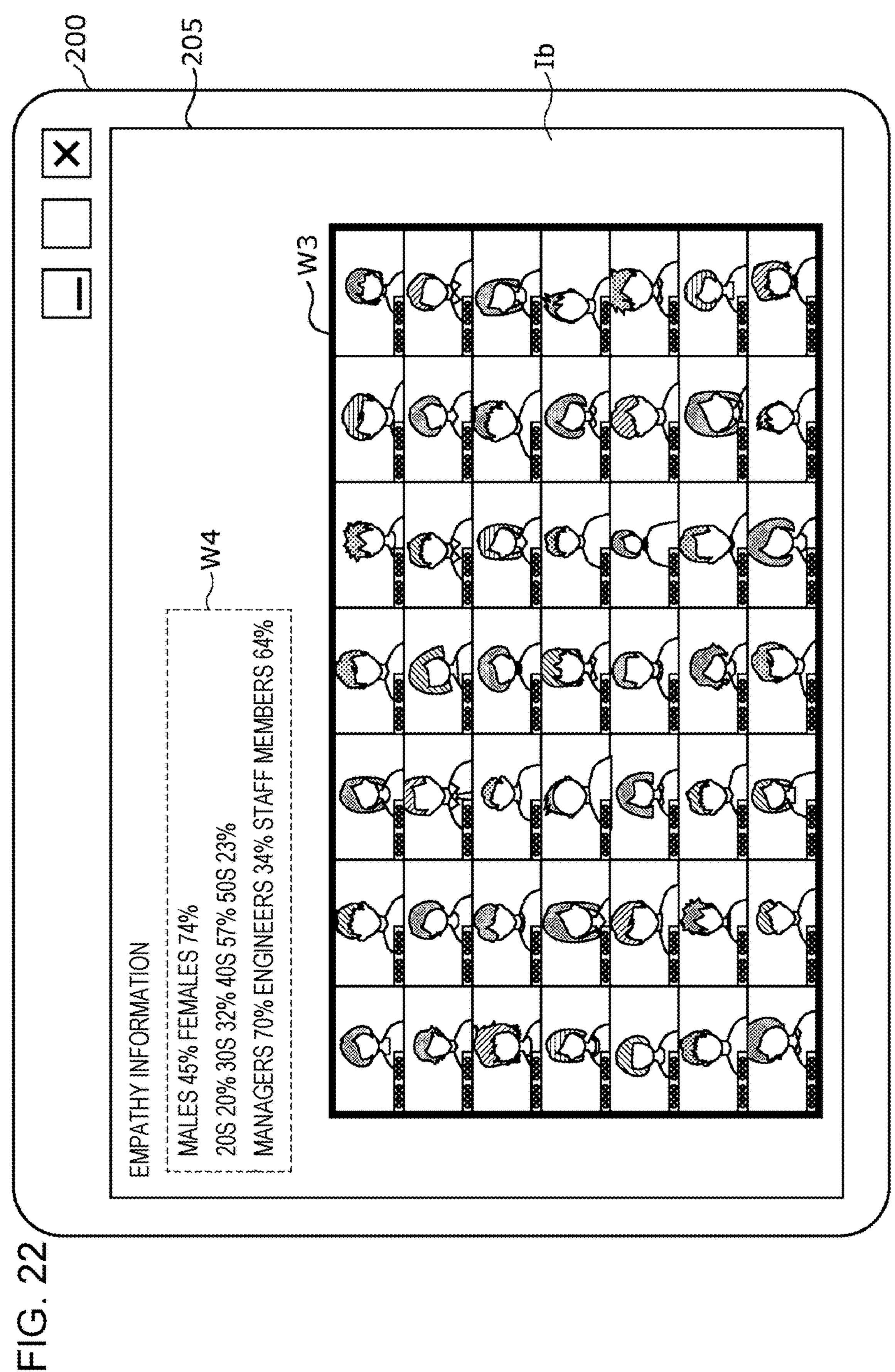
FIG. 22 is a diagram showing an example of a method for presenting a degree of empathy according to Modification 1 of the embodiment.

FIG. 22 is a diagram showing an example of a method for presenting a degree of empathy according to the present modification.

When the terminal communicator 204 receives empathy presentation information from the server 100, the presenter 205 of the terminal device 200 displays, under control of the terminal controller 206, a display screen image Ib shown, for example, in FIG. 22. The display screen image Ib contains a moving image area W3 where a moving image of each participant in online communication is displayed and an empathy display area W4 where a representative degree of empathy for each attribute indicated by the empathy presentation information is displayed. In this case, a moving image captured of a participant by a camera included in the sensor 201 of a terminal device 200 is sent from the terminal device 200 to the server 100.

In the empathy display area W4, representative degrees of empathy are displayed separately for each of the gender, age, and occupation attributes. For example, 45% is displayed as a representative degree of empathy of the gender attribute "MALES", and 74% is displayed as a representative degree of empathy of the gender attribute "FEMALES". Further, 20% is displayed as a representative degree of empathy of the age attribute "20S", and 32% is displayed as a representative degree of empathy of the age attribute "30S". Further, 70% is displayed as a representative degree of empathy of the occupational attribute "MANAGERS", and 34% is displayed as a representative degree of empathy of the occupational attribute "ENGINEERS".

In a situation to which the present modification is applied, for example, one reference person is selected from all participants in online communication and all the rest are selected as target persons. Moreover, the one reference person gives a lecture to the other participants through online communication. That is, the present modification can be applied to a situation, such as a lecture meeting or the announcement of a company's policy, where many people are listening to one speaker. This makes it possible to visualize how much participants (audience) empathize with the content of a lecture, for example, in a lecture meeting or the announcement of a company's policy. Further, in a case, such as a lecture meeting or the announcement of a company's policy, where there are a large number of participants, displaying representative degrees of empathy separately for each of the attributes allows the speaker, who is the reference person, to more easily grasp overall trends in the degrees of empathy of the participants than does displaying degrees of empathy of the target persons individually with person identifying image P as in the case of the foregoing embodiment.

FIG. 23 is a flow chart showing an example of part of a processing operation of the server 100 according to the present modification. Specifically, FIG. 23 is a flow chart showing details of the process in step S40 of FIG. 8.

The presentation processor 105 identifies an attribute of each of the plurality of target persons by reading out the attribute information from the server storage 110 (step S43). When the type of the attribute is gender, the presentation processor 105 identifies the attribute of each of the plurality of target persons as a male or a female. Further, when the type of the attribute is age, the presentation processor 105 identifies the attribute of each of the plurality of target persons as 20*s*, 30*s*, 40*s*, or other ages. Further, when the type of the attribute is occupation, the presentation processor 105 identifies the attribute of each of the plurality of target persons as a manager, an engineer, a staff member, or other occupations.

Next, the presentation processor 105 classifies a degree of empathy of each of the plurality of persons according to those attributes (step S44). For example, the presentation processor 105 classifies the degrees of empathy of the plurality of persons separately into each of the attributes by grouping degrees of empathy of target persons having the attribute "males" and grouping degrees of empathy of target persons having the attribute "females". Further, the presentation processor 105 may sort, in order of magnitude, the degrees of empathy included in the attribute group of "males" and sort, in order of magnitude, the degrees of empathy included in the attribute group of "females".

Then, for example, for each attribute, the presentation processor 105 derives a representative degree of empathy of that attribute by calculating the average of one of more degrees of empathy included in the group of that attribute (step S45). The presentation processor 105 may derive a value other than the average as a representative degree of empathy. For example, the presentation processor 105 may derive the median of one or more degrees of empathy as a representative degree of empathy. The foregoing description has been given by taking gender as an example of a type of attribute; however, even if the type is age or occupation, the presentation processor 105 performs a process that is similar to that mentioned above.

Next, the presentation processor 105 generates and outputs empathy presentation information that indicates a representative degree of empathy for each attribute (step S46).

In the present modification thus configured, for example, displaying degrees of empathy by gender makes it possible to easily grasp whether there is a gender difference in degree of empathy regarding the content of a lecture or a company's policy. In particular, in a case where the reference person talks on the gender gap, the method for displaying a degree of empathy according to the present modification is an effective method.

Further, it is also effective to display degrees of empathy by age. Doing so makes it possible to visualize whether the content of a lecture or the content of a company's policy appeals to the young generation or appeals to the old generation.

Further, it is also effective to display degrees of empathy by occupation. Doing so makes it possible to visualize a difference in degree of empathy among occupations such as managers, engineers, and staff members in an easy-to-understand manner.

Displaying degrees of empathy by attribute in this way makes it possible to visualize the degrees of empathy in various ways of cross-cutting them, for example, by gender, age, and occupation and makes it possible to easily conduct an analysis as to how much the content of a lecture or a company's policy appeals to the participating audience.

Thus, in the present modification, the presentation processor 105 acquires attribute information that indicates an attribute of each of at least one target person. On the basis of the attribute information and for each attribute, the presentation processor 105 derives, with the use of a degree of empathy of each of one or more target persons belonging to that attribute, a representative degree of empathy that is a degree of empathy that represents that attribute. Moreover, the presentation processor 105 generates empathy presentation information that indicates a representative degree of empathy for each attribute. This makes it possible to present a representative degree of empathy of males and a representative degree of empathy of females, for example, in the case of attributes "males" and "females". This makes it possible to present degrees of empathy by attribute and a difference between those degrees of empathy in an easy-to-understand manner.

Modification 2

In the foregoing embodiment and Modification 1, basically, one reference person is selected. In the present modification, basically, a plurality of reference persons are selected, and a plurality of target persons are selected. All participants in online communication may be selected as reference persons, and all the participants may be selected as target persons.

The server controller 106 according to the present modification identifies, for each reference person, a pair of that reference person and each of the plurality of target persons. In a case where all participants in online communication are selected as reference persons and all the participants are selected as target persons, the server controller 106 identifies all pairs of two persons from all the participants. Moreover, the degree-of-empathy analyzer 101 derives, for each of those pairs, a degree of empathy between the two persons included in that pair. One of the two persons included in a pair is a reference person, and the other is a target person. The degree-of-empathy analyzer 101 may sort all the pairs in order of degree of empathy.

For each pair, the presentation processor 105 reads out, from the server storage 110, person identifying images P of the two persons included in that pair and generates a pair image composed of the two person identifying images P. Furthermore, for each pair, the presentation processor 105 adjusts the size of the pair image according to a degree of empathy derived for that pair. Specifically, the presentation processor 105 enlarges or reduces the pair image. The presentation processor 105 generates and outputs empathy presentation information containing sized-adjusted pair images of all the pairs.

Figure 24:
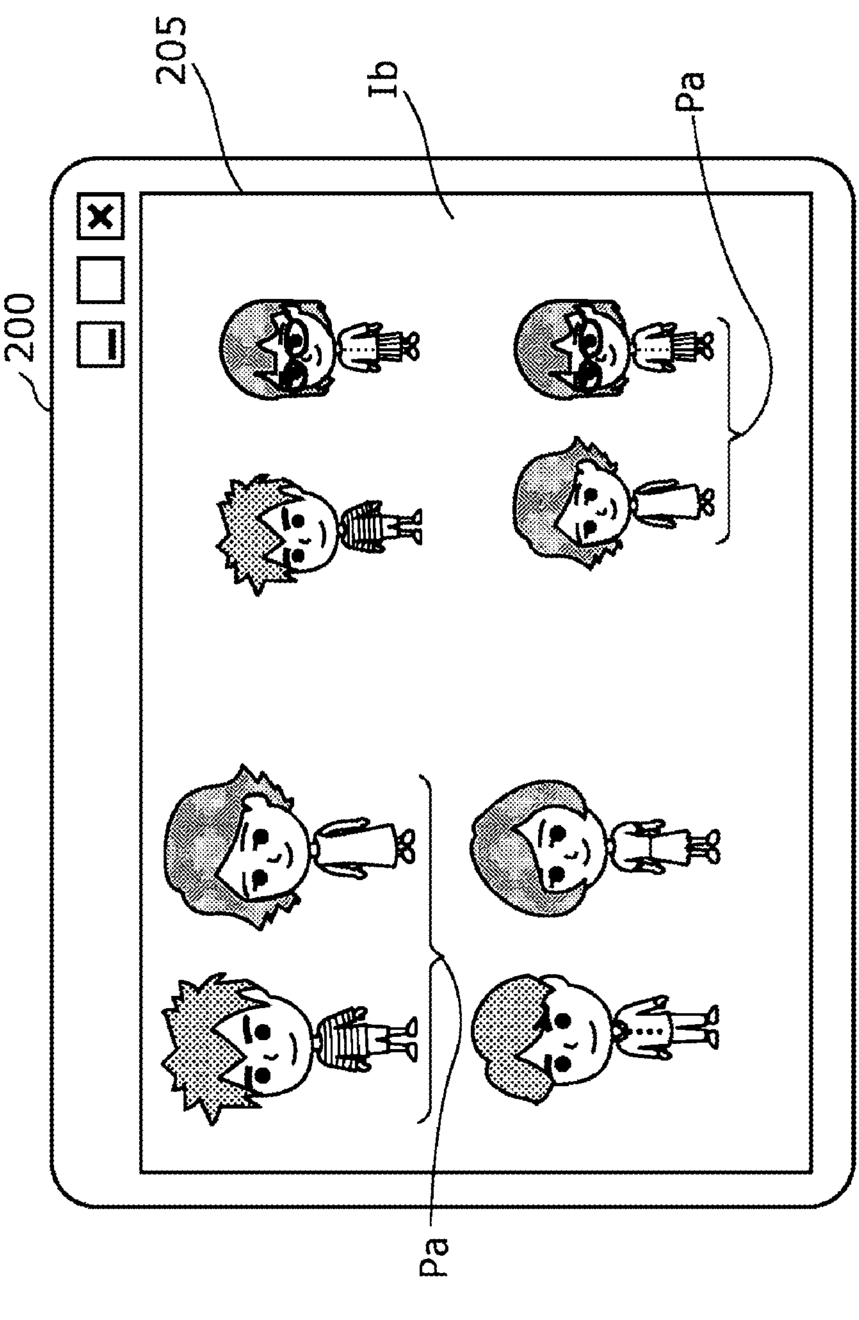
FIG. 24 is a diagram showing an example of a method for presenting a degree of empathy according to Modification 2 of the embodiment.

FIG. 24 is a diagram showing an example of a method for presenting a degree of empathy according to the present modification.

When the terminal communicator 204 receives empathy presentation information from the server 100, the presenter 205 of the terminal device 200 displays, under control of the terminal controller 206, a display screen image Ib shown, for example, in FIG. 24. The display screen image Ib contains size-adjusted pair images Pa of a plurality of pairs. Further, the plurality of pair images Pa may be listed in order of size. A pair image Pa is formed in a larger size when the degree of empathy of the pair that corresponds to the pair image Pa is higher, and on the other hand, a pair image Pa is formed in a smaller size when the degree of empathy of the pair that corresponds to the pair image Pa is lower.

Displaying such a display screen image Ib makes it possible to easily grasp a pair with a high degree of empathy from among participants participating in on-line communication and performing communication with each other and visualize the degree of empathy of the pair.

Pair images Pa of all pairs may be displayed on the presenter 205, or only pair images Pa of some pairs may be displayed on the presenter 205. For example, the presentation processor 105 may generate and output empathy presentation information containing, of the pair images Pa of all pairs, only pair images Pa of pairs that correspond to degrees of empathy higher than or equal to a threshold. The sizes of these pair images Pa are adjusted according to the degrees of empathy in a manner similar to that mentioned above.

That is, in the present modification, the degree-of-empathy analyzer 101 derives, for each pair of two persons included in a plurality of persons, a degree of empathy between the two persons included in that pair. One of the two persons is a reference person, and the other is a target person. Moreover, the server 100 causes the presenter 205 of the terminal device 200 to display, according to a mode of presentation of pair images Pa, only person identifying images P (i.e. pair images Pa) of pairs that correspond to degrees of empathy higher than the threshold. This allows the user to easily grasp a pair having a high degree of empathy.

Figure 25:
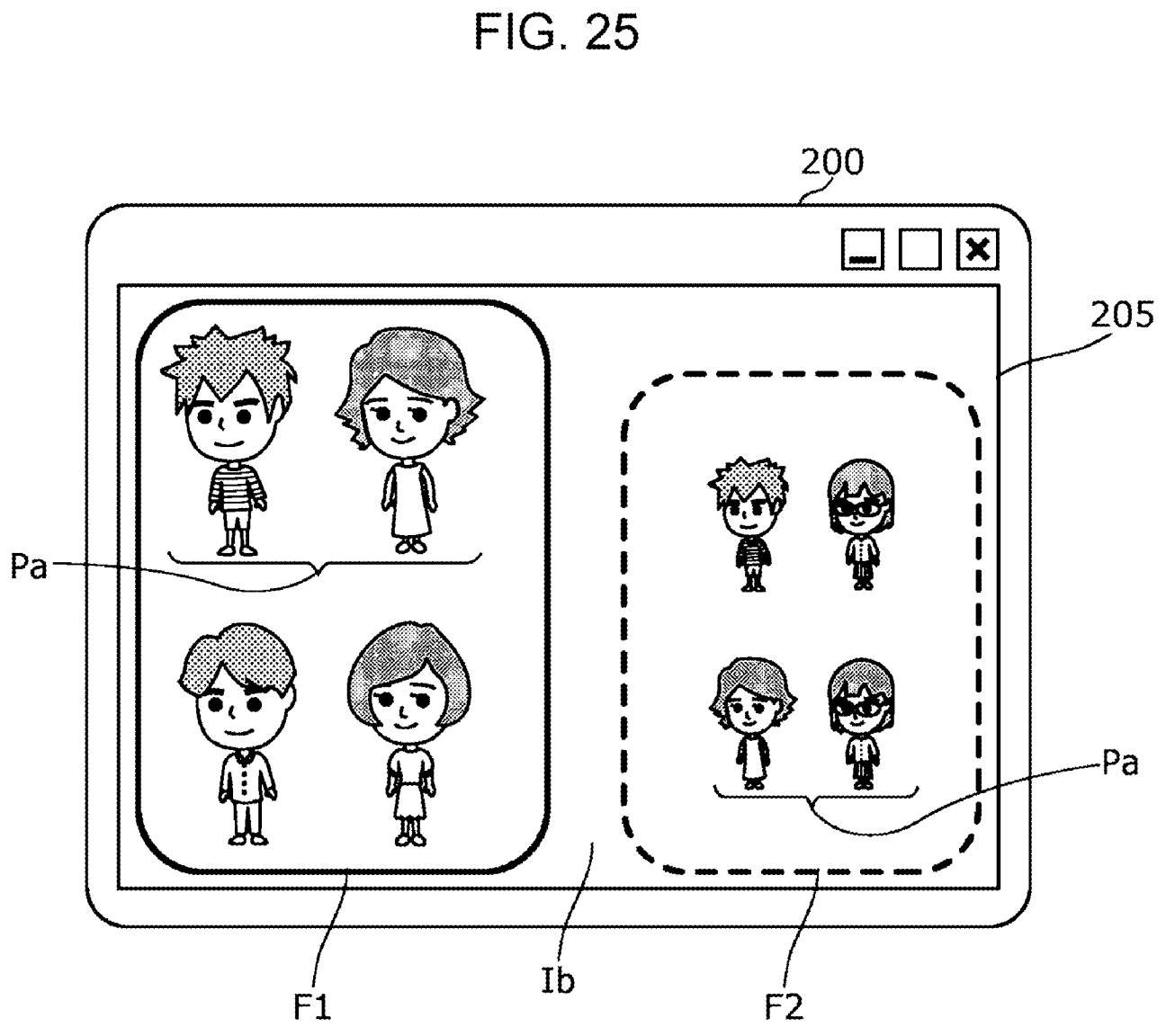

FIG. 25 is a diagram showing another example of a method for presenting a degree of empathy according to the present modification.

As shown in FIG. 25, a display screen image Ib that is displayed by the presenter 205 may contain frames F1 and F2 for dividing a plurality of pair images Pa into groups. For example, the frame F1 encloses a pair image Pa of a pair having a degree of empathy higher than or equal to the threshold, and the frame F2 encloses a pair image Pa of a pair having a degree of empathy lower than the threshold. Each of the frames F1 and F2 may enclose one or more pair images Pa. Further, in this case, for each of the plurality of pair images Pa, the presentation processor 105 compares with the threshold the degree of empathy of the pair that corresponds to that pair image Pa and, if the degree of empathy is higher than or equal to the threshold, puts the pair image Pa in the frame F1 and, if the degree of empathy is lower than the threshold, puts the pair image Pa in the frame F2. According to this, empathy presentation information is generated. As a result of that, the display screen image Ib shown in FIG. 25 is displayed on the presenter 205.

Figure 26:
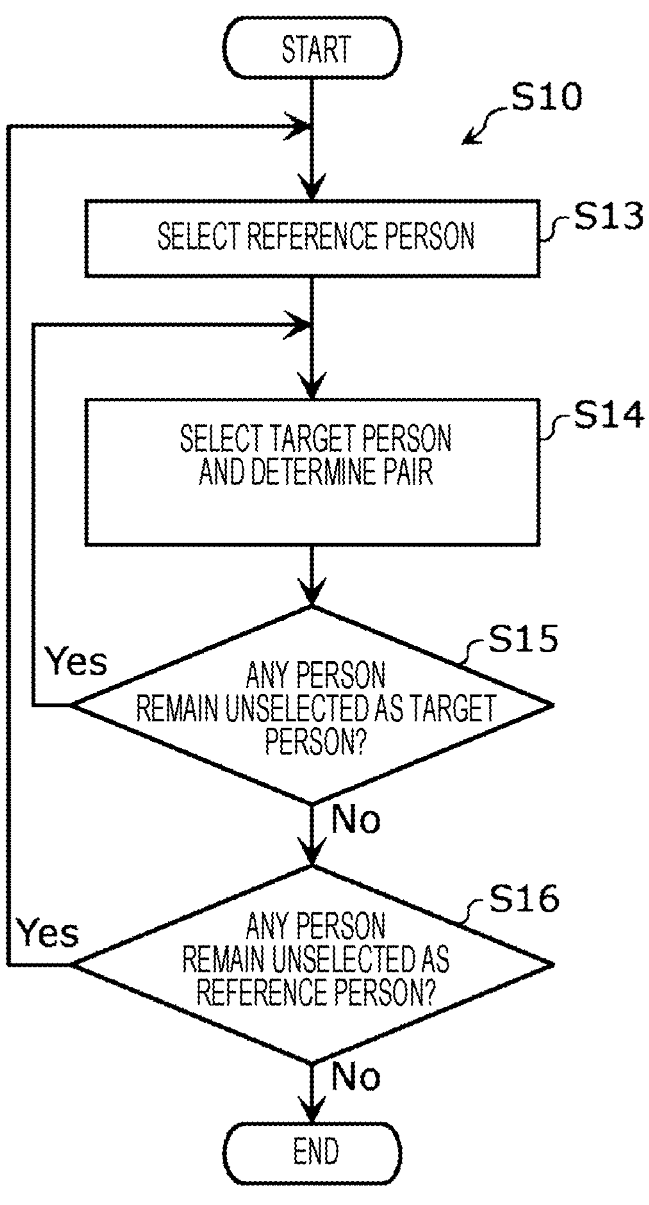
FIG. 26 is a flow chart showing an example of a person selecting process of a server according to Modification 2 of the embodiment.

FIG. 26 is a flow chart showing an example of a person selecting process of the server 100 according to the present modification. That is, FIG. 26 is a flow chart showing details of the process in step S10 of FIG. 8.

First, the server controller 106 selects a reference person from among all participants in online communication (step S13). Next, the server controller 106 selects a target person from among all the participants and determines a pair including the reference person selected in the immediately preceding step S13 and the selected target person (step S14).

Then, the server controller 106 determines whether any of all the participants remains unselected as a target person (step S15). When the server controller 106 determines that there remains a participant unselected (Yes in step S15), the server controller 106 repeatedly executes the process from step S14. On the other hand, when the server controller 106 determines that there remains no participant unselected (No in step S15), the server controller 106 further determines whether any of all the participants remains unselected as a reference person (step S16).

When the server controller 106 determines that there remains a participant unselected (Yes in step S16), the server controller 106 repeatedly executes the process from step S13. On the other hand, when the server controller 106 determines that there remains no participant unselected (No in step S16), the server controller 106 ends the person selecting process.

Figure 27:
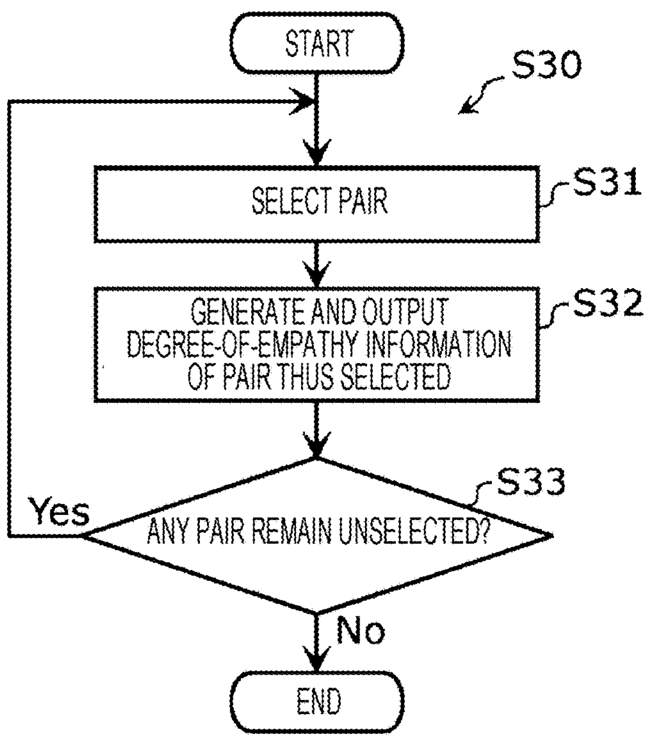
FIG. 27 is a flow chart showing an example of part of a processing operation of the server according to Modification 2 of the embodiment.

FIG. 27 is a flow chart showing an example of part of a processing operation of the server 100 according to the present modification. Specifically, FIG. 27 is a flow chart showing details of the process in step S30 of FIG. 8.

The degree-of-empathy analyzer 101 selects one pair from among all pairs determined by the server controller 106 (step S31). Then, the degree-of-empathy analyzer 101 derives a degree of empathy of the selected pair and generates and outputs degree-of-empathy information that indicates the degree of empathy (step S32).

Next, the degree-of-empathy analyzer 101 determines whether any of all the pairs determined by the server controller 106 remains unselected (step S33). When the degree-of-empathy analyzer 101 determines that there remains a pair unselected (Yes in step S33), the degree-of-empathy analyzer 101 executes the process from step S31. On the other hand, when the degree-of-empathy analyzer 101 determines that there remains no pair unselected (No in step S33), the degree-of-empathy analyzer 101 ends the process of deriving a degree of empathy.

Figure 28:
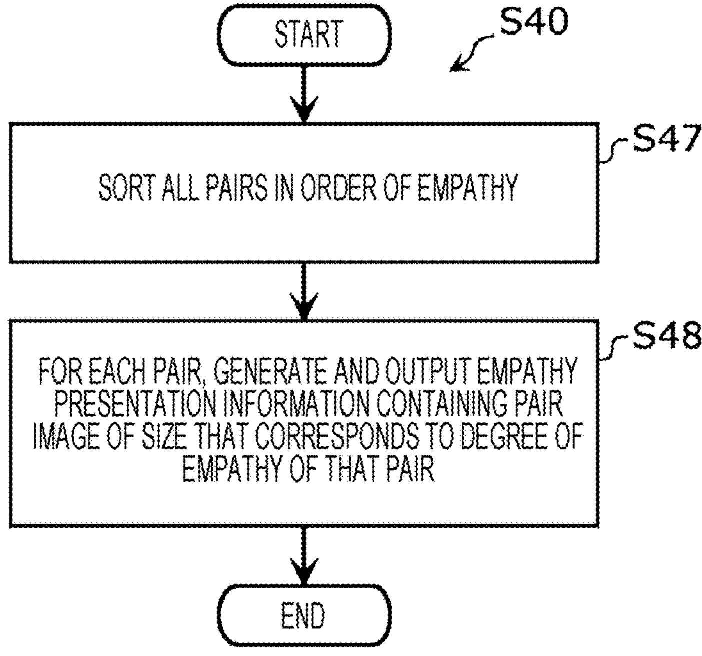
FIG. 28 is a flow chart showing an example of part of the processing operation of the server according to Modification 2 of the embodiment.

FIG. 28 is a flow chart showing an example of part of the processing operation of the server 100 according to the present modification. Specifically, FIG. 28 is a flow chart showing details of the process in step S40 of FIG. 8.

The presentation processor 105 sorts, in order of magnitude, the degrees of empathy of all pairs derived by the degree-of-empathy analyzer 101 (step S47).

Next, the presentation processor 105 generates, for each of all the pairs, a pair image Pa of a size that corresponds to the degree of empathy of that pair. That is, the presentation processor 105 adjusts, according to the degree of empathy, the sizes of the person identifying images P of the two persons included in the pair. Then, the presentation processor 105 generates and outputs empathy presentation information containing those size-adjusted pair images Pa (step S48).

Thus, in the present modification, a plurality of reference persons are selected. For example, two reference persons may be selected. That is, in the person selecting process, the server controller 106 selects, from among a plurality of candidate persons, i.e. all participants, a first reference person and a second reference person as reference persons who are different from each other. Moreover, for each of at least one target person, the degree-of-empathy analyzer 101 derives a degree of empathy between the first reference person and that target person and derives a degree of empathy between the second reference person and that target person. This causes two reference persons to be selected, thus making it possible to widen a range of targets whose degrees of empathy are to be derived. As a result of that, various degrees of empathy among the plurality of persons can be presented. Alternatively, three or more reference persons may be selected.

Figure 29:
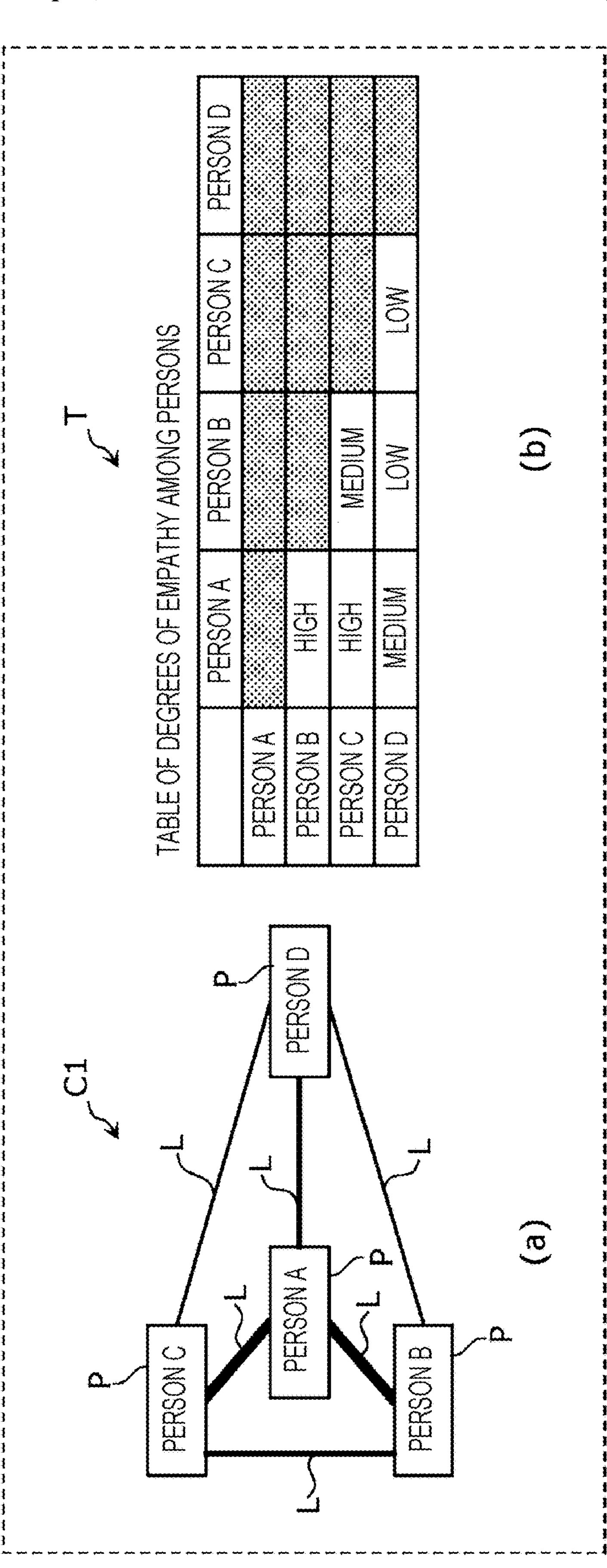
FIG. 29 illustrates diagrams showing another example of a method for presenting a degree of empathy according to Modification 2 of the embodiment.

FIG. 29 illustrates diagrams showing another example of a method for presenting a degree of empathy according to the present modification.

In the aforementioned example, the presenter 205 displays a pair image P of each pair. Alternatively, as shown in (a) of FIG. 29, the presenter 205 may display a correlation diagram C1. In the correlation diagram C1, the person identifying images P of a plurality of participants are connected to one another by coupling lines L. A coupling line L is a line connecting two person identifying images P that correspond to a pair. In the example shown in FIG. 29, the person identifying images P are shown in simplified forms.

The length and thickness of a coupling line L is set according to the degree of empathy of a pair that corresponds to two person identifying images P connected to each other by the coupling line L. That is, the higher the degree of empathy is, the shorter and thicker the coupling line L is, and the lower the degree of empathy is, the longer and thinner the coupling line L is. For example, since the degree of empathy of a pair of persons C and D is low, the coupling line L connecting the person identifying image P of the person C with the person identifying image P of the person D is long and thin. On the other hand, since the degree of empathy of a pair of persons A and B is high, the coupling line L connecting the person identifying image P of the person A with the person identifying image P of the person B is short and thick. In this case, the presentation processor 105 generates empathy presentation information that indicates a correlation diagram C1 composed of the person identifying image P of each participant and a plurality of coupling lines L. Then, in accordance with the empathy presentation information, the presenter 205 displays the correlation diagram C1 shown in (a) of FIG. 29.

Alternatively, instead of displaying the correlation diagram C1 shown in (a) of FIG. 29, the presenter 205 may display a table T shown in (b) of FIG. 29. That is, in the table T, the degree of empathy of each of a plurality of pairs is displayed as being "HIGH", "MEDIUM", or "LOW". For example, the table T shows that the degree of empathy of a pair formed by the person A and the person B is high, that the degree of empathy of a pair formed by the person B and the person C is medium, and that the degree of empathy of a pair formed by the person C and the person D is low.

Displaying such a correlation diagram C1 or a table T can make it easy to view a degree of empathy between a plurality of persons.

Modification 3

In the foregoing embodiment and Modifications 1 and 2, a reference person is selected by dragging and dropping a person identifying image P. However, the user of a terminal device 200 may select the reference person, for example, by clicking on or touching the person identifying image P via the operator 203.

Figure 30:
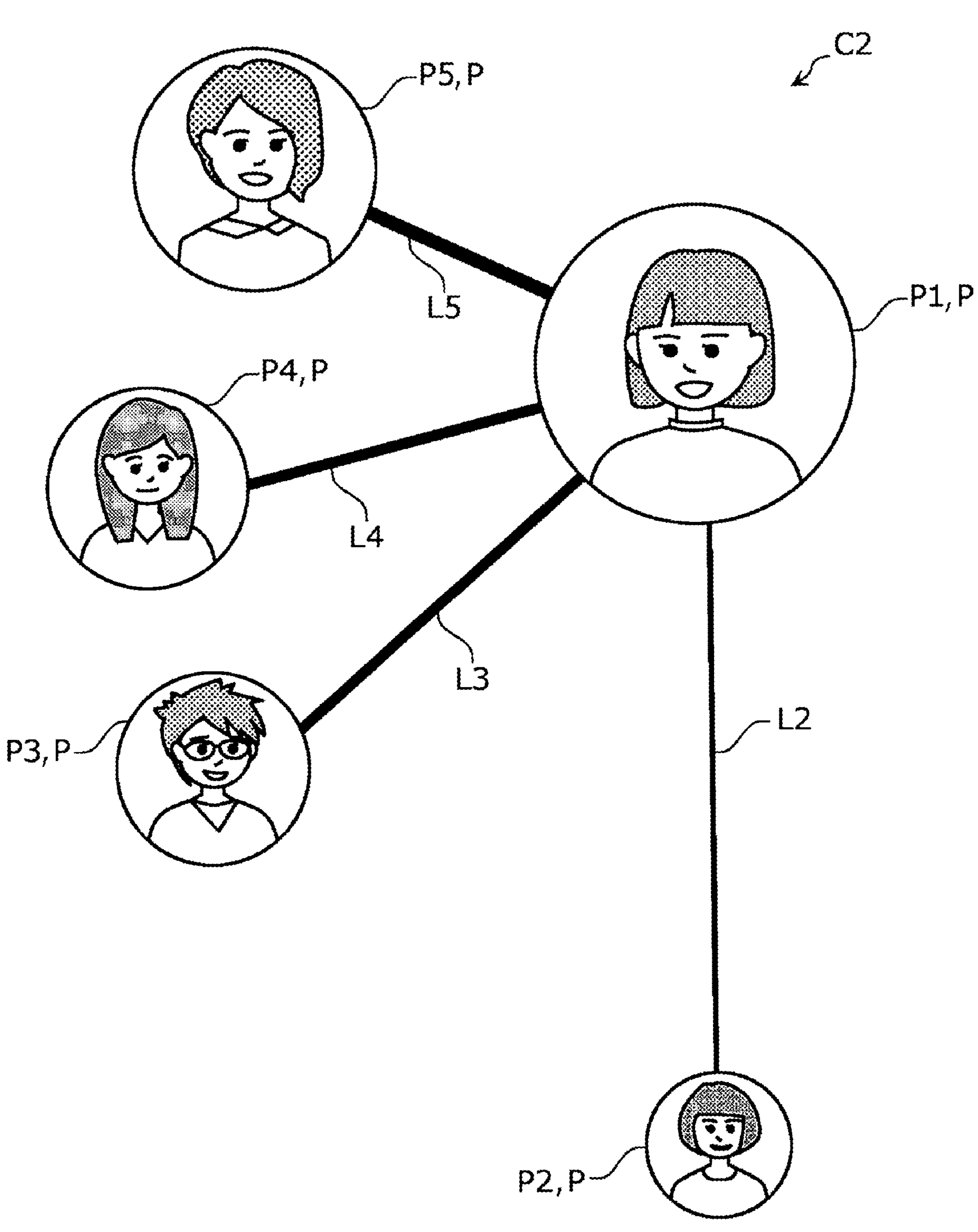
FIG. 30 is a diagram showing an example of a method for presenting a degree of empathy according to Modification 3 of the embodiment.

FIG. 30 is a diagram showing an example of a method for presenting a degree of empathy according to the present modification.

The presenter 205 of the terminal device 200 displays the person identifying images P of all participants in online communication. Then, in a case where the operator 203 of the terminal device 200 is configured as a touch panel together with the display of the presenter 205, the user touches, with a finger, one of all the person identifying images P being displayed. As a result of this, in accordance with a signal that is outputted from the operator 203 in response to the touch, the terminal controller 206 selects, as a reference person, a participant who corresponds to the touched person identifying image P.

Alternatively, in a case where the operator 203 of the terminal device 200 is configured as a mouse, the user operates the operator 203 to place the point on one of all the person identifying images P being displayed and click on the person identifying image P. As a result of this, in accordance with a signal that is outputted from the operator 203 in response to the click, the terminal controller 206 selects, as a reference person, a participant who corresponds to the person identifying image P on which the pointer has been placed.

Moreover, the terminal controller 206 may select all participants but the reference person in the online communication as target persons. Once the reference person and the target persons are thus selected, a correlation diagram C2 that indicates the reference person and a degree of empathy with each target person is displayed on the presenter 205 of the terminal device 200 as shown in FIG. 30. The correlation diagram C2 is composed, for example, of a reference identifying image P1, which is the person identifying image P of the reference person, target identifying images P2 to P5, which are the person identifying images P of four target persons, and coupling lines L2 to L5.

The coupling line L2 is a line connecting the reference identifying image P1 with the target identifying image P2, and the coupling line L3 is a line connecting the reference identifying image P1 with the target identifying image P3. Similarly, the coupling line L4 is a line connecting the reference identifying image P1 with the target identifying image P4, and the coupling line L5 is a line connecting the reference identifying image P1 with the target identifying image P5.

The higher the degrees of empathy are, the shorter and thicker the coupling lines L2 to L5 are, and the higher the degrees of empathy are, the shorter the distance between the reference identifying image P1 and each of the target identifying images P2 to P5 is.

Specifically, the degree of empathy between the reference person represented by the reference identifying image P1 and the target person represented by the target identifying image P2 is, for example, low. Accordingly, the coupling line L2 is long and thin. Furthermore, the distance between the reference identifying image P1 and the target identifying image P2 is long. Further, the degree of empathy between the reference person represented by the reference identifying image P1 and each of the target persons represented by the target identifying images P3 and P4 is, for example, medium.

Accordingly, the coupling lines L3 and L4 are moderately long and thick. Furthermore, the distance between the reference identifying image P1 and each of the target identifying images P3 and P4 is medium. Further, the degree of empathy between the reference person represented by the reference identifying image P1 and the target person represented by the target identifying image P5 is, for example, high. Accordingly, the coupling line L5 is short and thick. Furthermore, the distance between the reference identifying image P1 and the target identifying image P5 is short.

Further, in the correlation diagram C2, the size of each of the target identifying images P2 to P5 may be a size that corresponds to the degree of empathy of the target person represented by that target identifying image with respect to the reference person. That is, if the degree of empathy of a target person is high, the target identifying image of the target person is displayed in a large size, and on the other hand, if the degree of empathy of a target person is low, the target identifying image of the target person is displayed in a small size. Further, instead of showing the target identifying images P2 to P5 of all target persons, the correlation diagram C2 may show only the target identifying image of a target person having a degree of empathy higher than or equal to the threshold.

The placement and size of each person identifying image P and the length and thickness of each of the coupling lines L2 to L5 in such a correlation diagram C2 are determined by the presentation processor 105 according to a degree of empathy derived by the degree-of-empathy analyzer 101. Then, the presentation processor 105 generates and outputs empathy presentation information that indicates a correlation diagram C2 composed of the determined contents. On the presenter 205 of the terminal device 200, the correlation diagram C2 is displayed in accordance with the generated empathy presentation information.

The degree-of-empathy analyzer 101 periodically derives a degree of empathy, for example, on the basis of biological information that varies over time. Accordingly, the degree of empathy is periodically updated. As a result of that, the composition of a correlation diagram C2 that is displayed on the presenter 205 is periodically updated. In the case of a short-period update, the composition of the correlation diagram C2 that is displayed, i.e. the placement and size of each person identifying image P and the length and thickness of each of the coupling lines L2 to L5, is displayed in a continuously varying manner. On the other hand, in the case of a long-period update, the composition of the correlation diagram C2 that is displayed is displayed in the way that it varies at regular time intervals.

Further, the presenter 205 may cause the reference identifying image P1 and each of the target identifying images P2 to P5 to blink. In the blinking of a person identifying image P, the person identifying image P periodically changes between being displayed and not being displayed. Moreover, the presenter 205 may cause the target identifying image of a target person with a higher degree of empathy to blink with a periodicity that is closer to the periodicity with which the reference identifying image P1 blinks. Even with such blinking, the degree of empathy can be properly presented. Such blinking and the periodicity thereof are determined by the presentation processor 105 and indicated by empathy presentation information as a mode of presentation of the degree of empathy.

Modification 4

In the foregoing embodiment and Modifications 1 and 2 thereof, a reference person and a target person are selected, for example, with the use of the reference person frame W1 and the target person frame W2 shown in FIG. 3. In the present embodiment, a reference person and a target person are selected without the use of those frames.

Figure 31:
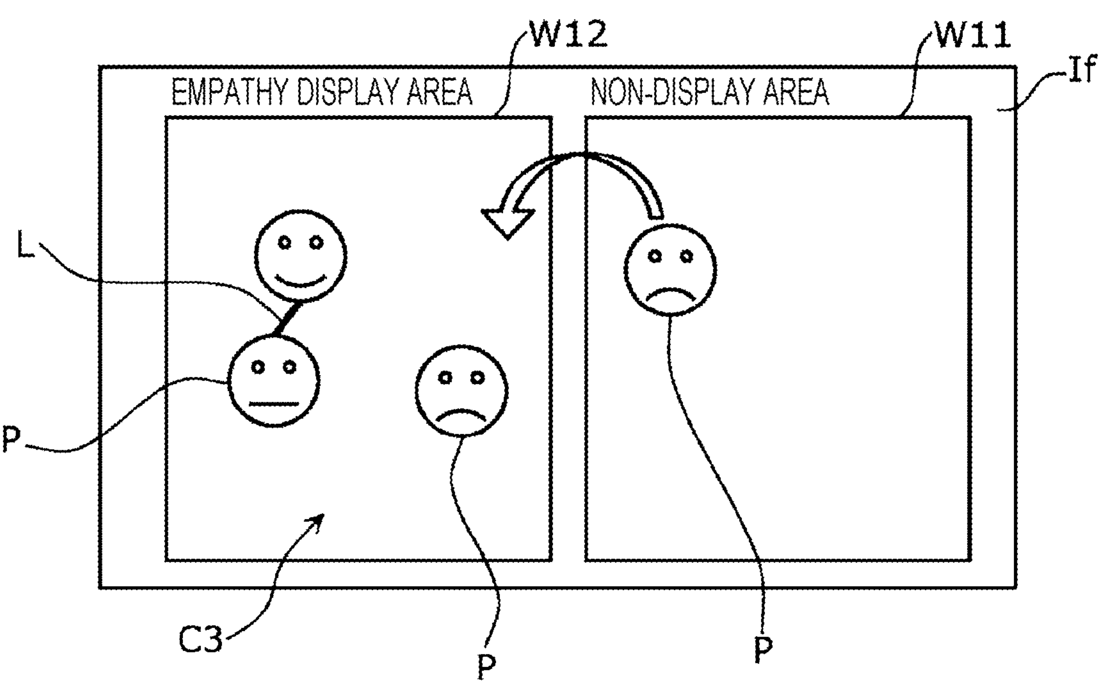
FIG. 31 is a diagram showing an example of an image that is displayed on a presenter of a terminal device according to Modification 4 of the embodiment.

FIG. 31 is a diagram showing an example of an image that is displayed on the presenter 205 of a terminal device 200.

For example, as shown in FIG. 31, the presenter 205 displays a setting display screen image If containing a non-display area W11 and an empathy display area W12. In the non-display area W11, the person identifying image P of a participant whose degree of empathy is not to be derived is placed. On the other hand, in the empathy display area W12, the person identifying image P of a participant whose degree of empathy is to be derived.

First, when the setting display screen image If is displayed, the person identifying images P of all participants are placed in the non-display area W11. The user of the terminal device 200 determines the person identifying image P of a desired participant from among all the person identifying images P placed in the non-display area W11. Then, the user operates the operator 203 of the terminal device 200 to move the determined person identifying image P from the non-display area W11 into the empathy display area W12. Such movement of a person identifying image P may be done by drag and drop. According to this, the terminal controller 206 of the terminal device 200 selects, as a reference person and a target person, the participant who corresponds to the person identifying image P. Such selection of a person is repeatedly executed by the user moving a person identifying image P. The terminal controller 206 causes selected person information that indicates the selected person to be sent from the terminal communicator 204 to the server 100. The server 100 handles, as a reference person and a target person, the person indicated by the selected person information, and as in the case of the foregoing embodiment and Modification 2, the server 100 derives a degree of empathy, generates empathy presentation information, and sends the empathy presentation information to the terminal device 200.

In accordance with the empathy presentation information, the terminal controller 206 of the terminal device 200 displays, in the empathy display area W12, a correlation diagram C3 that is similar to the correlation diagram C1 shown in (a) of FIG. 29.

Thus, in the present modification, a participant whom the user would like to present a degree of empathy is selected without distinction between a reference person and a target person. Accordingly, the trouble of making such a distinction can be saved. Furthermore, in the present modification, the degree of empathy of a participant who corresponds to a person identifying image P placed in the non-display area W11 is not displayed, and only the degree of empathy of a participant who corresponds to a person identifying image P placed in the empathy display area W12 is displayed. Accordingly, only a degree of empathy between participants the user would like can be displayed in an easy-to-understand manner.

Furthermore, in the present modification, since a degree of empathy is not displayed for a participant who corresponds to a person identifying image P placed in the non-display area W11, the processing load on the server 100 can be made less than in a case where degrees of empathy among all participants are derived.

Although, in the aforementioned example, a person identifying image P for identifying a participant is placed in the non-display area W1, a group image for identifying an organization or a group to which a plurality of participants belong may be placed in the non-display area W11. In this case, the user finds, from the non-display area W11, a group image that corresponds to an organization or a group whose degree of empathy the user would like to know. Then, the user performs an input operation on the operator 203 of the terminal device 200 to move the group image from the non-display area W11 into the empathy display area W12. As a result of that, the terminal controller 206 of the terminal device 200 converts the group image placed in the empathy display area W12 into the person identifying images P of a plurality of participants who belong to the organization or the group that corresponds to the group image. As a result of that, as in the case of the example shown in FIG. 31, a correlation diagram C3 containing those person identifying images P is displayed in the empathy display area W12.

Modification 5

In the foregoing embodiment and Modifications 1 to 4, a degree of empathy is presented. In the present embodiment, not only a degree of empathy but also a direction of empathy are presented. For example, as in the case of the example shown in FIG. 14A of the foregoing embodiment, the degree-of-empathy analyzer 101 outputs not only degree-of-empathy information but also direction-of-empathy information that indicates a direction of empathy. The presentation processor 105 generates and outputs empathy presentation information that indicates the degree of empathy indicated by the degree-of-empathy information and the direction of empathy indicated by the direction-of-empathy information according to a preset mode of presentation. The preset mode of presentation is, for example, a correlation diagram. The generated empathy presentation information is sent to the terminal device 200, and the content of the empathy presentation information is displayed on the presenter 205.

Figure 32:
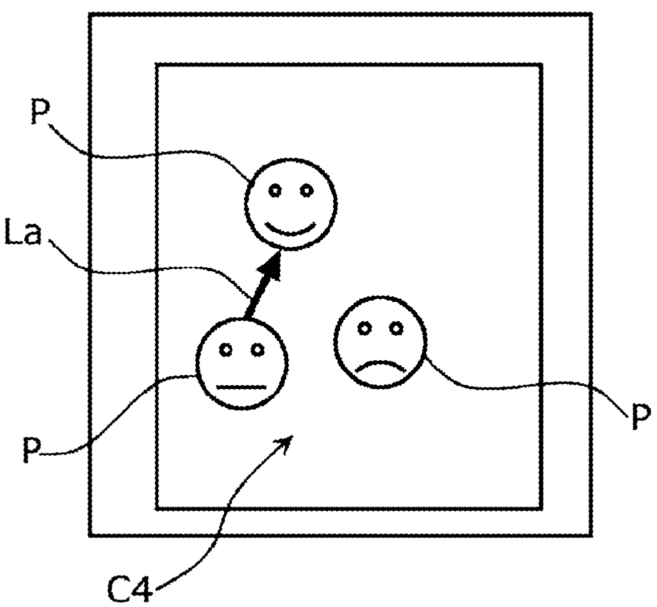
FIG. 32 is a diagram showing an example of an image that is displayed on a presenter of a terminal device according to Modification 5 of the embodiment.

FIG. 32 is a diagram showing an example of an image that is displayed on the presenter 205 of a terminal device 200.

The presenter 205 displays, for example, a correlation diagram C4 shown in FIG. 32. In the correlation diagram C4, a plurality of person identifying images P are connected to each other by an arrow La. The length and thickness of the arrow La is set on the basis of the magnitude of a degree of empathy between participants represented by the two person identifying images P connected to each other by the arrow La. Furthermore, the orientation of the arrow La indicates a direction of the degree of empathy. That is, the orientation of the arrow La indicates that a participant represented by a person identifying image P connected to the base of the arrow La empathizes with a participant represented by a person identifying image P connected to the tip of the arrow La.

For example, as in the case of the example shown in FIG. 14A, in a case where a target person empathizes with a reference person because of remarks made by the reference person, the degree-of-empathy analyzer 101 determines that the target person feels empathy with the reference person, and identifies a direction from the target person to the reference person as a direction of empathy. The presentation processor 105 generates a correlation diagram C4 in which the arrow La extends from the person identifying image P of the target person to the person identifying image P of the reference person and generates empathy presentation information that indicates the correlation diagram C4.

This can make it easy for the user to recognize information as to who feels empathy with whom.

The degree-of-empathy analyzer 101 may identify a direction of empathy on the basis of a difference between the timing of a change in biological information (e.g. heart rate) of a reference person and the timing of a change in biological information of a target person. In one specific example, in a case where the biological information of the reference person changes first and then the biological information of the target person changes, it is conceivable that the biological information of the target person may have changed in accordance with the inner state of the target person. Accordingly, the degree-of-empathy analyzer 101 can determine, on the basis of the difference in timing, that the direction of empathy is a direction from the target person to the reference person.

Further, as in the case of the example shown in FIG. 14A, the degree-of-empathy analyzer 101 may identify a direction of empathy on the basis of voice data. For example, in a case where the biological information of the target person changes after the reference person has made remarks, it is conceivable that the biological information of the target person may have changed due to the remarks made by the reference person. Accordingly, the degree-of-empathy analyzer 101 can determine, on the basis of the voice data, that the direction of empathy is a direction from the target person to the reference person.

Thus, in the present modification, the degree-of-empathy analyzer 101 determines, as a direction of empathy, whether a degree of empathy derived indicates an extent to which a reference person empathizes with a target person or an extent to which the target person empathizes with the reference person. Moreover, the presentation processor 105 causes the determined direction of empathy to be displayed on the display of the presenter 205 of the terminal device 200. This causes the direction of empathy to be displayed, thus allowing the user to grasp who empathizes with whom and to further smoothly perform communication.

Other Modifications

Although the foregoing has described an information processing system and an information processing method according to one or more aspects of the present disclosure with reference to the foregoing embodiment and Modifications 1 to 5 thereof, the present disclosure is not limited to the foregoing embodiment and Modifications 1 to 5. Applications to the foregoing embodiment and Modifications 1 to 5 of various modifications conceived of by persons skilled in the art may as well be encompassed in the present disclosure, as long as such applications do not depart from the scope of the present disclosure. Further, aspects constructed by combining constituent elements of the foregoing embodiment and Modifications 1 to 5 may as well be encompassed in the present disclosure.

For example, in the foregoing embodiment, as shown in FIG. 8, after a plurality of persons including a reference person and a target person have been selected from among all participants, biological information of the plurality of persons is acquired. However, on the other hand, after biological information of all the participants has been acquired, the plurality of persons may be selected from among all the participants.

Further, although, in the foregoing embodiment and Modifications 1 to 5 thereof, the presentation processor 105 is provided in the server 100, the presentation processor 105 may be provided in the terminal device 200. Further, each terminal device 200 may include not only the presentation processor 105 but also all or some of the constituent elements provided in the server 100. On the other hand, the server 100 may include all or some of the constituent elements provided in the terminal device 200.

Further, although, in the foregoing embodiment and Modifications 1 to 5 thereof, online communication is performed, non-online face-to-face communication may be performed. For example, when a conference is held in a conference room, each attendee gathering in the conference room may grasp a degree of empathy between a plurality of attendees by operating the terminal device 200 while having communication face to face.

Further, in Aspect 1 of the degree-of-empathy analyzer 101, a degree of empathy is derived from a coefficient of correlation, and in Aspects 2 and 3, a degree of empathy is derived from a factor of stress. However, the degree-of-empathy analyzer 101 may calculate the average of a degree of empathy derived from a coefficient of correlation and a degree of empathy derived from a factor of stress and output, as final degree-of-empathy information, degree-of-empathy information that indicates the average. Furthermore, a degree of empathy may also be derived with the use of other biological information other than heartbeat information. As mentioned above, the other biological information may be data that represents, for example, a facial expression, the acceleration of a person's motion, the temperature of the face, or the amount of perspiration of the hand. In a case where the heartbeat information according to Aspect 1 indicates a heartbeat fluctuation, the heartbeat fluctuation may be LF/HF, which is considered to indicate an amount of sympathetic activity. Further, although the amount of change in RRI, the amount of change in CvRR, the amount of change in SC, and the amount of change in skin temperature according to Aspects 2 and 3 may be expressed as ratios as shown in Formulas 1 to 4, respectively, these amounts of change may be expressed as differences.

In the foregoing embodiment and Modifications 1 to 5 thereof, each constituent element may be constituted by dedicated hardware or may be implemented by executing a software program suited to that constituent element. Each constituent element may be implemented by a program executor such as a central processing unit (CPU) or a processor reading out and executing a software program stored on a storage medium such as a hard disk or a semiconductor memory. Software that implements the foregoing embodiment and Modifications 1 to 5 thereof is a program that causes a computer to execute each step of the flow charts shown in FIGS. 8 to 11, FIG. 15, FIG. 21. FIG. 23, and FIGS. 26 to 28.

The online communication according to the foregoing embodiment may be communication that is performed in a virtual space by a user manipulating an avatar. That is, the mode of presentation of a degree of empathy according to the foregoing embodiment is also applicable to an aspect of a virtual space that is displayed by the presenter.

Further, a process of changing the orientation of an avatar in a virtual space according to a degree of empathy may be performed. For example, in a case where an avatar A that corresponds to a person A, an avatar B that corresponds to a person B, and an avatar C that corresponds to a person C are displayed on the presenter so as to be present in a virtual space and in a case where it is determined that a degree of empathy between the person A and the person B is higher than a degree of empathy between the person A and the person C and a degree of empathy between the person B and the person C, the mode of presentation may be varied so that the avatar A and the avatar B face each other in the virtual space.

Further, in a case where it is determined that the degree of empathy between the person A and the person B is higher than the degree of empathy between the person A and the person C and the degree of empathy between the person B and the person C, the avatar A and the avatar B may be moved closer to each other so that the distance between the avatar A and the avatar B in the virtual space becomes shorter.

It should be noted that the present disclosure also encompasses the following cases.

(1) The at least one device is specifically a computer system composed of a microprocessor, a read-only memory (ROM), a random-access memory (RAM), a hard disk unit, a display unit, a keyboard, a mouse, or other components. The RAM or the hard disk unit has a computer program stored therein. A function of the at least one device is achieved by the microprocessor operating in accordance with the computer program. To achieve the predetermined function, the computer program is constituted by a combination of command codes that indicate instructions for a computer.

(2) The at least one device may be constituted by constituent elements all or some of which are constituted by one system large-scale integration (LSI). The system LSI is a super-multifunction LSI fabricated by integrating a plurality of components on one chip and, specifically, is a computer system composed of a microprocessor, a ROM, a RAM, or other components. The RAM has a computer program stored therein. A function of the system LSI is achieved by the microprocessor operating in accordance with the computer program.

(3) The at least one device may be constituted by constituent elements all or some of which are constituted by an IC card or a single module that can be attached to and detached from the device. The IC card or the module is a computer system composed of a microprocessor, a ROM, a RAM, or other components. The IC card or the module may include the aforementioned super-multifunction LSI. A function of the IC card or the module is achieved by the microprocessor operating in accordance with a computer program. The IC card or the module may have tamper resistance.

(4) The present disclosure may be directed to the aforementioned methods. Further, these methods may be directed to computer programs that are implemented by computers or may be directed to digital signals composed of computer programs.

Further, the present disclosure may be directed to a computer program or a digital signal stored on a computer-readable storage medium such as a flexible disk, a hard disk, a CD (Compact Disc)-ROM, a DVD, a DVD-ROM, a DVD-RAM, a BD (Blu-ray (registered trademark) Disc), or a semiconductor memory. The present disclosure may also be directed to digital signals stored on these storage media.

Further, the present disclosure may be directed to the transmission of a computer program or a digital signal via a telecommunication line, a wireless or wired communication line, a network typified by the Internet, data broadcasting, or other routes.

Further, a program or a digital signal may be executed by another independent computer either by storing the program or the digital signal on a storage medium and transferring the program or the digital signal or by transferring the program or the digital signal via a network or other routes.

Further, the information processing method disclosed herein can be said to encompass methods according to the following aspects.

First Aspect

An information processing method according to a first aspect is directed to an information processing method that is executed by one or more computers, the information processing method including: acquiring biological information of each of a plurality of persons; on the basis of the acquired biological information and for each of at least one target person of the plurality of persons, deriving a degree of empathy between a reference person of the plurality of persons and that target person; by accepting an input operation from a user who uses the one or more computers, executing a person selecting process of selecting the reference person and the at least one target person from among a plurality of candidate persons; and outputting degree-of-empathy information that indicates the degree of empathy of each of the at least one target person selected by the person selecting process.

Second Aspect

An information processing method according to a second aspect is directed to the information processing method according to the first aspect, wherein in the person selecting process, a first reference person and a second reference persons who are different from each other are each selected as the reference person from among the plurality of candidate persons, and deriving the degree of empathy includes, for each of the at least one target person, deriving a degree of empathy between the first reference person and that target person and deriving a degree of empathy between the second reference person and that target person.

Third Aspect

An information processing method according to a third aspect is directed to the information processing method according to the first or second aspect, wherein in the person selecting process, an image for accepting an input operation performed by the user is displayed, and by accepting the input operation that corresponds to the image, the reference person and the at least one target person are selected.

Fourth Aspect

An information processing method according to a fourth aspect is directed to the information processing method according to the second or third aspect, wherein in the person selecting process, voice data that represents an utterance produced by the user is acquired, and by accepting the voice data as the input operation, the reference person and the at least one target person are selected.

Fifth Aspect

An information processing method according to a fifth aspect is directed to the information processing method according to the first aspect, wherein generating the degree-of-empathy information includes: acquiring attribute information that indicates an attribute of each of the at least one target person; on the basis of the attribute information and for each attribute, deriving, with use of a degree of empathy of each of the at least one person who belongs to that attribute, a representative degree of empathy serving as a degree of empathy that represents the attribute; and generating the degree-of-empathy information that indicates the representative degree of empathy for each attribute.

Sixth Aspect

An information processing method according to a sixth aspect is directed to the information processing method according to the first aspect, further including causing a device situated in an area around a user who uses the one or more computers to adjust an environment of the user to an environment that corresponds to a degree of empathy of each of the at least one target person.

Seventh Aspect

An information processing method according to a seventh aspect is directed to the information processing method according to the first aspect, further including: determining, as a direction of empathy, whether the derived degree of empathy indicates an extent to which the reference person empathizes with the target person or whether the target person empathizes with the reference person; and causing a display to display the determined direction of empathy.

Eighth Aspect

An information processing method according to an eighth aspect is directed to an information processing method that is executed by one or more computers, the information processing method including: acquiring biological information of each of a plurality of persons; on the basis of the acquired biological information and for each of at least one target person of the plurality of persons, deriving a degree of empathy between a reference person of the plurality of persons and that target person; for each of the at least one target person, causing a display to display a person identifying image for identifying that target person; and varying a mode of presentation of the person identifying image according to a magnitude of the derived degree of empathy.

Ninth Aspect

An information processing method according to a ninth aspect is directed to the information processing method according to the eighth aspect, wherein displaying the person identifying image includes displaying an arrangement of the respective person identifying images of the at least one target person, and in the arrangement, the respective person identifying images of the at least one target person are listed in order of degree of empathy of the at least one target person.

Tenth Aspect

An information processing method according to a tenth aspect is directed to the information processing method according to the ninth aspect, wherein in the arrangement, the person identifying image of the target person with a higher degree of empathy is placed further forward in the arrangement.

Eleventh Aspect

An information processing method according to an eleventh aspect is directed to the information processing method according to the eighth aspect, wherein displaying the person identifying image includes causing the person identifying image of each of the at least one target person to be displayed in a size that corresponds to a degree of empathy of that target person.

Twelfth Aspect

An information processing method according to a twelfth aspect is directed to the information processing method according to the eleventh aspect, wherein the person identifying image is displayed in a larger size when the target person identified by the person identifying image has a higher degree of empathy.

Thirteenth Aspect

An information processing method according to a thirteenth aspect is directed to the information processing method according to the eighth aspect, wherein displaying the person identifying image includes causing the person identifying image of each of the at least one target person to be displayed with a degree of representational accuracy that corresponds to a degree of empathy of that target person, and the degree of representational accuracy of the person identifying image is an extent to which the person identifying image is similar to a photographic image of the target person identified by the person identifying image.

Fourteenth Aspect

An information processing method according to a fourteenth aspect is directed to the information processing method according to the thirteenth aspect, wherein the person identifying image is displayed with a higher degree of representational accuracy when the target person identified by the person identifying image has a higher degree of empathy.

Fifteenth Aspect

An information processing method according to a fifteenth aspect is directed to the information processing method according to the eighth aspect, wherein displaying the person identifying image includes causing the person identifying image of each of the at least one target person to be displayed in such a manner as to express an action that corresponds to a degree of empathy of that target person.

Sixteenth Aspect

An information processing method according to a sixteenth aspect is directed to the information processing method according to the eighth aspect, wherein deriving the degree of empathy includes deriving, for each pair of two persons included in the plurality of persons, a degree of empathy between the two persons included in that pair, one of the two persons is the reference person, the other is the target person, and displaying the person identifying image includes displaying only the person identifying image of one of a plurality of pairs whose degrees of empathy have been derived that corresponds to a degree of empathy higher than a threshold.

The present disclosure is applicable, for example, to a communication system that is used in communication among a plurality of persons.

What is claimed is:

1. A light control system comprising:

a first camera that detects light from a first user and generates first image showing a face of the first user;

a second camera that detects light from a second user and generates second image showing a face of the second user;

a lighting device that illuminates a room where the first user is located; and a processing apparatus, wherein the processing apparatus generates, based on the first image, first biological data relating to heartbeat of the first user by analyzing changes in chromaticity of a skin of the face of the first user, generates, based on the second image, second biological data relating to heartbeat of the second user by analyzing changes in chromaticity of a skin of the face of the second user, analyzes correlation between the heartbeat of the first user and the heartbeat of the second user based on the first biological data and the second biological data, derives a degree of empathy between the first user and the second user based on the correlation, and outputs a light control signal representing a brightness level that corresponds to the degree of empathy, the lighting device receives the light control signal, and emits light at the brightness level represented by the light control signal.

2. The light control system according to claim 1, wherein the processing apparatus, in the analyzing, calculates a coefficient of correlation based on the correlation and derives the degree of empathy based on the coefficient of correlation.

3. The light control system according to claim 1, wherein the first biological data and the second biological data include at least one selected from the group consisting of: a heartbeat interval which is an interval between the peaks of R waves of two consecutive heartbeats; CvRR which is a coefficient of variation of heart rate variability; and an integral value of a power spectrum calculated from a power spectrum obtained by frequency analyzing the heartbeat interval using a fast Fourier transform.

4. The light control system according to claim 1, further comprising a speaker disposed in the room of the first user, the processing apparatus outputs to the speaker a sound signal indicating a sound corresponding to the degree of empathy, the speaker receives the sound signal and outputs the sound indicated by the sound signal.

5. A display processing system comprising:

a first camera that detects light from a first user and generates first image showing a face of the first user;

a second camera that detects light from a second user and generates second image showing a face of the second user;

a display that display an image; and a processing apparatus, wherein the processing apparatus generates, based on the first image, first biological data relating to heartbeat of the first user by analyzing changes in chromaticity of a skin of the face of the first user, generates, based on the second image, second biological data relating to heartbeat of the second user by analyzing changes in chromaticity of a skin of the face of the second user, analyzes correlation between the heartbeat of the first user and the heartbeat of the second user based on the first biological data and the second biological data, derives a degree of empathy between the first user and the second user based on the correlation, and (i) displays one or more identification images for identifying the first user and the second user, or (ii) displays one or more avatars corresponding to the first user and the second user in a virtual space;

changes mode of presentation of the one or more identification images or the one or more avatars displayed on the display according to the degree of empathy.

6. The display processing system according to claim 5, wherein the one or more identification images include a first identification image for identifying the first user and a second identification image for identifying the second user, the processing apparatus causes the display to display the first identification image and the second identification image.

7. The display processing system according to claim 6, wherein in displaying the first identification image and the second identification image, the first identification image and the second identification image are displayed in such a manner as to express an action according to the degree of empathy.

8. The display processing system according to claim 5, wherein in displaying the first identification image and the second identification image, the processing apparatus causes each of the first identification image and the second identification image to be displayed with a display precision according to the degree of empathy, the display precision of the first identification image is a degree of similarity of the first identification image to the photographic image of the first user, the display precision of the second identification image is a degree of similarity of the second identification image to the photographic image of the second user.

9. The display processing system according to claim 8, wherein the first identification image and the second identification image are displayed with a higher display precision as the degree of empathy increases.

10. The display processing system according to claim 5, wherein the one or more avatars include a first avatar corresponding to the first user and a second avatar corresponding to the second user, the processing apparatus displays the first avatar and the second avatar on the display.

11. The display processing system according to claim 10, wherein the processing apparatus, upon changing the mode of presentation, changes the first avatar and the second avatar displayed on the display such that the orientation of the first avatar and the second avatar in the virtual space changes according to the degree of empathy.

12. An information processing method comprising:

causing a first camera to detect light from a first user and generate first image showing a face of the first user;

causing a second camera to detect light from a second user and generate second image showing a face of the second user;

causing a lighting device to illuminate a room where the first user is located; and generating, based on the first image, first biological data relating to heartbeat of the first user by analyzing changes in chromaticity of a skin of the face of the first user, generating, based on the second image, second biological data relating to heartbeat of the second user by analyzing changes in chromaticity of a skin of the face of the second user, analyzing correlation between the heartbeat of the first user and the heartbeat of the second user based on the first biological data and the second biological data, deriving a degree of empathy between the first user and the second user based on the correlation, and outputting a light control signal representing a brightness level that corresponds to the degree of empathy, causing the lighting device to receive the light control signal, and emit light at the brightness level represented by the light control signal.

13. An information processing method comprising:

cause a first camera to detect light from a first user and generate first image showing a face of the first user;

cause a second camera to detect light from a second user and generate second image showing a face of the second user;

cause a display to display an image; and generating, based on the first image, first biological data relating to heartbeat of the first user by analyzing changes in chromaticity of a skin of the face of the first user, generating, based on the second image, second biological data relating to heartbeat of the second user by analyzing changes in chromaticity of a skin of the face of the second user, analyzing correlation between the heartbeat of the first user and the heartbeat of the second user based on the first biological data and the second biological data, deriving a degree of empathy between the first user and the second user based on the correlation, and (i) displaying one or more identification images for identifying the first user and the second user, or (ii) displaying one or more avatars corresponding to the first user and the second user in a virtual space;

changing mode of presentation of the one or more identification images or the one or more avatars displayed on the display according to the degree of empathy.

* * * * *